United States Patent
Ikeda et al.

(10) Patent No.: US 7,519,278 B2
(45) Date of Patent: Apr. 14, 2009

(54) PLAYBACK APPARATUS, PROGRAM, PLAYBACK METHOD

(75) Inventors: Wataru Ikeda, Osaka (JP); Tomoyuki Okada, Nara (JP)

(73) Assignee: Panasonic Corporation, Osaka (JP)

( * ) Notice: Subject to any disclaimer, the term of this patent is extended or adjusted under 35 U.S.C. 154(b) by 713 days.

(21) Appl. No.: 11/156,055

(22) Filed: Jun. 17, 2005

(65) Prior Publication Data

US 2006/0078301 A1  Apr. 13, 2006

(30) Foreign Application Priority Data

Jun. 18, 2004 (JP) .............................. 2004-181400
Jul. 1, 2004 (JP) .............................. 2004-195439

(51) Int. Cl.
H04N 5/00 (2006.01)
H04N 5/91 (2006.01)
H04N 7/00 (2006.01)

(52) U.S. Cl. ........................... 386/125; 386/46; 386/95; 386/126

(58) Field of Classification Search .................. 386/95, 386/46, 125–126
See application file for complete search history.

(56) References Cited

U.S. PATENT DOCUMENTS

| | | | |
|---|---|---|---|
| 6,088,507 A | 7/2000 | Yamauchi et al. | |
| 6,104,706 A | 8/2000 | Richter et al. | |
| 6,345,147 B1 | 2/2002 | Mimura et al. | |
| 6,442,333 B1 * | 8/2002 | Izawa ........................... | 386/95 |
| 2003/0086690 A1 | 5/2003 | Chung et al. | |
| 2003/0117529 A1 | 6/2003 | De Haan | |
| 2003/0194212 A1 | 10/2003 | Akita et al. | |
| 2004/0216169 A1 * | 10/2004 | Fujiwara ........................ | 725/135 |
| 2005/0105888 A1 | 5/2005 | Hamada et al. | |
| 2006/0245723 A1 | 11/2006 | Yahata et al. | |

FOREIGN PATENT DOCUMENTS

| | | |
|---|---|---|
| EP | 0 744 866 | 11/1996 |
| EP | 0 924 934 A1 | 6/1999 |
| EP | 1 035 735 A2 | 9/2000 |
| EP | 1 400 968 | 3/2004 |
| EP | 1 473 731 | 11/2004 |
| EP | 1 638 327 | 3/2006 |
| JP | 3-280096 | 12/1991 |
| JP | 5-80738 | 4/1993 |
| JP | 9-259507 | 10/1997 |
| JP | 11-52937 | 2/1999 |
| JP | 2000-228656 | 7/2000 |
| JP | 2002-374494 | 12/2002 |

(Continued)

*Primary Examiner*—Thai Tran
*Assistant Examiner*—Daquan Zhao

(57) ABSTRACT

A BD-ROM playback apparatus plays back a text subtitle stream during a playback of moving pictures. A reserved area of a PSR stores therein, as a supplementary language, an identifier of a language in which the playback apparatus is not capable of decoding a text subtitle stream, due to inconvenience caused during display of the text subtitle.

The set-up unit 32 inquires of a user whether the user wishes to increase the number of languages in which subtitles are displayable even if inconvenience may be caused during the display. In the case where the user performs an affirmative operation in response to the inquiry, the stream selection unit 17 selects a text subtitle stream corresponding to the supplementary language from the plurality of text subtitle streams.

4 Claims, 68 Drawing Sheets

FOREIGN PATENT DOCUMENTS

| | | |
|---|---|---|
| JP | 2003-84952 | 3/2003 |
| JP | 2003-100056 | 4/2003 |
| JP | 2003-173621 | 6/2003 |
| JP | 2004-96512 | 3/2004 |
| JP | 2004-112207 | 4/2004 |
| KR | 1999-0071531 | 9/1999 |
| KR | 1020040031193 | 4/2004 |
| WO | 98/09290 | 3/1998 |
| WO | 01/22729 A1 | 3/2001 |
| WO | 2004/036574 | 4/2004 |
| WO | 2004/049710 | 6/2004 |

* cited by examiner

FIG.8A

STN_table

| number_of_video_stream_entries |
| number_of_audio_stream_entries |
| number_of_PG_textST_stream_entries |
| number_of_IG_stream_entries | video_stream { entry-attribute audio_stream {
- entry-attribute
- entry-attribute
- entry-attribute
- entry-attribute
- :
- entry-attribute PG_TextST_stream {
- entry-attribute
- entry-attribute
- entry-attribute
- entry-attribute
- :
- entry-attribute IG_stream {
- entry-attribute
- entry-attribute

FIG.8B

ENTRY-ATTRIBUTE CORRESPONDING TO PG Stream

| entry | ref_to_stream_PID_of_mainClip |
| attribute | stream_coding_type=0x90(=PG)<br>PG_language_code<br>※language_code defined by ISO639-2/T |

FIG.8C

ENTRY-ATTRIBUTE CORRESPONDING TO text ST stream

| entry | ref_to_subClip_entry_ID<br>ref_to_subpath_ID<br>ref_to_stream_PID_of_subClip |
| attribute | stream_coding_type=0x92(=Text)<br>character_code<br>textST_language_code<br>※language_code defined by ISO639-2/T |

FIG. 18

[PSR53]

| Bit | Field | Description |
|-----|-------|-------------|
| b31 | CAPABILITY IN hmo | 1:YES 0:NO |
| b30 | CAPABILITY IN hit | 1:YES 0:NO |
| b29 | CAPABILITY IN hmn | 1:YES 0:NO |
| b28 | CAPABILITY IN hun | 1:YES 0:NO |
| b27 | CAPABILITY IN hup | 1:YES 0:NO |
| b26 | CAPABILITY IN iba | 1:YES 0:NO |
| b25 | CAPABILITY IN isl | 1:YES 0:NO |
| b24 | CAPABILITY IN ibo | 1:YES 0:NO |
| b23 | CAPABILITY IN ijo | 1:YES 0:NO |
| b22 | CAPABILITY IN ilo | 1:YES 0:NO |
| b21 | CAPABILITY IN inc | 1:YES 0:NO |
| b20 | CAPABILITY IN ine | 1:YES 0:NO |
| b19 | CAPABILITY IN ind | 1:YES 0:NO |
| b18 | CAPABILITY IN ina | 1:YES 0:NO |
| b17 | CAPABILITY IN ile | 1:YES 0:NO |
| b16 | CAPABILITY IN iku | 1:YES 0:NO |
| b15 | CAPABILITY IN ipk | 1:YES 0:NO |
| b14 | CAPABILITY IN ira | 1:YES 0:NO |
| b13 | CAPABILITY IN gle | 1:YES 0:NO |
| b12 | CAPABILITY IN mga | 1:YES 0:NO |
| b11 | CAPABILITY IN sga | 1:YES 0:NO |
| b10 | CAPABILITY IN iro | 1:YES 0:NO |
| b9  | CAPABILITY IN ita | 1:YES 0:NO |
| b8  | CAPABILITY IN jpn | 1:YES 0:NO |
| b7  | CAPABILITY IN jav | 1:YES 0:NO |
| b6  | CAPABILITY IN jrb | 1:YES 0:NO |
| b5  | CAPABILITY IN jpr | 1:YES 0:NO |
| b4  | CAPABILITY IN kab | 1:YES 0:NO |
| b3  | CAPABILITY IN kac | 1:YES 0:NO |
| b2  | CAPABILITY IN kal | 1:YES 0:NO |
| b1  | CAPABILITY IN kam | 1:YES 0:NO |
| b0  | CAPABILITY IN kan | 1:YES 0:NO |

| THREE-LETTER CODE | LANGUAGE NAME |
|---|---|
| iba | IBAN |
| isl | ICELANDIC |
| ibo | IGBO |
| ijo | IJO |
| ile | INTERLINGU |
| ilo | ILOKO |
| ina | INTERLINGUA |
| inc | INDIC |
| ine | INDO-EUROPEAN |
| ind | INDONESIAN |
| iku | INUKTITUT |
| ipk | INUPIAQ |
| ira | IRANIAN(Other) |
| gle | IRISH |
| sga | IRISH, OLD |
| mga | IRISH, MIDDLE |
| iro | IROQUOIAN LANGUAGES |
| ita | ITALIAN |

J

| THREE-LETTER CODE | LANGUAGE NAME |
|---|---|
| jpn | JAPANESE |
| jav | JAVANESE |
| jrb | JUDEO-ARABIC |
| jpr | JUDEO-PERSIAN |

K

| THREE-LETTER CODE | LANGUAGE NAME |
|---|---|
| kab | KABYLE |
| kac | KACHIN |
| kal | GREENLANDIC |
| kam | KAMBA |
| kan | KANNADA |

H

| THREE-LETTER CODE | LANGUAGE NAME |
|---|---|
| hmo | HIRI MOTU |
| hun | HUNGARIAN |
| hup | HUPA |

| THREE-LETTER CODE | PSR NUMBER / BIT POSITION |
|---|---|
| hmo | PSR53.b31 |
| hun | PSR53.b28 |
| hup | PSR53.b27 |

I

| THREE-LETTER CODE | PSR NUMBER / BIT POSITION |
|---|---|
| iba | PSR53.b26 |
| isl | PSR53.b25 |
| ibo | PSR53.b24 |
| ijo | PSR53.b23 |
| ile | PSR53.b17 |
| ilo | PSR53.b22 |
| ina | PSR53.b18 |
| inc | PSR53.b21 |
| ine | PSR53.b20 |
| ind | PSR53.b19 |
| iku | PSR53.b16 |
| ipk | PSR53.b15 |
| ira | PSR53.b14 |
| gle | PSR53.b13 |
| sga | PSR53.b11 |
| mga | PSR53.b12 |
| iro | PSR53.b10 |
| ita | PSR53.b9 |

J

| THREE-LETTER CODE | PSR NUMBER / BIT POSITION |
|---|---|
| jpn | PSR53.b8 |
| jaw | PSR53.b7 |
| jrb | PSR53.b6 |
| jpr | PSR53.b5 |

K

| THREE-LETTER CODE | PSR NUMBER / BIT POSITION |
|---|---|
| kab | PSR53.b4 |
| kac | PSR53.b3 |
| kal | PSR53.b2 |
| kam | PSR53.b1 |
| kan | PSR53.b0 |

THREE-LETTER CODE : text ST_language_code

FIG.26A

DECODING CAPABILITIES : JAPANESE YES
FOR TEXT SUBTITLES IN    FRENCH  NO
LANGUAGES (PSR 48-61)    CHINESE YES
                         ARABIC  NO

LANGUAGE SETTING FOR : CHINESE
SUBTITLES (PSR17)

FIG.26B

STN_table

| text_ST_stream1 : JAPANESE |
| text_ST_stream2 : FRENCH |
| text_ST_stream3 : CHINESE |
| text_ST_stream4 : ARABIC |

FIG.26C

|  | LANGUAGE | Check Decode capability(a) | Check language(b) | PRIORITY ORDER |
|---|---|---|---|---|
| text_ST_stream1 | JAPANESE | YES | NO | 2 |
| text_ST_stream2 | FRENCH | NO | NO | — |
| text_ST_stream3 | CHINESE | YES | YES | 1 |
| text_ST_stream4 | ARABIC | NO | NO | — |

FIG.27A

DECODING CAPABILITIES : JAPANESE YES
FOR TEXT SUBTITLES IN    FRENCH  NO
LANGUAGES (PSR 48-61)    CHINESE YES
                         ARABIC  NO

LANGUAGE SETTING FOR : KOREAN
    SUBTITLES (PSR17)

FIG.27B

STN_table

| text_ST_stream1 : JAPANESE |
| text_ST_stream2 : FRENCH |
| text_ST_stream3 : CHINESE |
| text_ST_stream4 : ARABIC |

FIG.27C

|  | LANGUAGE | Check Decode capability(a) | Check language(b) | PRIORITY ORDER |
|---|---|---|---|---|
| text_ST_stream1 | JAPANESE | YES | NO | 2 |
| text_ST_stream2 | FRENCH | NO | NO | — |
| text_ST_stream3 | CHINESE | YES | NO | 2 |
| text_ST_stream4 | ARABIC | NO | NO | — |

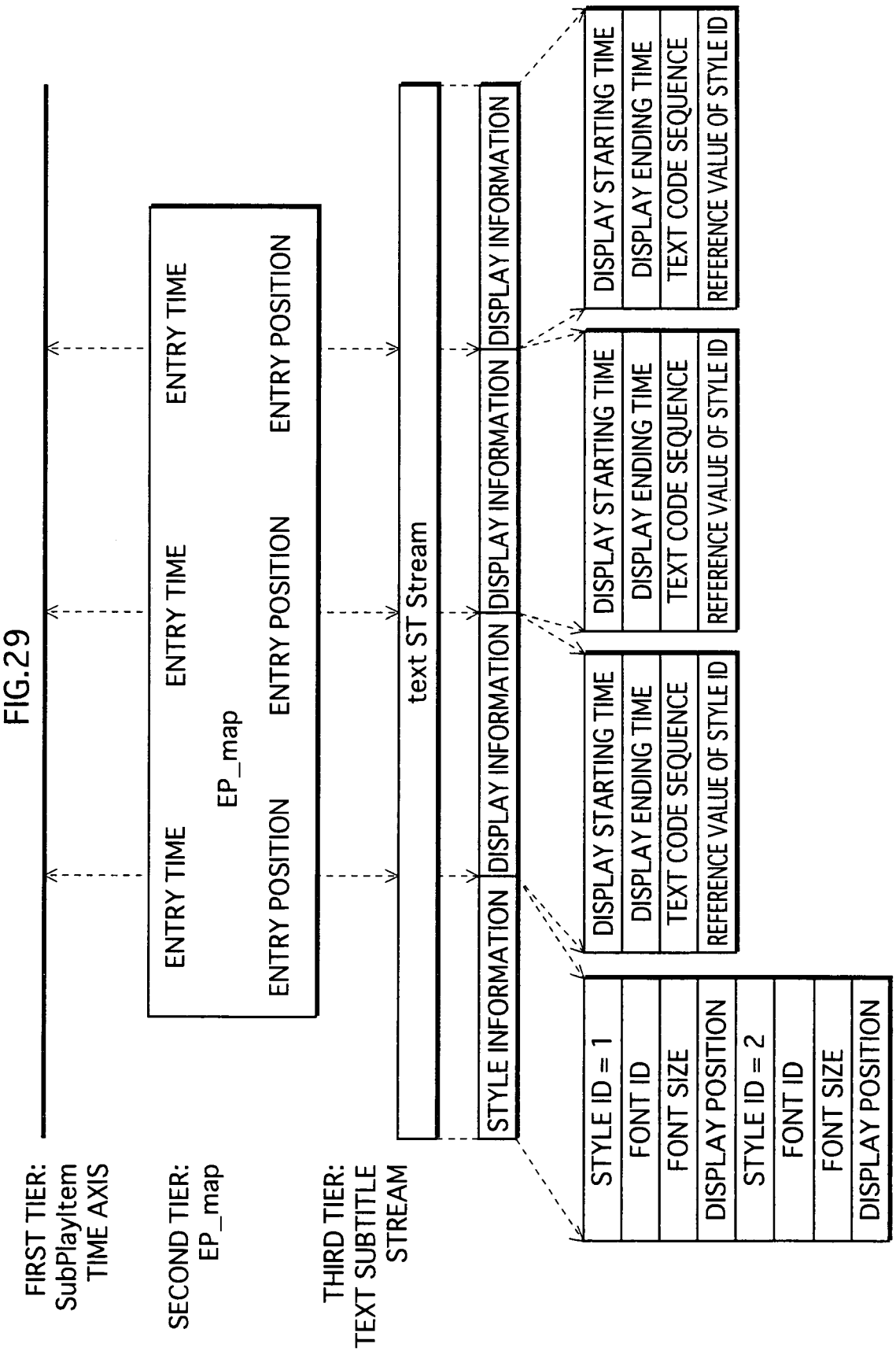

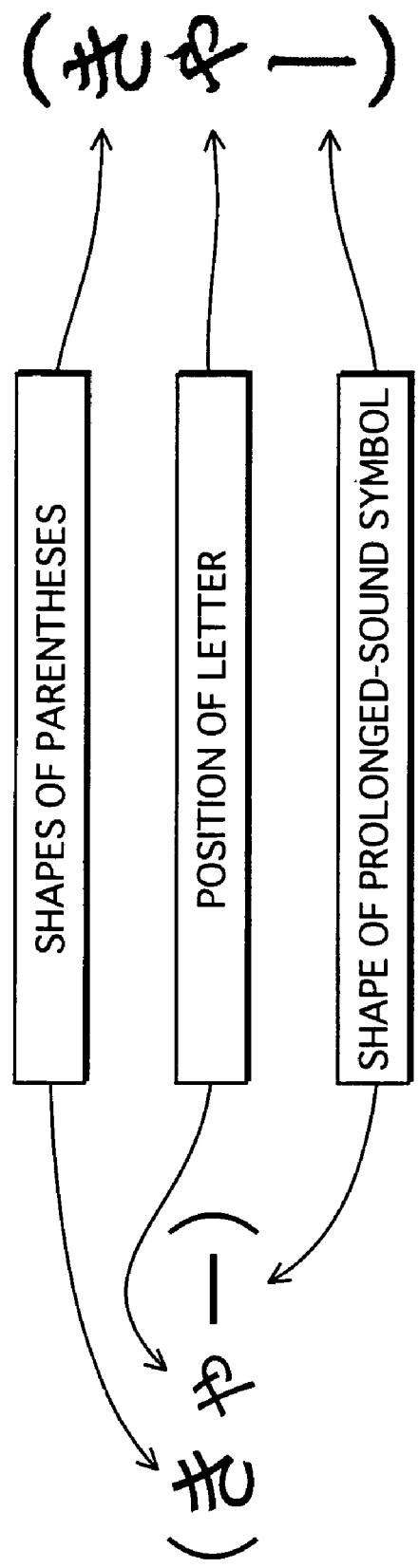
FIG.33A HORIZONTAL AND VERTICAL WRITINGS IN JAPANESE
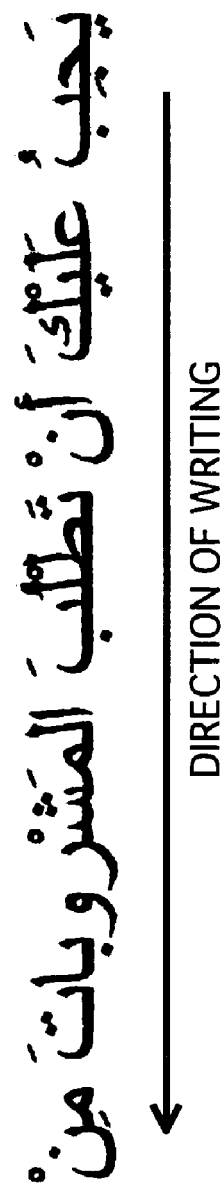
FIG.33B DIRECTION OF WRITING IN ARABIC

FIG.34

| RENDERING CAPABILITY FOR CHARACTER FONT | ENGLISH | JAPANESE | ARABIC |
|---|---|---|---|
| | 1 | 1 | 1 |

And · And · And

| | ENGLISH | JAPANESE | ARABIC | |
|---|---|---|---|---|
| HORIZONTAL WRITING (FROM LEFT TO RIGHT) | NECESSARY | NECESSARY | UNNECESSARY | ... |
| VERTICAL WRITING | UNNECESSARY | NECESSARY | UNNECESSARY | ... |
| KERNING | NECESSARY | UNNECESSARY | UNNECESSARY | ... |
| PROHIBIT LINE BREAKS AFTER CERTAIN CHARACTERS | UNNECESSARY | NECESSARY | UNNECESSARY | ... |
| RIGHT TO LEFT | UNNECESSARY | UNNECESSARY | NECESSARY | ... |
| DOUBLE LETTER/LOGOTYPE | NECESSARY | UNNECESSARY | NECESSARY | ... |
| CHARACTERS IN SMALLER SIZE | UNNECESSARY | NECESSARY | UNNECESSARY | ... |
| SUPPORT FOR LANGUAGE CHARACTERISTICS | 1 | 1 | 1 | |

⇩ DECODE CAPABILITY FOR ENGLISH TEXT SUBTITLE = "1"

⇩ DECODE CAPABILITY FOR JAPANESE TEXT SUBTITLE = "1"

⇩ DECODE CAPABILITY FOR ARABIC TEXT SUBTITLE = "1"

● RENDERING OF CHARACTER FONT: YES
● SUPPORT FOR LANGUAGE CHARACTERISTICS: NO

---> DECODE CAPABILITY FOR JAPANESE TEXT SUBTITLE = "0" BUT JAPANESE IS REGISTERED AS AN UNSUPPORTED LANGUAGE

● RENDERING OF CHARACTER FONT: YES
● SUPPORT FOR LANGUAGE CHARACTERISTICS: YES

---> DECODE CAPABILITY FOR JAPANESE TEXT SUBTITLE = "1"

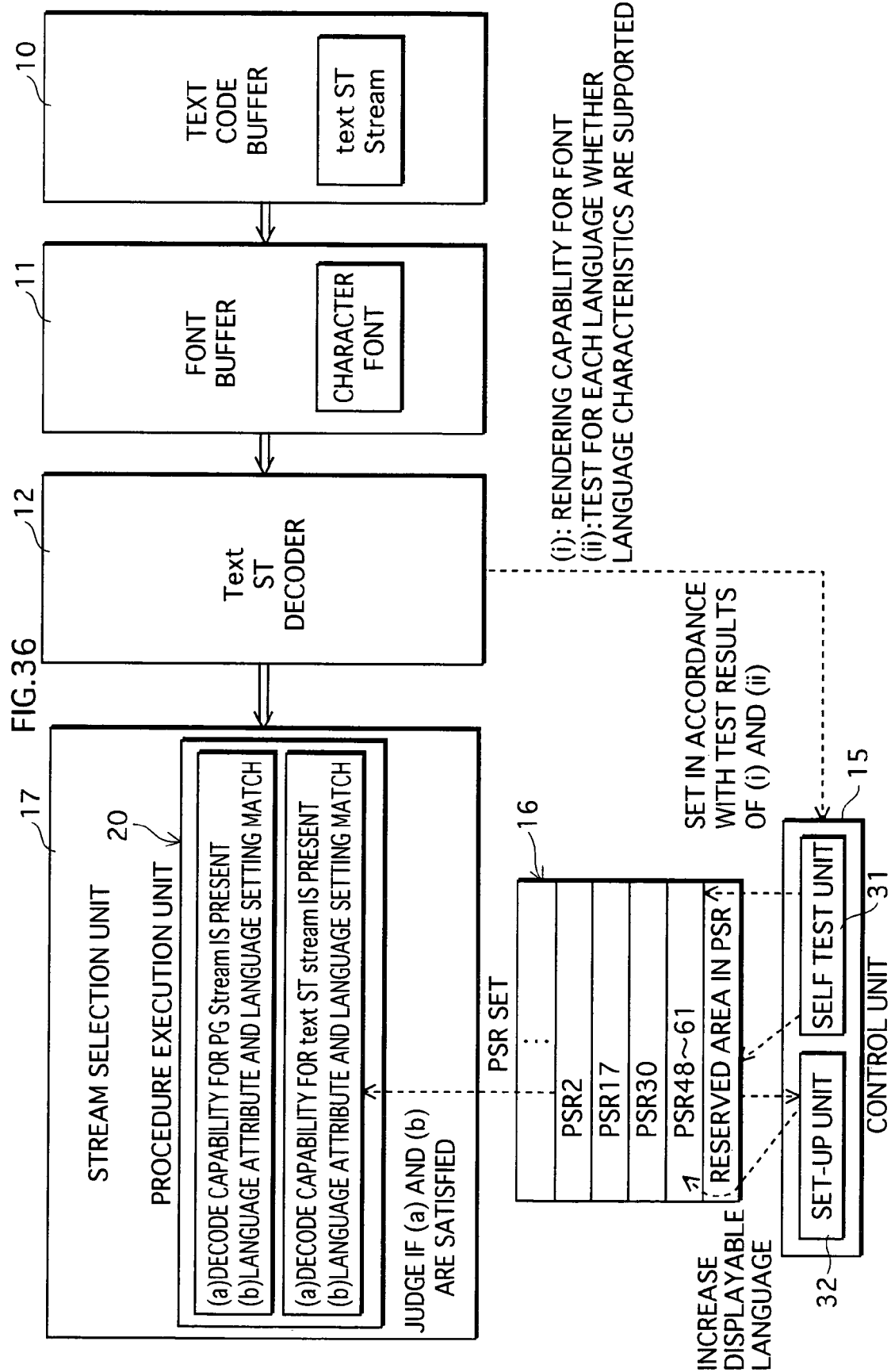

FIG.37

PSR30:Player Capability for Text Subtitle

| b30 | b29 | b28 | b27 | b26 | b25 | b24 |
|---|---|---|---|---|---|---|
| reserved ||||||||

| b23 | b22 | b21 | b20 | b19 | b18 | b17 | b16 |
|---|---|---|---|---|---|---|---|
| Unsupported Language Capability ||||||||

| b15 | b14 | b13 | b12 | b11 | b10 | b9 | b8 |
|---|---|---|---|---|---|---|---|
| Text subtitle capability(b15-b8) ||||||||

| b7 | b6 | b5 | b4 | b3 | b2 | b1 | b0 |
|---|---|---|---|---|---|---|---|
| Text subtitle capability(b7-b0) ||||||||

Text subtitle capability ··· 0000000000000000b:text subtitle incapable Player
1000000000000000b:text subtitle capable Player
Other:reserved Unsupported Language Capability ··· 00000000b:Text subtitle which is not supported by this player is not allowed to select by user operation or Navigation Command.
10000000b:Text subtitle which is not supported by this player is allowed to select by user operation or Navigation Command.

CALL SET-UP MENU

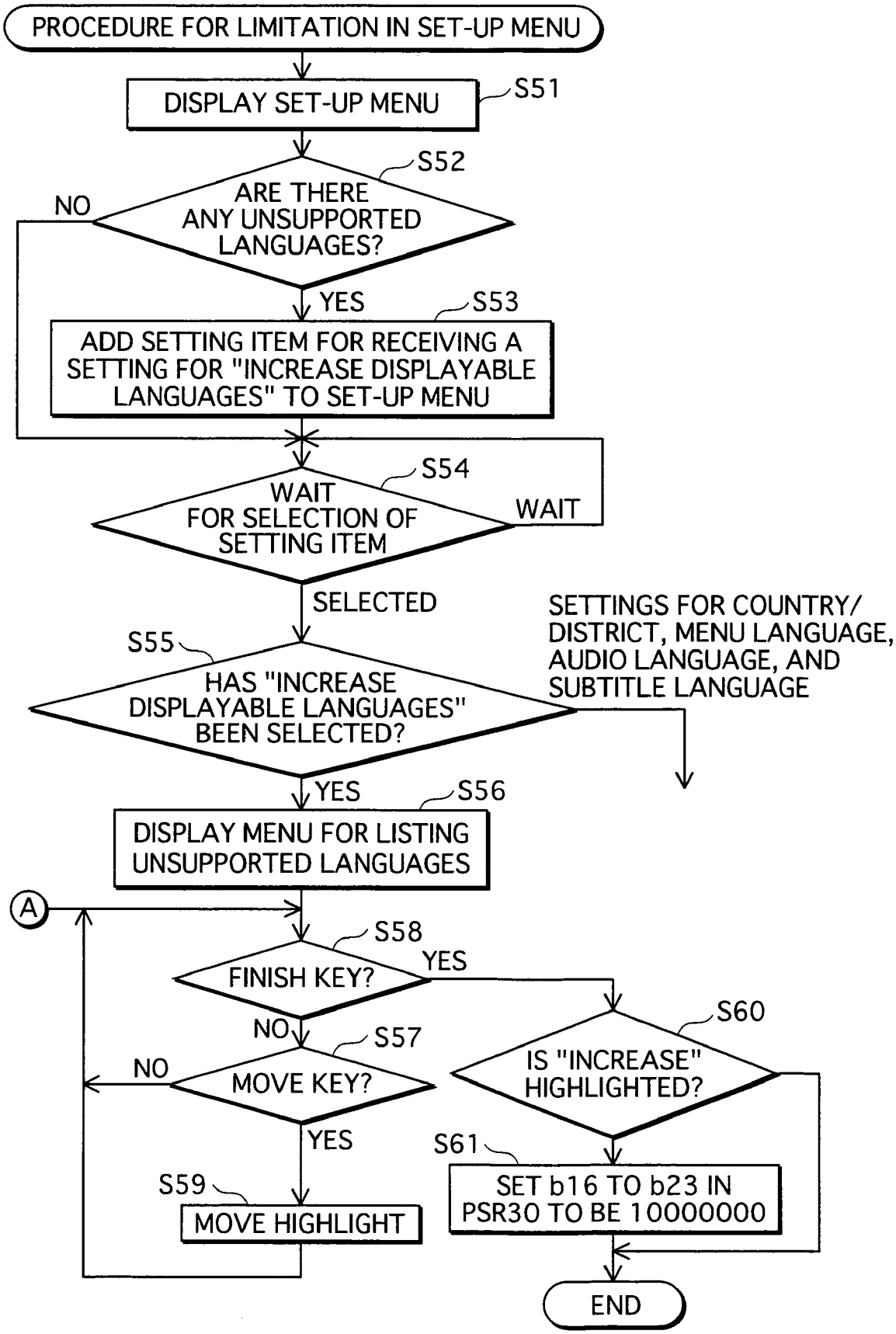

FIG.43A    RELATIVELY MORE STRICT QUALITY CONTROL

| RENDERING CAPABILITY FOR CHARACTER FONTS | 1 | 1 | 0 |
|---|---|---|---|
| SUPPORT FOR LANGUAGE CHARACTERISTICS | 1 | 0 | 0 |
| DECODE CAPABILITY FOR TEXT SUBTITLES | 1 | 0 | 0 |

FIG.43B    RELATIVELY LESS STRICT QUALITY CONTROL

| RENDERING CAPABILITY FOR CHARACTER FONTS | 1 | 1 | 0 |
|---|---|---|---|
| SUPPORT FOR LANGUAGE CHARACTERISTICS | 1 | 0 | 0 |
| DECODE CAPABILITY FOR TEXT SUBTITLES | 1 | 1 | 0 |

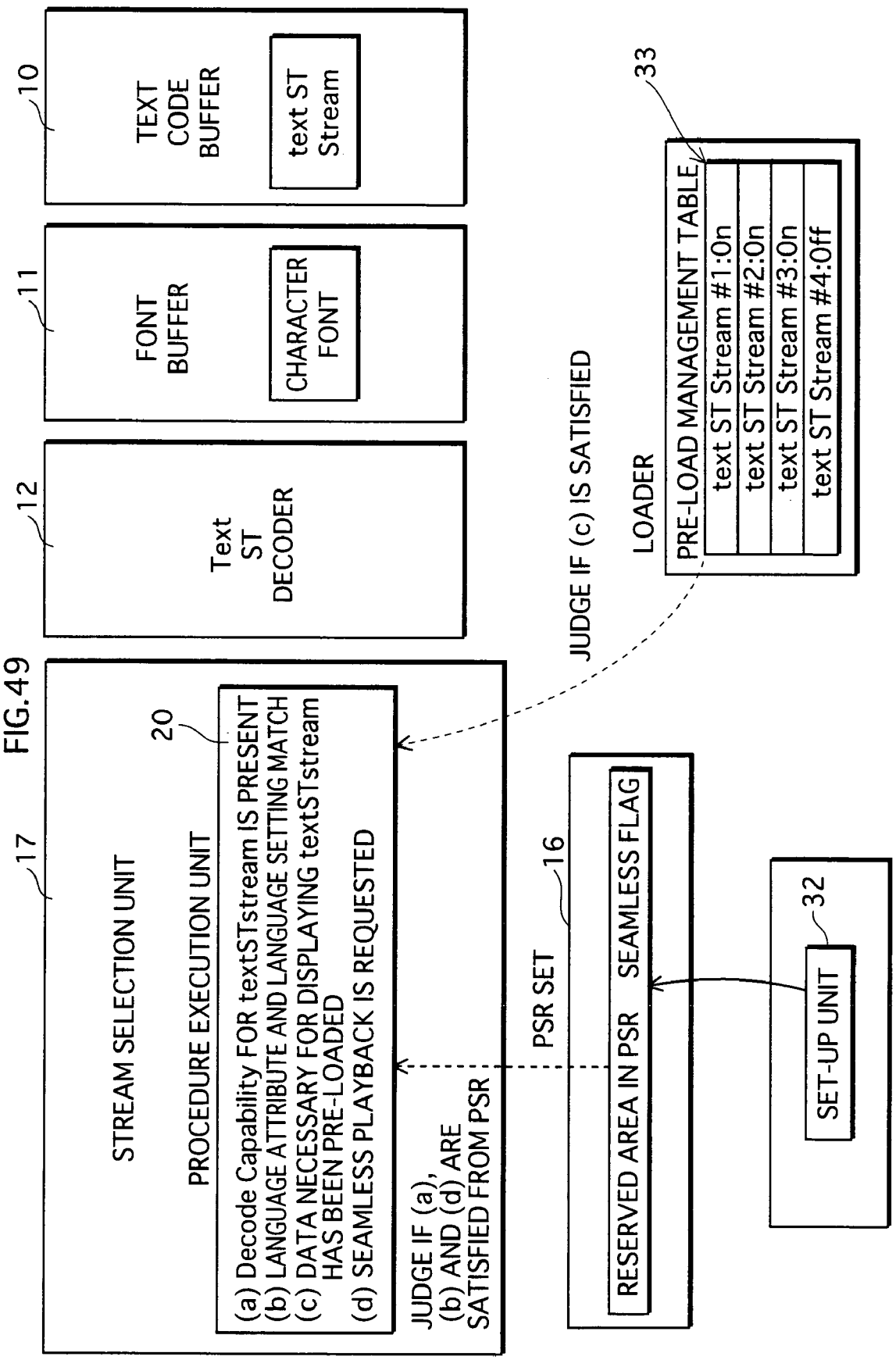

FIG.50

| SEAMLESS FLAG | MEANING |
|---|---|
| ON | SWITCHING TO UNPRE-LOADED STREAM IS PROHIBITED. SWITCHING TO ONE OF STREAMS MULTIPLEXED ON MAINPATH STREAM AND PRE-LOADED STREAMS IS PERMITTED. |
| OFF | SWITCHING TO UNPRE-LOADED STREAM IS PERMITTED. READING OF DATA INTO BUFFER THAT CAUSES PLAYBACK INTERRUPTION OF AV STREAM IS PERMITTED. |

RESERVED AREA IN PSR

PRIORITIZE SEAMLESS PLAYBACK

PRIORITIZE SWITCHING SUBTITLES

WHEN CAPACITY OF FONT BUFFER IS INSUFFICIENT, READING OF FONT DATA STARTS AT THIS POINT IN TIME

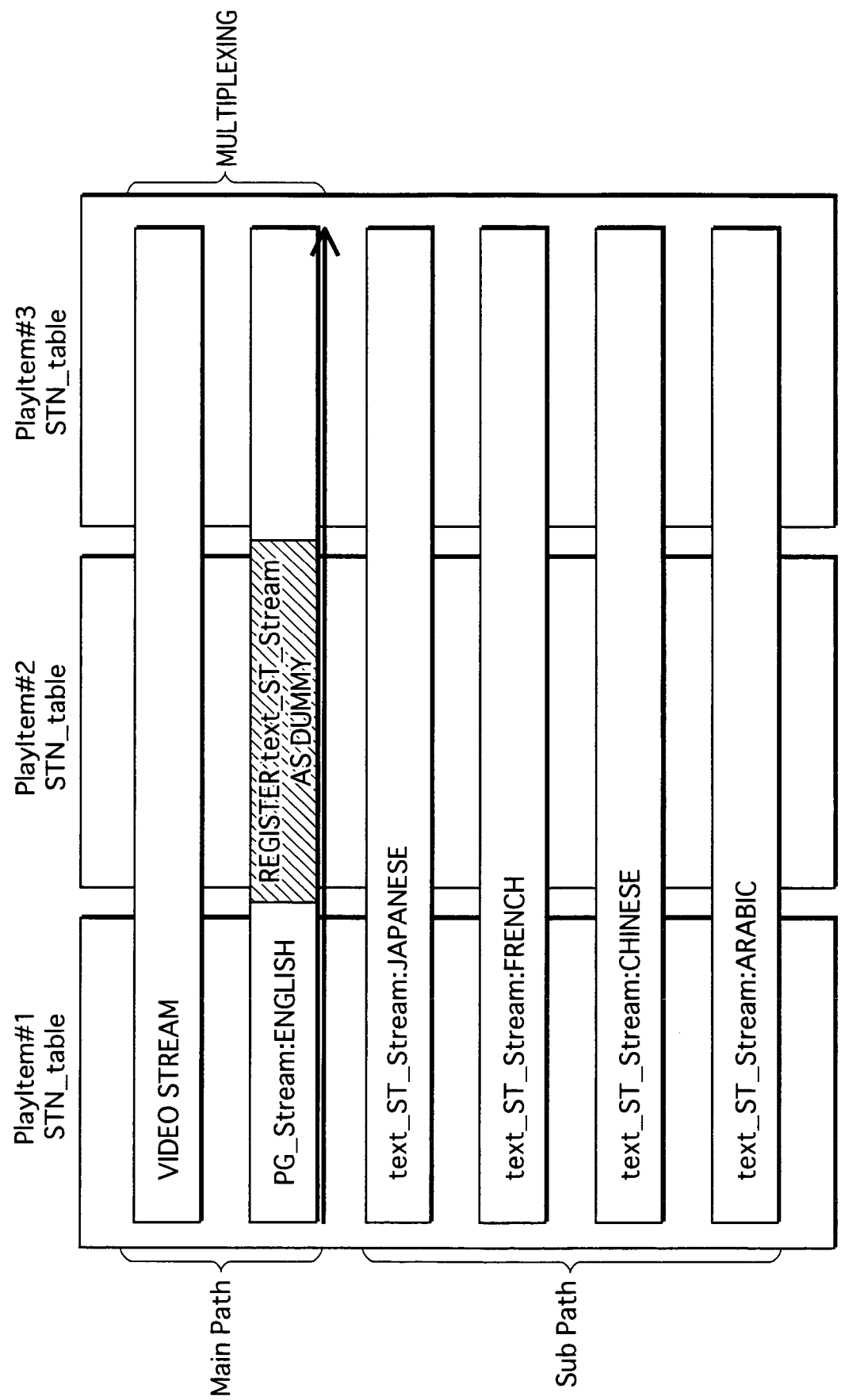

US 7,519,278 B2

PLAYBACK APPARATUS, PROGRAM, PLAYBACK METHOD

BACKGROUND OF THE INVENTION

1. Field of the Invention

The present invention relates to a field of technique for displaying text subtitles.

2. Description of the Related Art

Displaying text subtitles uses a technique for displaying subtitles expressed with text codes in synchronization with display of pictures in a movie. This technique is one of t the techniques that are peculiar to playback apparatuses for BD-ROMs (Blu-ray Disc Read Only Memory).

A BD-ROM playback apparatus expands codes constituting a subtitle to a bit map using fonts and performs control so that the bit map is displayed in synchronization with display of pictures in a video stream.

Generating subtitles with code sequences makes it easy to create subtitles. Thus, it is possible to create subtitles in some minority languages for which movie subtitles have not been available conventionally. Consequently, since the range of representation with subtitles for movies becomes wider, it is possible to enhance added value to each movie production.

SUMMARY OF THE INVENTION

Text subtitles require a processing of-expanding code sequences to bit positions during playback of video streams. In addition, it is necessary to have the code sequences that constitute the subtitles and fonts for expanding the code sequences stored in a memory. Thus, more unstable factors are involved than in the case of bit map expansion realized in DVDs.

Since there may be some inconvenience experienced in displays due to such unstable factors, some manufacturing companies who have a high standard of quality assurance may wish to limit the number of languages in which subtitles are displayable because it is hard for them to assure the quality of subtitles displays.

However, since BD-ROM play back apparatuses inherently have a potential capability for displaying subtitles in a large number of languages like browsing software for WWW sites, attractiveness of BD-ROM playback apparatuses is decreased by limitation of the number of languages in which subtitles are displayable due to the quality assurance concerns. This situation is not desirable for people who have been developing the standards of BD-ROMs and trying to spread BD-ROM playback apparatuses worldwide. Those people who have been developing the standards of BD-ROMs get caught between requests from users who want to enjoy subtitle displays in many languages and realistic demand of manufacturing companies who want to maintain the level of quality assurance related to displays of text subtitle as well.

The present invention aims to provide playback apparatuses that harmoniously accommodate the requests from users who want to enjoy subtitle displays in many languages and the realistic demand of manufacturing companies who want to maintain the level of quality assurance related to displays of text subtitle as well.

In order to achieve the aim, the present invention provides a playback apparatus that plays back a text subtitle stream corresponding to a predetermined language and being selected from a plurality of text subtitle streams during a playback of moving pictures, the playback apparatus comprising: a storing unit storing therein an identifier of a language that is eliminated from selection options because inconvenience is caused during the playback, as a supplementary language; an inquiry unit operable to inquire of a user whether the user wishes to increase a number of languages in which subtitles are displayable even if inconvenience may be caused; and a selection unit operable to select, in a case where the user performs an affirmative operation in response to the inquiry by the inquiry unit, a text subtitle stream corresponding to the supplementary language from the plurality of text subtitle streams. With this arrangement, the playback apparatus displays text subtitle streams in some languages that may cause inconvenience in displays. Thus, the users are able to have the text subtitles displayed even in those languages in which inconvenience may be caused, after acknowledging the possibility that the subtitle displays may have some inconvenience. Since the subtitles are displayed in some languages in which inconvenience may be caused with self-responsibility of the users, it is possible to harmoniously cater to both the users and the manufacturing companies.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 8A shows an internal structure of an STN_Table;

FIG. 8B shows a set of an entry and an attribute corresponding to a PG stream;

FIG. 8C shows a set of an entry and an attribute corresponding to a text subtitle stream;

FIG. 18 shows values stored in PSR53, among PSRs 48 to 61;

FIG. 19 shows the meanings of textST_language_codes;

FIG. 21 shows correspondence among a PSR number, a bit position, and a textST_language_code in each of PSRs 48 to 61;

FIGS. 26A, 26B, and 26C show specific examples of text subtitle stream selections;

FIGS. 27A, 27B, and 27C show specific examples of text subtitle stream selections;

FIG. 29 shows an internal configuration of a text subtitle stream;

FIG. 33A explains the differences in layouts due to language characteristics of the Japanese language;

FIG. 33B shows a layout due to language characteristics of the Arabic language;

FIG. 34 shows judgment criteria for setting Decode Capabilities for three languages, namely, Japanese, English, and Arabic;

FIG. 36 shows an internal configuration of a playback apparatus of the third embodiment;

FIG. 37 shows bit assignments for b23 to b16 in PSR 30 according to the third embodiment;

FIG. 42 is a flow chart that shows a processing procedure performed by the set-up unit 32;

FIGS. 43A and 43B show, in comparison, settings of Decode capability for a case where the user does not wish to have displays in an unsupported language and in a case where the user wishes to;

FIG. 49 shows an internal configuration of a playback apparatus of the fifth embodiment;

FIG. 50 shows an example of a seamless flag provided in a reserved area of a PSR;

FIG. 51B shows state transitions in a case where the seamless flag is set to be on;

FIG. 68 shows that a digital stream has been selected whose PID is registered in an STN_Table as a dummy.

DESCRIPTION OF THE PREFERRED EMBODIMENT

Figure 1:
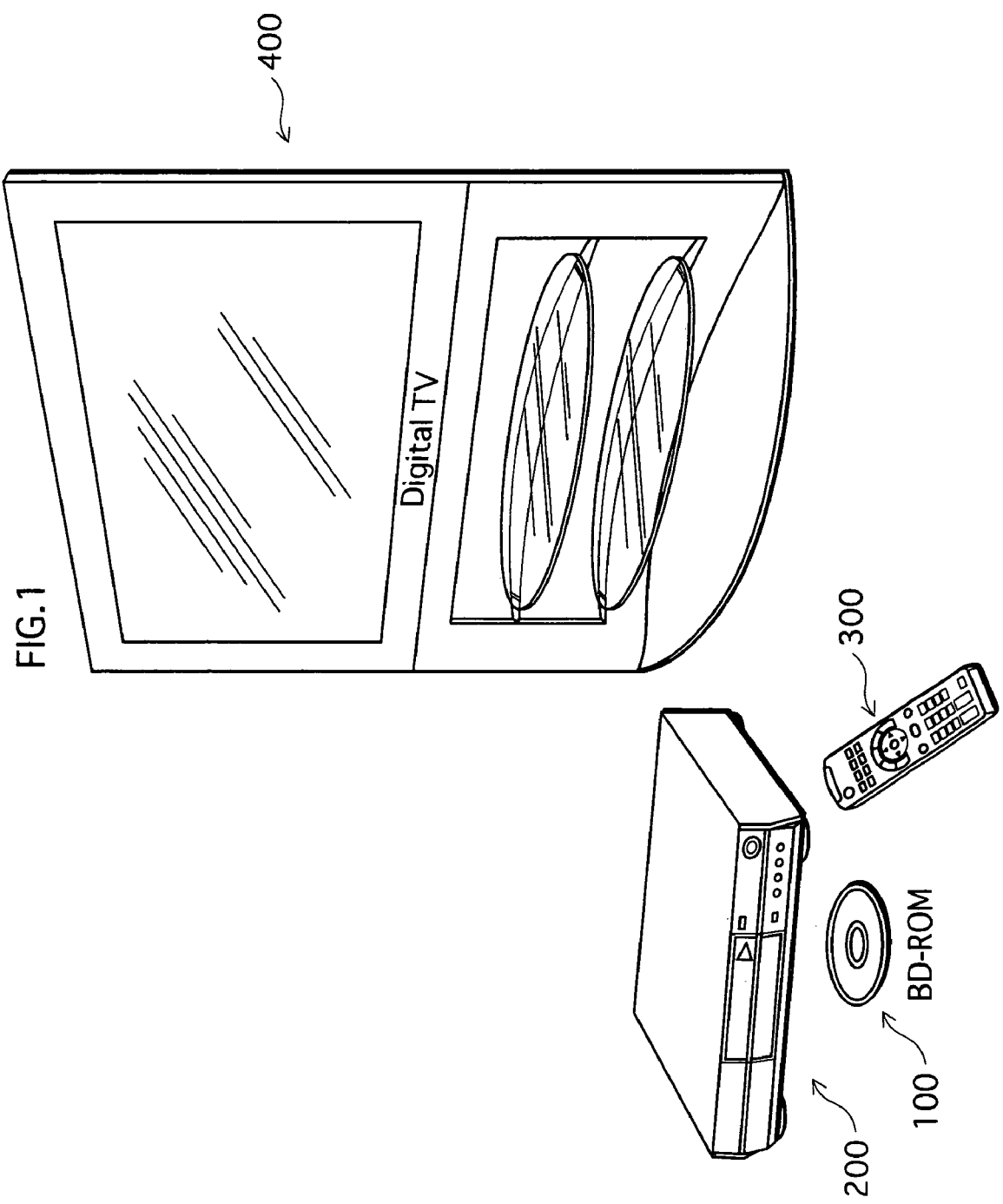
FIG. 1 shows a form of use of a playback apparatus of the present invention.

The following describes an embodiment of a recording medium according to the present invention. At first, a form of use out of the forms of the implementation of a playback apparatus pertaining to the present invention is described. FIG. 1 shows a form of use of a playback apparatus of the present invention. In FIG. 1, the playback apparatus of the present invention is shown as a playback apparatus 200. The playback apparatus 200 serves to supply movie productions to a home theater system including a remote controller 300 and a TV 400.

Figure 2:
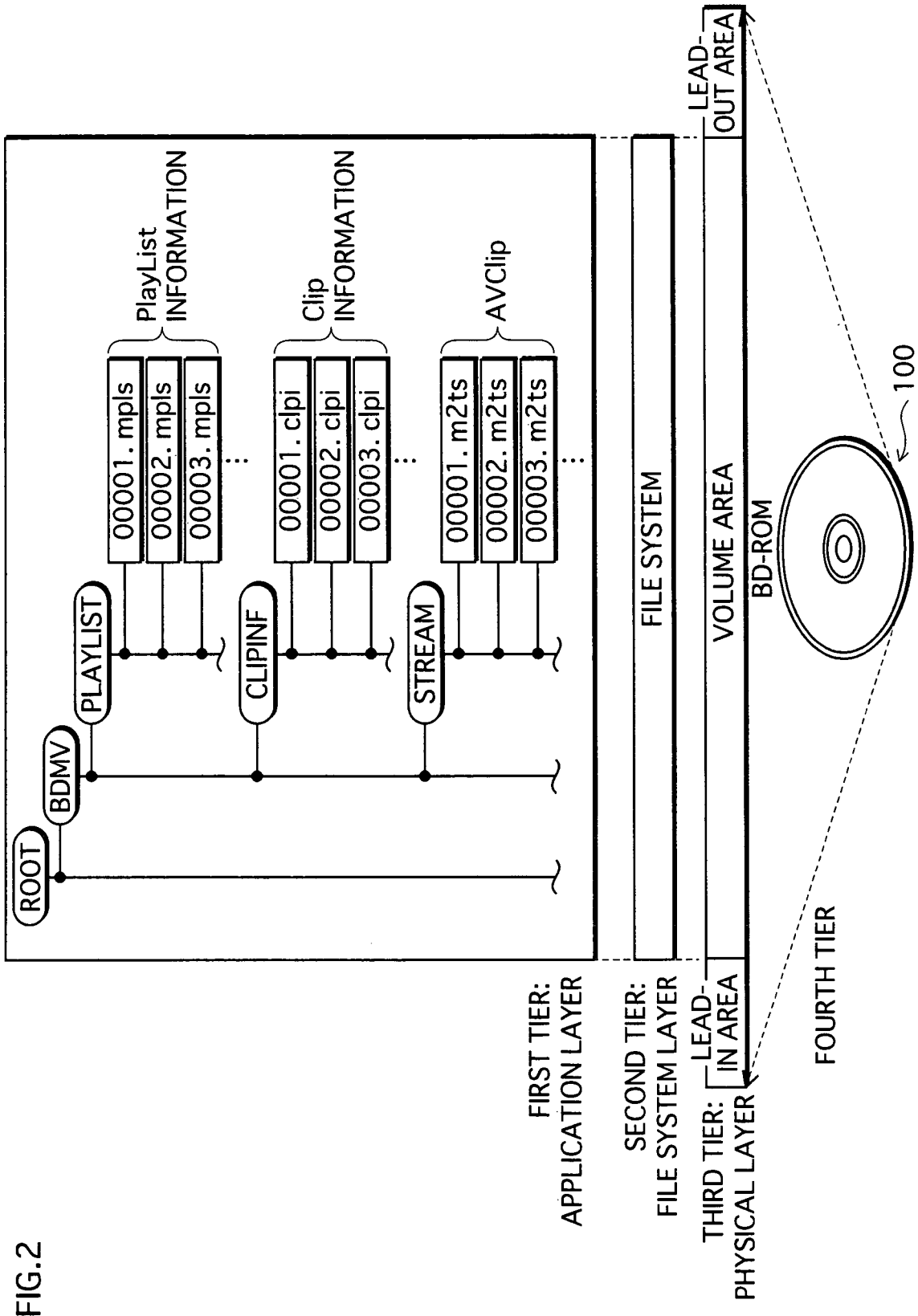
FIG. 2 is an internal configuration of a BD-ROM.

Thus completes the description of a form of use of the playback apparatus according to the present invention. The following describes a recording medium being a target of a playback processing performed by the playback apparatus of the present invention. ABD-ROM is to be played back by the playback apparatus of the present invention. FIG. 2 shows an internal configuration of a BD-ROM.

The BD-ROM is shown at the fourth tier in FIG. 2, while a track on the BD-ROM is shown at the third tier. The track depicted in FIG. 2 results from a track spiraling from the inner circumference to the outer circumference of the BD-ROM having been drawn out to the sides. This track consists of a lead-in area, a volume area, and a lead-out area. The volume area in FIG. 2 has a layered structure made up of a physical layer, a file system layer, and an application layer. Expressing the application format of the BD-ROM using a directory structure gives the first tier in FIG. 2. As shown at the first tier, a BDMV directory is placed below a ROOT directory in the BD-ROM.

Under the BDMV directory exist four subdirectories known as a PLAYLIST directory, a CLIPINF directory, a STREAM directory, and a BDJA directory.

The STREAM directory stores files forming the main digital stream. In this directory exist files (00001.m2ts to 00003.m2ts) to each of which the extension "mt2s" is assigned.

In the PLAYLIST directory exist files (00001.mpls to 00003. mpls) to each of which the extension "mpls" is assigned.

In the CLIPNF directory exist files (00001.clpi to 00003.clpi) to each of which the extension "clpi" is assigned. These files are described next.

<AVClips>

Figure 3:
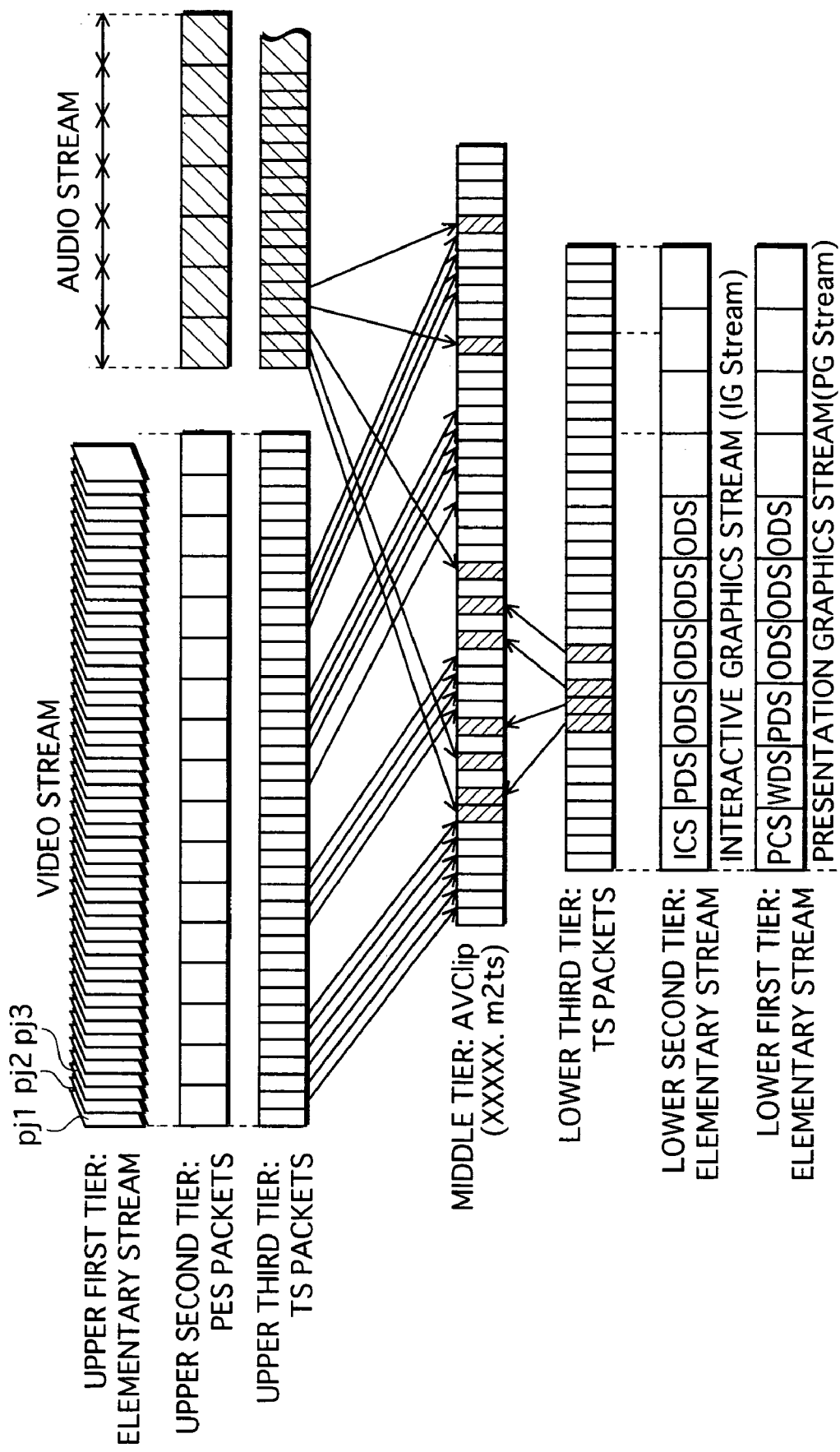
FIG. 3 schematically shows how a file to which an extension .m2ts is appended is configured.

The files with the extension "m2ts" are described firstly; FIG. 3 schematically shows how each of the files with the extension "m2ts" is structured. Each of the files with the extension "m2ts" (00001.m2ts, 00002.m2ts, 00003. m2ts . . . ) stores therein an AVClip. The AVClip (middle tier) is constituted by multiplexing TS packets resulting from the conversion of a video stream composed of a plurality of video frames (pictures pj1, pj2, pj3) and an audio stream composed of a plurality of audio frames (the upper 1 st tier) firstly to PES packets (the upper 2 nd tier) and then to TS packets (the upper 3 rd tier) and the conversion of a subtitle presentation graphics stream (PG stream at the lower 1 st tier) and a dialogue interactive graphics stream (IG stream at the lower 2 nd tier) to TS packets (the lower 3 rd tier) in the same manner.

The presentation graphics stream is a graphics stream that constitutes a subtitle in each language.

The IG stream is a graphics stream for realizing interactive control and includes graphics data for forming GUI parts such as a menu and buttons and commands (button commands) to be executed by the playback apparatus when the buttons are pushed.

Among AVClips, some streams that involve multiplexing, as the one shown in FIG. 3, are called MainClips. Other streams do not involve multiplexing. Such AVClips are called SubClips. AVClips includes ones that form an audio stream, a PG stream, and a text subtitle stream (hereafter, simply referred to as Text ST Stream).

<Clip Information>

The file with the extension "clpi" (00001.clpi) includes pieces of clip information that are in one-to-one correspondence with AVClips. Clip information, being management information, contains information such as the encoding format, frame rate, bit rate and resolution etc. of streams in the AVClips and an EP_map showing a plurality of entry positions in the corresponding streams.

<PlayList Information>

Figure 4:
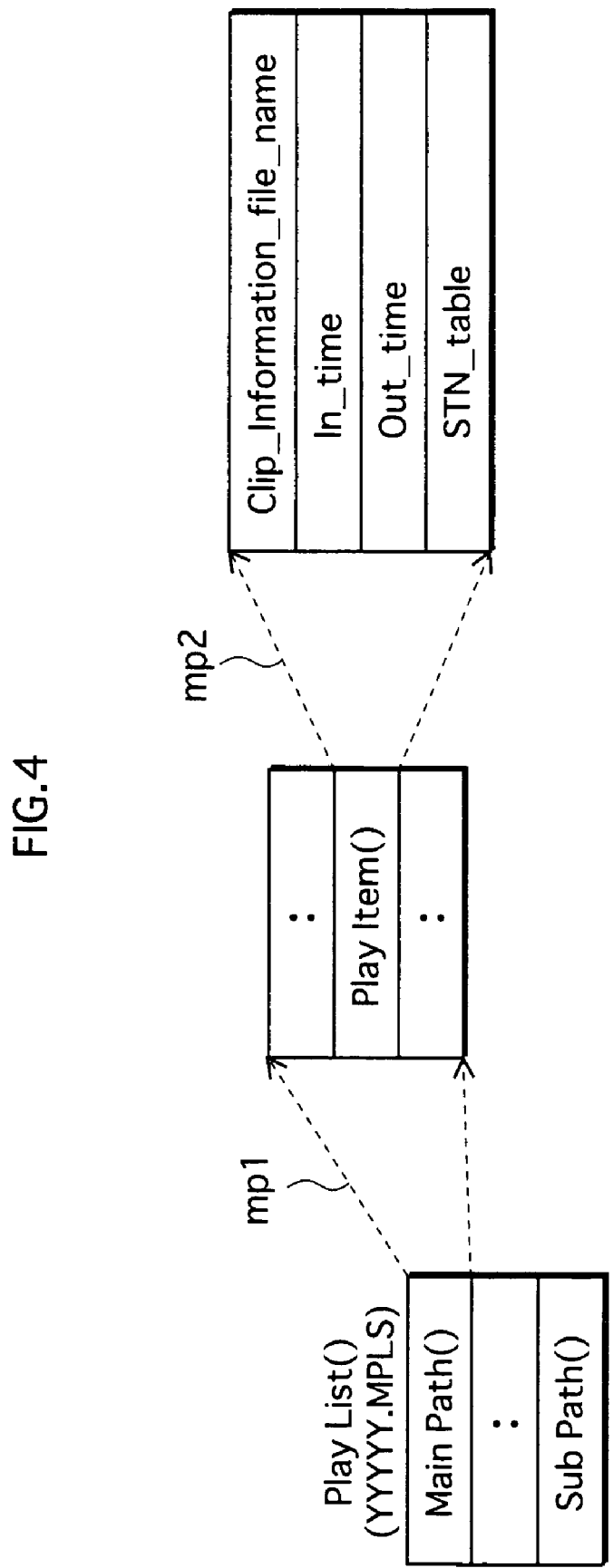
FIG. 4 shows a data structure of PlayList information.

The file with the extension "mpls" (00001.mpls) stores therein PlayList (PL) information. The PlayList information defines a bundle made up of two types of playback paths called a MainPath and a Subpath as a PlayList (PL). FIG. 4 shows the data structure of PlayList information, which, as shown in the drawing, is constituted with MainPath information (MainPath( ) for defining a MainPath, and Subpath information (Subpath()) for defining a Subpath.

A MainPath is a playback path defined on a main AVClip, whereas a Subpath is a playback path defined on a SubClip.

Detailed Description of Playlist Information <1>

<MainPath>

Firstly, a MainPath will be described. A MainPath is a playback path defined for a video stream or an audio stream constituting a main video.

A MainPath is defined with a plurality of pieces of PlayItem information ( . . . PlayItem ( ) . . . ), as shown with the arrow mp1. The PlayItem information defines one or more logical playback sections that constitute the MainPath. The configuration of the PlayItem information is shown in a close-up with the leader mp2. As shown with this leader, the PlayItem information is composed of a "Clip_Information_file_name" showing a file name for playback section information of an AVClip to which an IN point and an OUT point of the playback section belongs, "IN_time" which is time information indicating a starting point of the playback section, and "OUT_time" which is time information indicating an ending point of the playback section, and an "STN_Table" showing the ones that are playable out of elementary streams multiplexed onto AVClips and SubClips.

Figure 5:
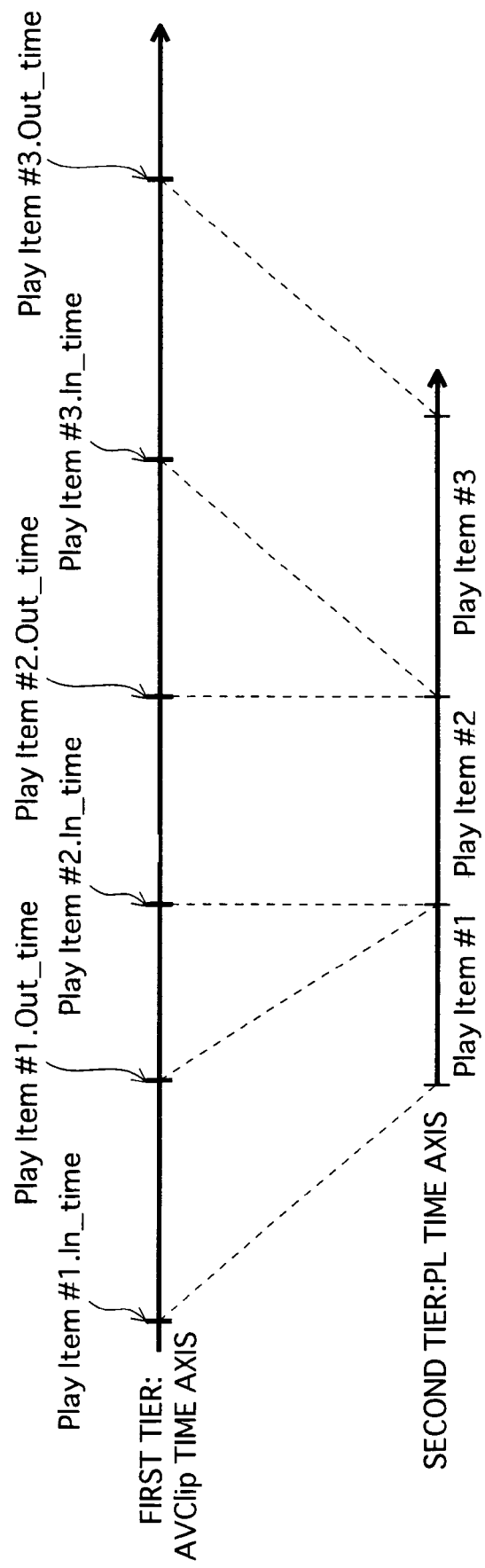
FIG. 5 shows the relation between an AVClip and a PL.

FIG. 5 shows the relation between an AVClip and PlayList information. The 1 st tier shows the time axis of the AVClip, while the 2 nd tier shows the time axis of the PlayList information. The PlayList information includes three pieces of PlayItem information (PlayItems #1, #2, and #3). Three playback sections are defined by the In_times and Out_times of PlayItems #1, #2 and #3. A time axis different from the AVClip time axis is defined when these playback sections are lined up. This is the PL time axis shown at the 2 nd tier. Defining a different time axis to the AVClip is thus enabled by the definitions in the PlayItem information.

Detailed Description of PlayList Information <2>

<Subpath>

Whereas a MainPath is a playback path defined on a video stream or an audio stream constituting a main video, a Subpath is a playback path defined on a subtitle stream or an audio stream to be synchronized with a MainPath.

In a MainPath, a video stream constituting a main video forms one stream obtained by multiplexing with a related audio stream and the like. Since streams that are necessary in order to generate BD contents are recognizable in advance, all the streams to be played back in synchronization are multiplexed together to form one stream. In contrast, a Subpath is a stream that does not get multiplexed but needs to be played back in synchronization, such as a subtitle stream having been downloaded. For example, when a movie production is to be distributed to various areas of the world, people who are in charge of authoring may wish to add a Japanese language subtitle to BD-ROMs shipped for Japan, although the BD-ROMs shipped for European and American countries only have an English language subtitle. However, taking a trouble of generating a stream that constitutes a Japanese subtitle and multiplexing the stream onto a video stream will cost too much.

As for BD-ROMs, with the use of SubPath information, it is possible to add, as a Subpath, a subtitle stream that constitutes a Japanese subtitle to a Main path. One of the advantageous features of the Subpath is to make it possible to create a Japanese language version.

Figure 6:
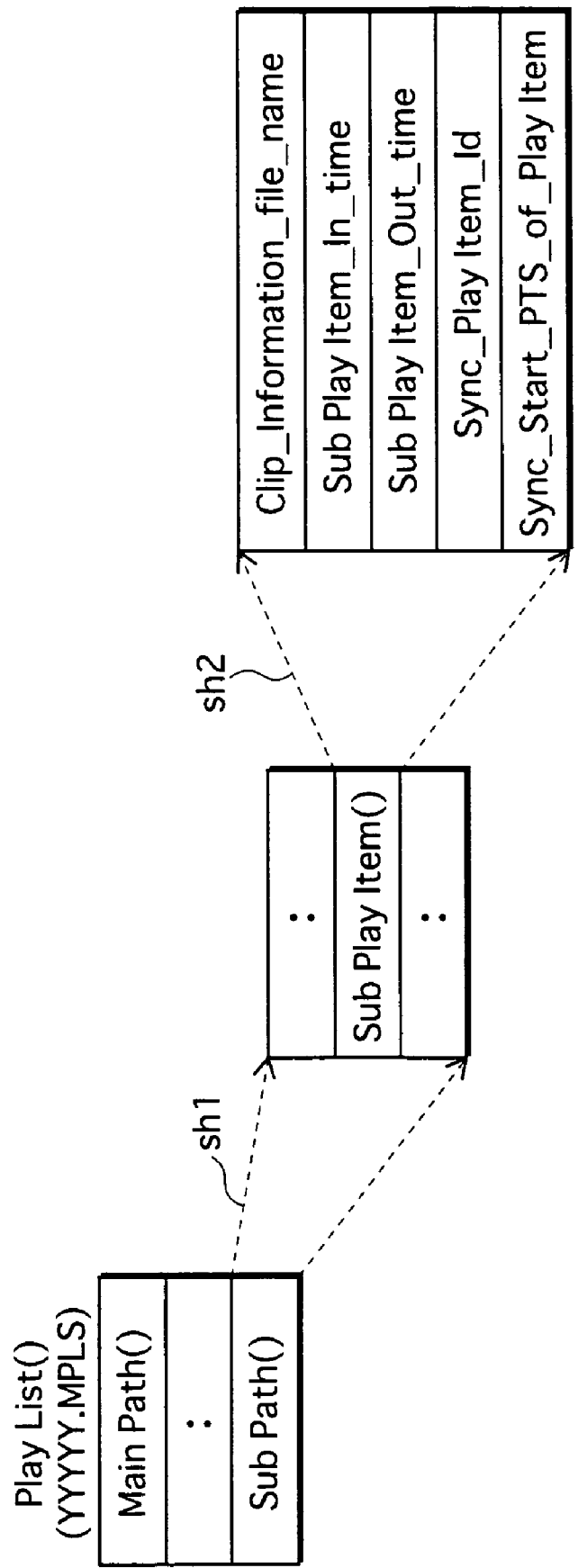
FIG. 6 is a close-up of an internal configuration of Subpath information.

FIG. 6 is a close-up of an internal configuration of Subpath information. As shown with the arrows sh1, each Subpath is composed of one or more pieces of SubPlayItem information ( . . . SubPlayItem ( ) . . .). Each piece of SubPlayItem information is composed of, as shown with the arrows sh2, a "Clip_information_file_name", a "SubPlayItem_In_time", a "SubPlayItem_Out_time", a "sync_PlayItem_id", and a "sync_start_PTS_of_PlayItem".

The "Clip_information_file_name" is information that uniquely identifies a SubClip that corresponds to a SubPlayItem by describing a file name for Clip information.

The "SubPlayItem_In_time" is information that indicates a starting point of a SubPlayItem on a playback time axis of a SubClip.

The "SubPlayItem_Out_time" is information that indicates an ending point of a SubPlayItem on a playback time axis of a SubClip.

The "sync_PlayItem_id" is information that uniquely identifies a PlayItem with which the SubPlayItem needs to be synchronized, out of PlayItems constituting a MainPath. The. "SubPlayItem_In_time" exists on a playback time axis of the PlayItem identified with this "sync_PlayItem_id".

The "sync_start_PTS_of_PlayItem" indicates where a starting point of the SubPlayItem identified with the "SubPlayItem_In_time" exists on the playback time axis of the PlayItem identified with the "sync_PlayItem_id". While the SubPlayItem is being played back, when a current playback point in time has reached the point in time specified with the "sync_start_PTS_of_PlayItem", the playback with the SubPlayItem is started. In order to make a Subpath synchronize with a MainPath, a "sync_start_PTS_of_PlayItem" is used to specify which point in time in the Mainpath is aligned with the playback starting time on the SubPath. For example, a "sync_start_PTS_of_PlayItem" is used to provide specification so that the playback of a stream identified with a SubPath is started at a position 300 seconds past the start of the playback on the MainPath. On the playback apparatus side, a clock counter transfers, at appropriate timing, the stream that constitutes the Mainpath and the stream that constitutes the Subpath to the demultiplexing unit. Since the clock counter clocks a current time based on a time clocked by a clock generator with the same time precision level, it is possible to synchronize, with a high precision level, the playback of the MainPath information with the playback of the SubPath information with the use of the specification by the "sync_start_PTS_of_PlayItem" as described above.

Figure 7:
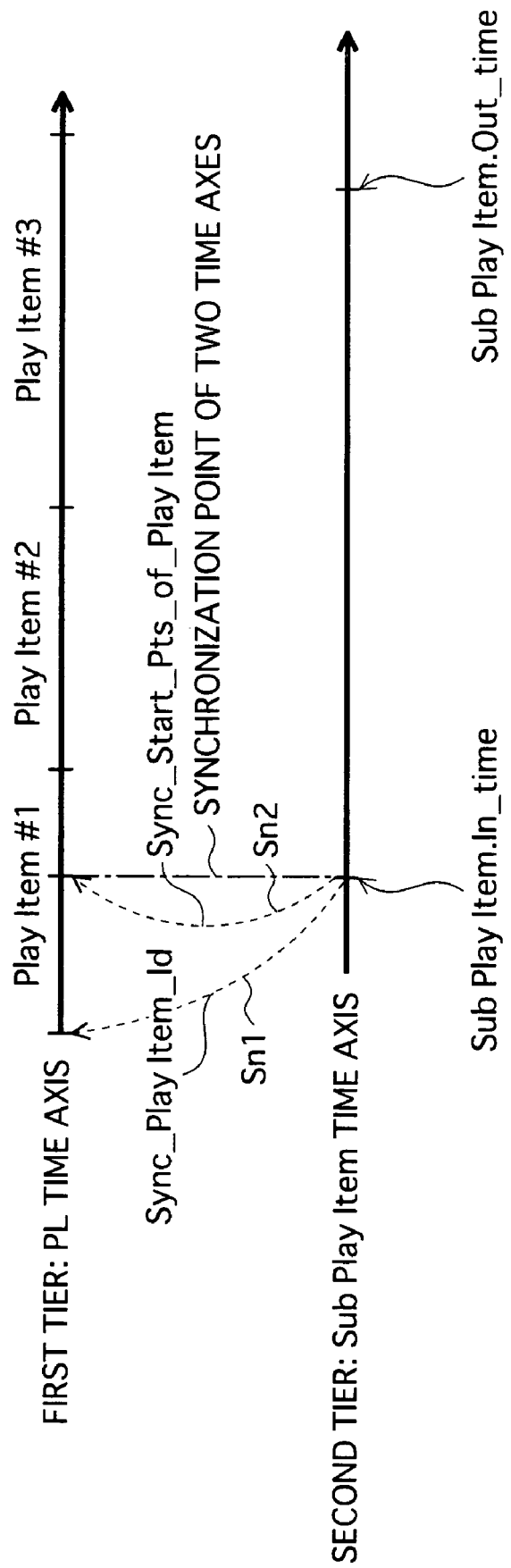
FIG. 7 shows playback section definition and synchronization specification on a SubPlayItem time axis.

FIG. 7 shows playback section definition and synchronization specification on a SubPlayItem time axis. In the drawing, the 1 st tier shows the PL time axis, while the 2 nd tier shows the SubPlayItem time axis. The SubPlayItem. IN_time shows the starting point of the playback section, while the SubPlayItem.Out_time shows the ending point of the playback section. Thus, it is apparent that a playback section is also defined on the SubPlayItem time axis. The Sync_PlayItem_Id indicated by the arrow Sn1 shows the synchronization specification on a PlayItem, while the sync_start_PTS_of_PlayItem indicated by the arrow Sn2 shows the specification of a point in time in the PlayItem on the PL time axis.

When a current playback point in time on the playback time axis of the PlayItem has reached the point in time specified with the sync_start_PTS_of PlayItem, a portion of the Sub-Clip (a text subtitle stream) specified with the "Clip_Information_file_name" from the SubPlayItem_In_time to the SubPlayItem_Out_time is to be played back. With this arrangement of playback, a portion of the text subtitle stream specified with the SubPlayItem_In_time and the SubPlayItem_Out_time is to be played back in synchronization with an AVClip. Thus completes the description of Subpaths.

In relation to the configuration of the PlayItem information described above, the STN_Table is an indispensable element in embodiments of the present invention. The following describes in detail the STN_Table.

Detailed Description of PlayList Information <3>

<STN_Table>

The STN_Table is a table that shows which ones are playable out of a plurality of elementary streams multiplexed onto an AVClip specified by a Clip_Information_file_name of a Play Item and a plurality of elementary streams within a SubClip specified by a Clip_Information_file_name of a SubPlayItem. To be more specific, the STN_Table is configured so that an entry for each of the plurality of elementary streams is brought into correspondence with an attribute. Here, a "playable elementary stream" basically refers to an elementary stream multiplexed on an AVClip specified by a PlayItem; however, not only such an elementary stream but also an elementary stream (e.g. a text subtitle stream) that is recorded separately from the AVClip and is to be played back together with such an elementary stream is also regarded as a "playable elementary stream".

FIG. 8A shows an internal configuration of an STN_Table. As shown in the drawing, the STN_Table has a data structure so as to include a plurality of sets each made up of an entry and an attribute ("entry-attribute") and to indicate the number of the sets made up of entries and attributes (i.e. number_of_video_stream_entries;

number_of_audio_stream_entries;

number_of_PG_textST_stream_entries; and number_of_IG_stream_entries).

As indicated with the symbol "{" in the drawing, the sets each made up of an entry and an attribute respectively correspond to a video stream, audio streams, PG streams, text subtitle streams, IG streams, each of which is playable.

The following describes in detail entry-attribute sets. FIG. 8B and FIG. 8C show the details of entry-attribute sets.

FIG. 8B shows an entry-attribute set that corresponds to a PG stream. An entry for a PG stream includes a "ref_to_stream_PID_of_mainClip" that indicates a PID used for extracting the PG stream when the AVClip is demultiplexed.

An attribute for a PG stream is made up of a "stream_coding_type" that is set at 0×90 and indicates a codec of the PG stream and a "PG_language code" that indicates a language attribute of the corresponding PG stream. The "PG_language code" expresses the language attribute of the corresponding PG stream using a language code according to the ISO 639-2/T.

FIG. 8C shows an entry-attribute set that corresponds to a text subtitle stream (hereafter may be simply referred to as a textSTstream).

An entry for a text subtitle stream is made up of a "ref_to_subClip_entry_ID" that indicates an entry identifier of an AVClip storing the text subtitle stream, a "ref_to_subPath_ID" that indicates an ID of synchronization information, and "ref_to_stream_PID_of_subClip" that indicates a PID appended to the text subtitle stream.

An attribute for a text subtitle stream is made up of a "stream_coding_type" that is set at 0×92 and indicates a codec of the text subtitle stream, a "character code" that indicates a character code of the corresponding text subtitle stream, and a "textST_language_code" that indicates the language attribute of the corresponding text subtitle stream. The "textST_language_code" expresses the language attribute of the corresponding text subtitle stream using a language code according to the ISO 639-2/T.

Thus completes the description of the internal configuration of the STN_Table.

Detailed Description of PlayList Information <4>

Specific Example of PlayList Information

Figure 9:
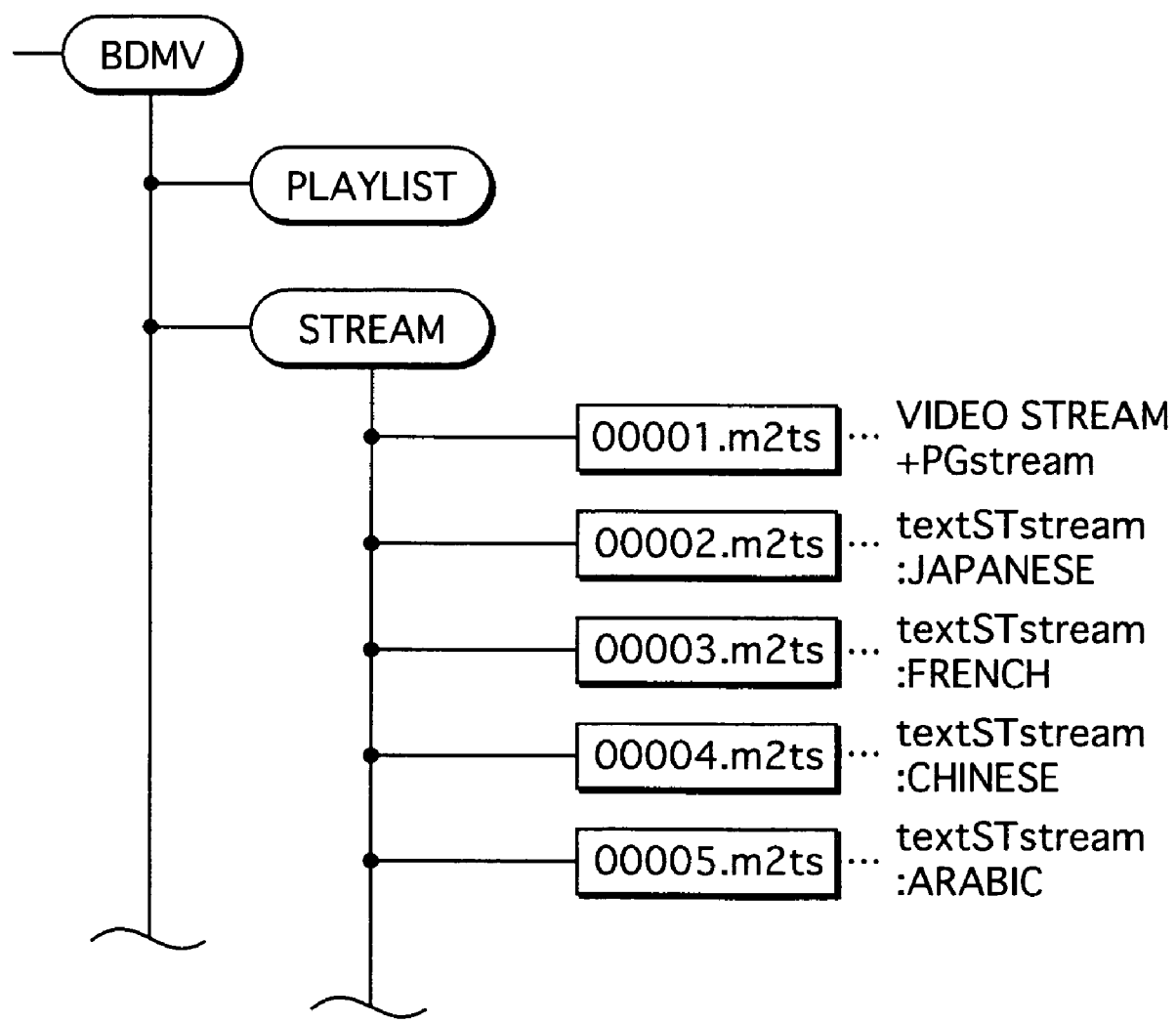
FIG. 9 shows examples of AVClips that are discussed in the first embodiment.
Figure 10:
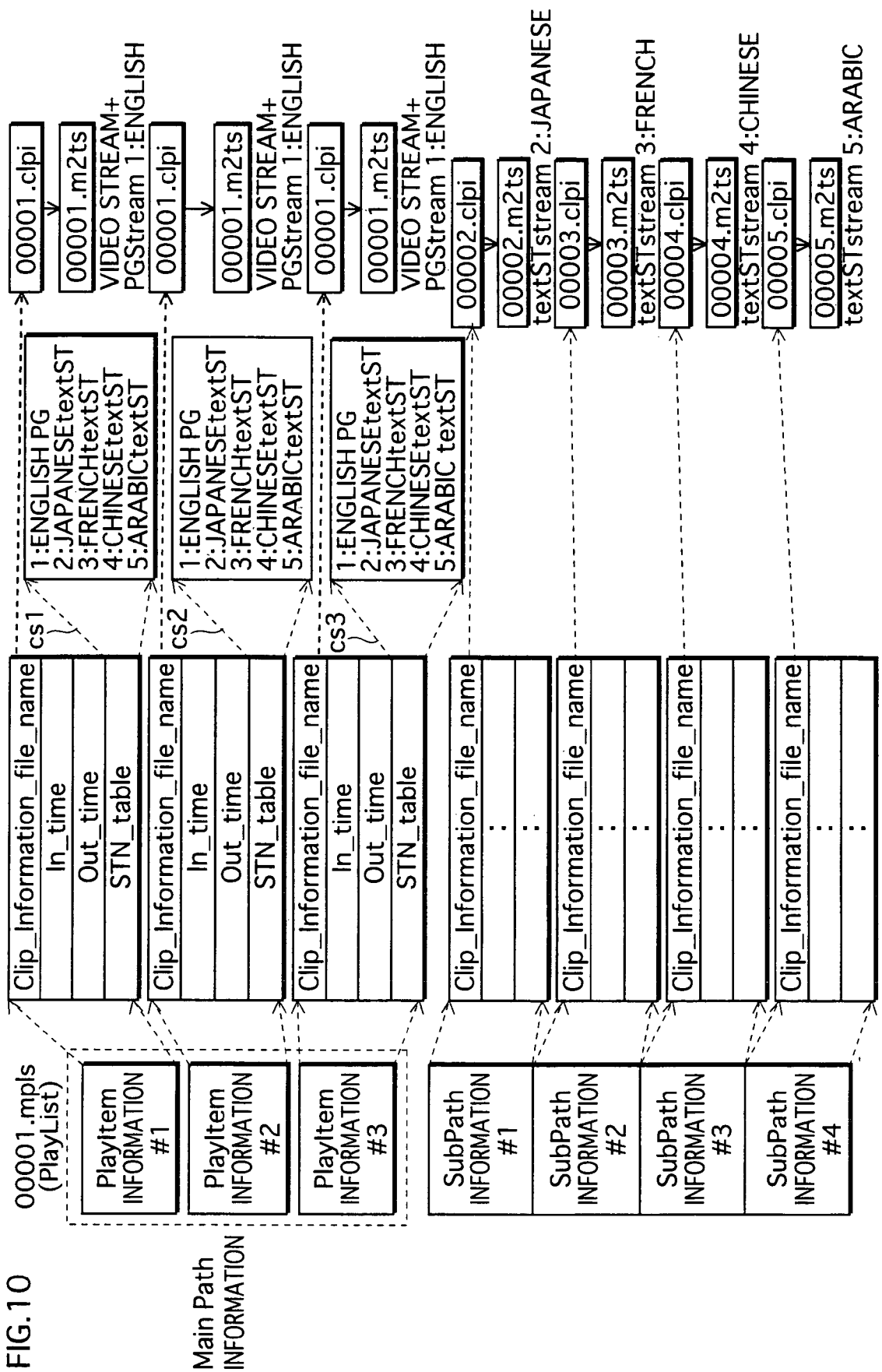
FIG. 10 shows an example of PlayList information that is discussed in the first embodiment.

The following describes a specific example of PlayList information, which is discussed in each embodiment. FIG. 9 shows examples of AVClips to be discussed in the first embodiment. FIG. 10 shows an example of PlayList information to be discussed in the first embodiment. The PlayList information discussed in the present embodiment is made up of three pieces of PlayItem information (PlayItem information #1 to #3) and four pieces of SubPath information (SubPath information #1 to #4). Out of these, the Clip_information_file_names of the four pieces of SubPath information indicate four pieces of Clip information that are different from one another.

In a case where, of these four pieces of Clip information, the AVClip which corresponds to the SubPath information #1 is a text subtitle stream in the Japanese language, the AVClip which corresponds to the SubPath information #2 is a text subtitle stream in the French language, the AVClip which corresponds to the SubPath information #3 is a text subtitle stream in the Chinese language, the AVClip which corresponds to the SubPath information #4 is a text subtitle stream in the Arabic language, each of these text subtitle streams is to be played back together with a MainPath, as SubPath information. The three pieces of PlayItem information in the MainPath are the same as the ones shown in FIG. 5 and constitute a PlayList time axis. A file for Clip information is written as the Clip_information_file_name in the PlayItem information. The Clip information corresponds to an AVClip on which a video stream and a PG stream are multiplexed.

The leaders cs1, cs2, and cs3 in the drawing close up the configuration of the STN_Tables for the PlayItem information #1 to #3. As shown with these leaders, the PIDs of the PG stream multiplexed onto the AVClip and the text subtitle streams specified by the pieces of SubPath information are written in the STN_Tables. As a result, text subtitle streams in five languages, namely 1: English, 2: Japanese, 3: French, 4: Chinese, and 5: Arabic are playable.

Figure 11:
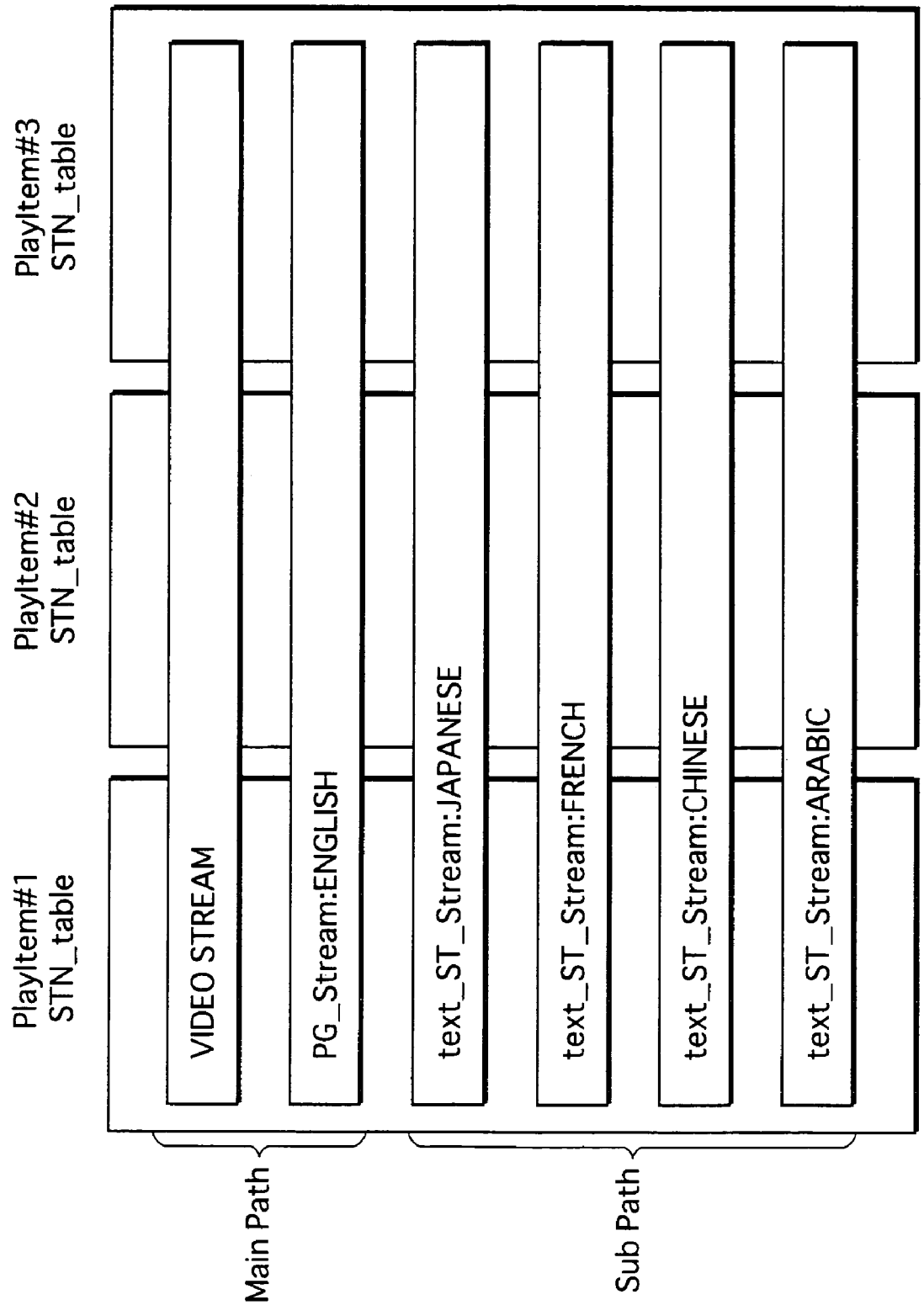
FIG. 11 shows a bundle of digital streams that are defined by PlayList information shown in FIG. 10.

Due to description of the PlayList information shown in FIG. 10, a bundle of digital streams as shown in FIG. 11 is defined. FIG. 11 shows a bundle of digital streams that are defined by PlayList information shown in FIG. 10. Since PlayItem information #1 to #3 constitute the time axis shown in FIG. 5, while PlayItem information #1, the PlayItem information #2, and PlayItem information #3 are played back on the time axis, a video stream is played back, and also the PG stream in English and the text subtitle streams in Japanese . . . Arabic become playable. In other words, while the playback on the PlayList time axis advances, the playback of the PG stream in English and the text subtitle streams in Japanese . . . Arabic are playable. It is possible to play back, in synchronization with the video stream, one of these streams, namely, the PG stream in English and the text subtitle streams in Japanese . . . Arabic.

Thus completes the description of the recording medium. The following describes a playback apparatus according to the present invention.

Figure 12:
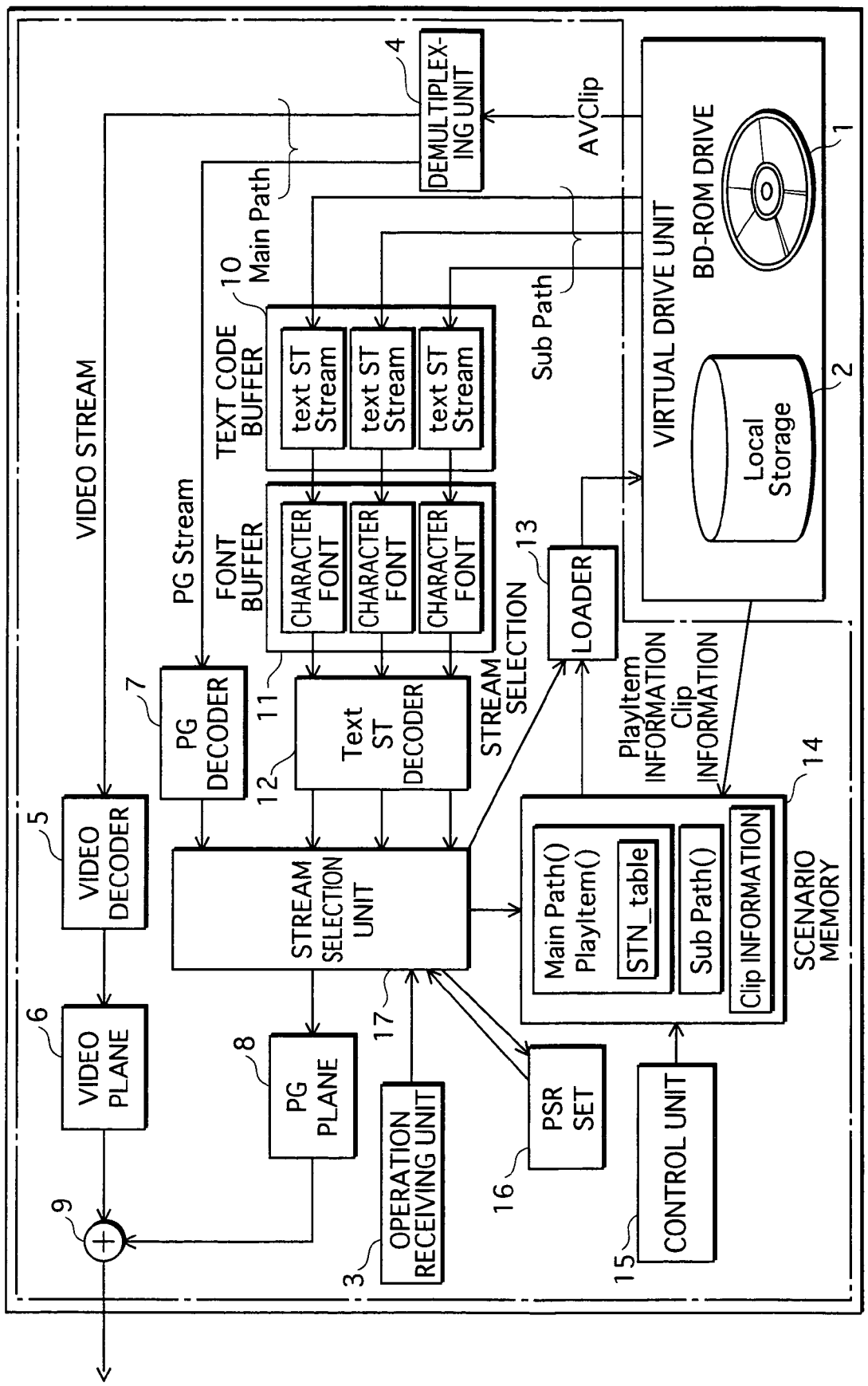
FIG. 12 shows an internal configuration of a playback apparatus of the first embodiment.

FIG. 12 shows an internal structure of a playback apparatus of the present invention. The playback apparatus of the present invention may be industrially manufactured based on the internal configuration shown in the drawing. The playback apparatus of the present invention is mainly made up of two parts such as a system LSI and a drive apparatus. The playback apparatus may be industrially manufactured by mounting these two parts onto a cabinet and a substrate for the apparatus. The system LSI is an integrated circuit in which various processing units for achieving different functions of the playback apparatus are integrated. The playback apparatus manufactured in this way comprises a BD-ROM drive 1, a Local Storage 2, an operation receiving unit 3, a demultiplexing unit 4, a video decoder 5, a video plane 6, a PG decoder 7, a PG plane 8, a synthesizing unit 9, a text code buffer 10, a font buffer 11, a TextST decoder 12, a loader 13, a scenario memory 14, a control unit 15, and a PSR set 16. The portion indicated with the broken line in the drawing is a portion made into one chip as a system LSI.

The BD-ROM drive 1 loads/ejects, and accesses a BD-ROM.

The Local Storage 2 is a built-in medium for storing AVClips, Clip information, and PlayList information downloaded via a network or the like. PlayList information stored in the Local Storage 2 is different from PlayList information stored on a BD-ROM in that the PlayList information is able to specify both Clip Information stored on a BD-ROM and Clip information stored in the Local Storage 2. When performing such a specifying process, PlayList information stored in the Local Storage 2 does not need to use a full path to specify a file stored on a BD-ROM. The reason is because the Local Storage 2 together with a BD-ROM is recognized as one drive being virtual (a virtual drive unit) by the playback apparatus 200. Thus, the Clip_Information_file_name for PlayItem information and the Clip_Information_file_name for SubPlayItem Information are able to specify AVClips in the Local Storage 2 and on the BD-ROM by specifying 5-digit values which are the file bodies of the files storing the Clip information. It is possible to create a wide range of variation of playback by dynamically combining what is stored in the Local Storage 2 and what is recorded on a BD-ROM.

Figure 13:
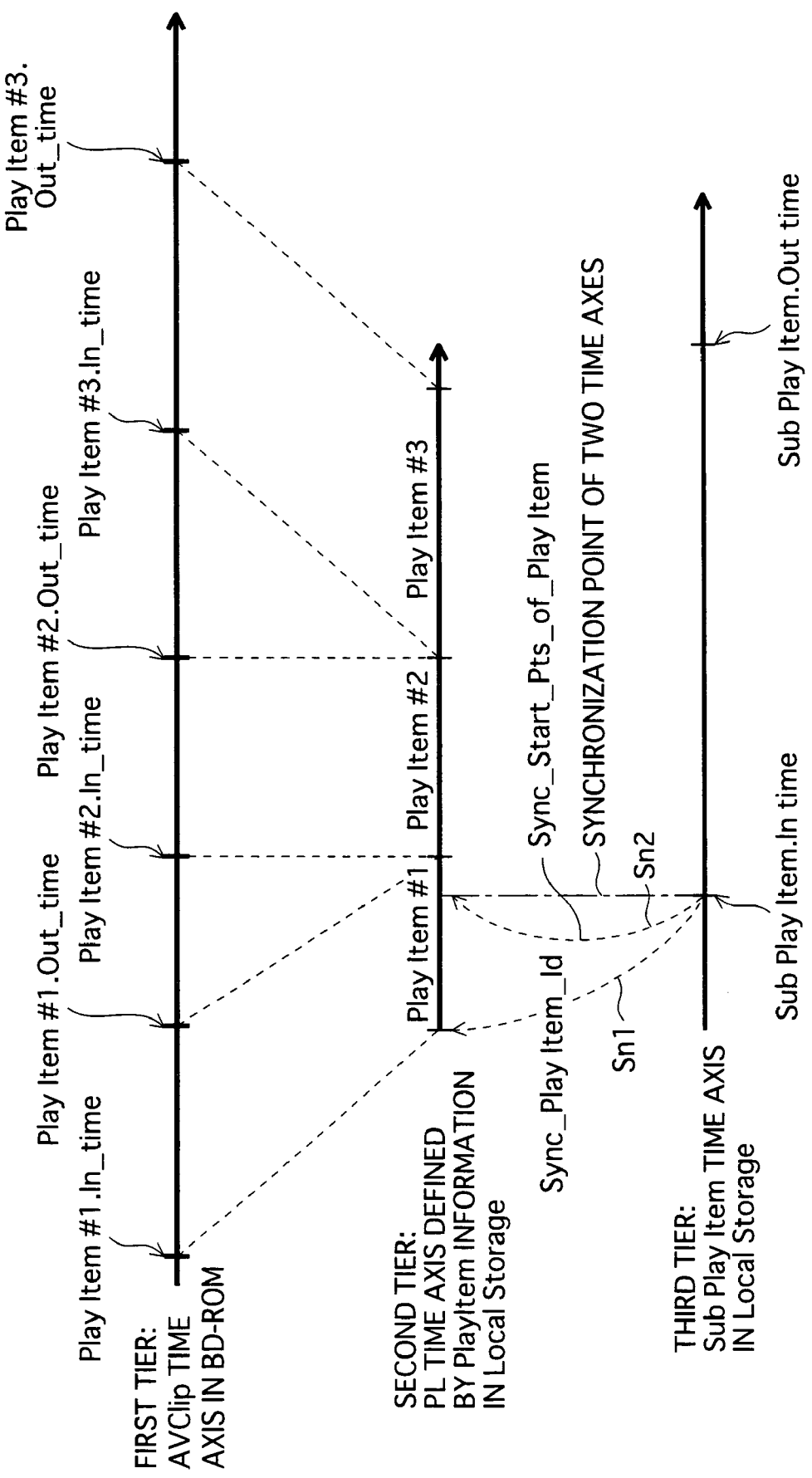
FIG. 13 shows what type of PlayList playback time axis is defined by the PlayList information stored in a Local Storage.

FIG. 13 shows what type of PlayList playback time axis is defined by the PlayList information stored in the Local Storage. The first tier shows a playback time axis in an AVClip recorded on a BD-ROM. The second tier shows a PlayList playback time axis defined by PlayList information stored in the Local Storage 2. As shown by these first and second tiers, the PlayList information stored in the Local Storage 2 is able to define a playback time axis of its own for the AVClip recorded on the BD-ROM. The third tier shows a SubPlayItem playback time axis for a SubPlayItem stored in the Local Storage 2. In the drawing, SubPlayItem.IN_time indicates the starting point of a playback section while SubPlayItem.Out_time indicates the ending point of the playback section. From this drawing, it is understood that a playback section is defined also on the SubPlayItem time axis. The arrow Sn1 indicates a synchronization specification with respect to the PlayItem by a Sync_PlayItem_Id. The arrow Sn2 indicates a specification of a point in time in a PlayItem on the PL time axis by sync_start_PTS_of_PlayItem.

Accordingly, with the use of the SubPlayItem information, the playback section defined on the SubPlayItem playback time axis is in synchronization with the PlayList playback time axis defined by the PlayItem information stored in the Local Storage.

The PlayList information stored in the Local Storage is able to specify a PlayList playback time axis with respect to an AVClip recorded on a BD-ROM. The SubPlayItem information stored in the Local Storage is able to specify, with respect to this playback time axis, a synchronization with a SubPlayItem stored in the Local Storage. Thus, in a case where the AVClip specified by the SubPlayItem stored in the Local Storage is a text subtitle stream, it is possible to playback the text subtitle stream in synchronization with the AVClip recorded on the BD-ROM.

Thus completes the description of the Local Storage 2.

When an operation to select a stream or the like is made on a remote controller or a front panel provided on the playback apparatus, the operation receiving unit 3 outputs a piece of user operation information indicating the operation to the stream selection unit 17.

The demultiplexing unit 4 includes a clock counter and a clock generator. The demultiplexing unit 4 takes out TS packets from the Local Storage 2, and converts the TS packets into PES packets to obtain a video stream and an IG stream, and then outputs these streams to the video decoder 5 and the PG decoder 7, respectively.

The video decoder 5 decode the plurality of PES packets outputted from the demultiplexing unit 4 to obtain a picture in an uncompressed format and writes it into the video plane 6.

The video plane 6 is a plane for storing uncompressed pictures. A plane is a memory area in a playback apparatus for storing one screen worth of pixel data. The video plane 6 has a 1920×1080 resolution, with stored picture data being constituted from pixel data expressed by 16-bit YUV.

The P-graphics (PG) decoder 7 decodes presentation graphics streams read from a BD-ROM and writes the uncompressed graphics to the Presentation Graphics plane 8. Subtitles appear on a screen as the result of a graphics stream being decoded.

The Presentation Graphics (PG) plane 8, being a memory with room for one screen worth of data, is able to store one screen worth of uncompressed graphics. This plane has a 1920×1080 resolution, with pixels of the uncompressed graphics in the Presentation Graphics plane 8 being expressed by 8-bit index colors. Uncompressed graphics stored in the Presentation Graphics plane 8 are submitted for display by converting the index colors using a CLUT (Color Lookup Table).

The synthesizing unit 9 synthesizes uncompressed picture data stored in the video plane 6 with what is stored in the Presentation Graphics plane 8.

The text code buffer 10 is a buffer for storing text subtitle streams read from a BD-ROM and the Local Storage 2. A text subtitle stream for a subtitle of a two-hour movie production has about 500K bytes; therefore, it is sufficient if the text code buffer 10 has a capacity of about 500K byte in order to read out a text subtitle stream and put it into the text code buffer 10.

The font buffer 11 is for storing font data to be used to expand a code sequence constituting a text subtitle stream into a bit map. It is sufficient if the font buffer 11 has a memory capacity of about 1M bytes in order to store therein the CJK fonts (fonts for the Chinese, Japanese, and Korean languages). When these CJK fonts are stored, it is possible to expand text subtitles in Chinese, Japanese, and Korean into bit maps.

The text ST decoder 12 expands text codes included in the text subtitle stream in the text code buffer 10 into a bit map, with the use of the font data stored in the font buffer 11, and writes the bit map to the Presentation Graphics plane 8.

The loader 13 loads the text subtitle stream and the font data into the text code buffer 10 and the font buffer 11. The target of the loading by the loader 13 are text subtitle streams and font data necessary for expanding such text subtitle streams; therefore, since the data amount is relatively small, the loader 13 is able to read out all the text subtitle streams written in the STN_Table and put them into the text code buffer 10 as well as to read out the font data and put it into the font buffer 11. After the stream and the data are read and put into the buffers in this manner, the loader 13 supplies necessary data to the textST decoder 12 in accordance with a current playback point in time. To read out data and put it into the text coder buffer 10 or the font buffer 11 prior to a playback of a MainPath is referred to as "to pre-load" or "pre-loading".

The loader 13 performs a pre-loading for the following reasons. In the case where two streams specified by MainPath information and SubPath information are separately recorded on a BD-ROM and on a hard disk respectively, the data will be read from these two media respectively at the same time. However, since the access speed to an optical disc such as a BD-ROM is relatively slow, in the case where a stream specified by MainPath information and a stream specified by SubPath information are recorded on a same BD-ROM, it is extremely difficult to access these two streams while seeking is performed. Accordingly, before playback of the MainPath is started, the loader 13 reads the data specified by the SubPath information, i.e. the text subtitle stream and the font data to be used for expanding the text subtitle stream and stores the data into the buffers.

In the case where all the data is read into the text code buffer 10 and the font buffer 11, it is also possible to play back a stream on the SubPath side while playing back a stream on the MainPath side. In such a case, even if only the stream on the MainPath side is played back without selecting the stream on the SubPath information side, as long as what is stored in the text code buffer 10 and the font buffer 11 is not overwritten, it is possible to switch from the stream on the MainPath side to the stream on the SubPath side.

The scenario memory 14 is a memory for storing current PlayList information and current Clip information. Current PlayList information is a piece of PlayList information that is currently a processing target among pieces of PlayList information recorded on a BD-ROM. Current Clip information is a piece of Clip information that is currently a processing target among pieces of Clip information recorded on a BD-ROM.

The control unit 15 performs control for reading and playing back AVClips recorded on a BD-ROM in accordance with the current PlayList information and the current Clip information that are read into the scenario memory 14.

The PSR set 16 is a resister that is built in the playback apparatus and is composed of a 64 individual player status/setting registers (PSRs) and 4096 individual general purpose registers (GPRs).

The meanings of setting values in the player status/setting registers (PSRs) will be described in detail later.

The stream selection unit 17 selects and plays back one of a PG stream and a text subtitle stream of which the sets made up of an entry and an attribute are written in an STN_Table. The selection made by the stream selection unit 17 is to take out a PID from a set that corresponds to the stream number stored in a PSR, out of the entry-attribute sets written in the STN_Table and combine either a PG stream or a text subtitle stream that corresponds to the PID that has been taken out with moving pictures. If the PID that has been taken out identifies a PG stream, the demultiplexing unit 4 is set so as to demultiplex the PG stream. If the PID that has been taken out identifies a text subtitle stream, the identified text subtitle stream is supplied from the text code buffer 10 and the font buffer 11 to the TextST decoder 12.

Figure 14:
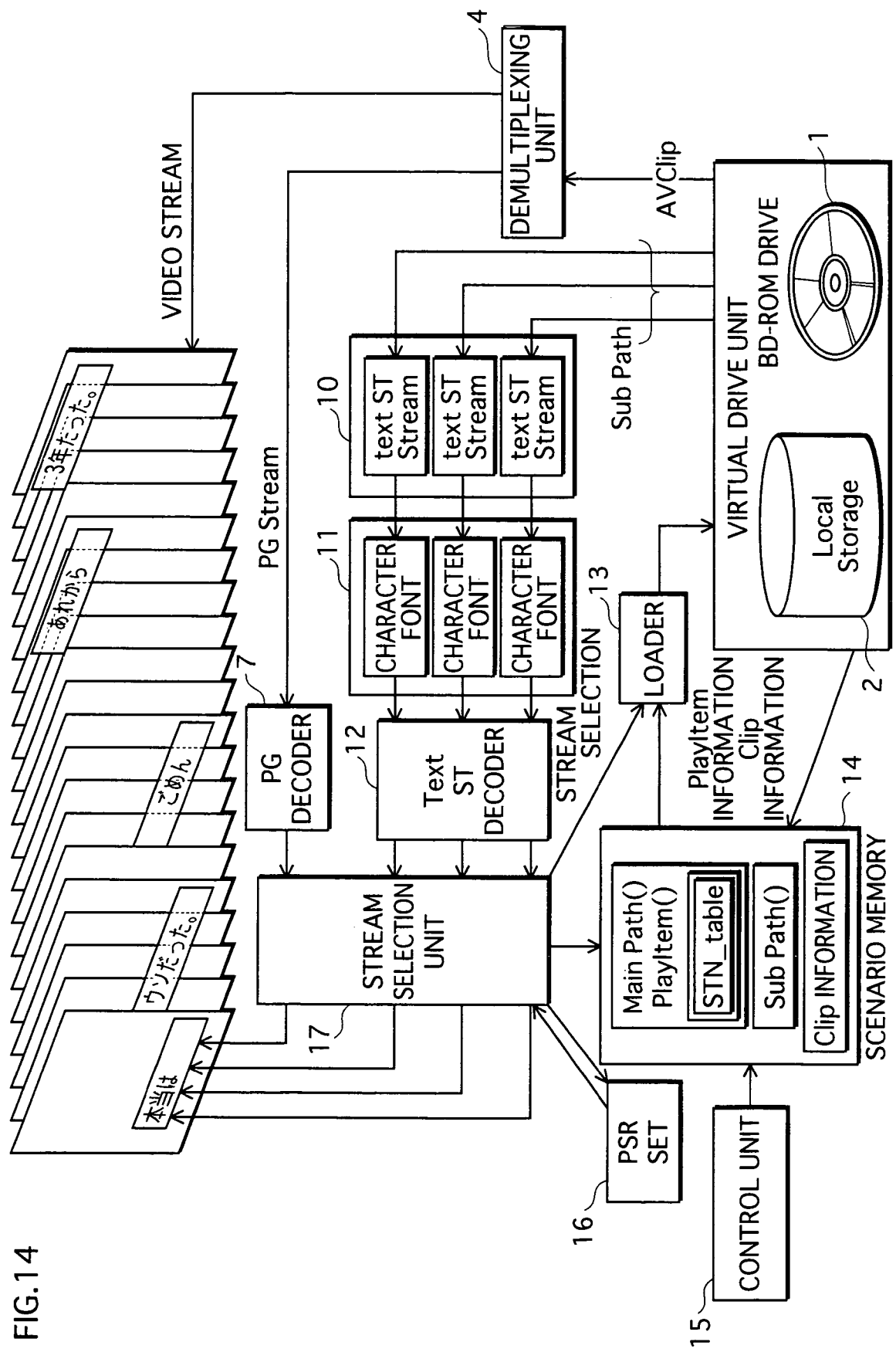
FIG. 14 shows decoding results of decoding performed by a video encoder and selection results by the stream selection unit 17 added to the internal configuration shown in FIG. 12.

FIG. 14 shows decoding results of a decoding performed by the video encoder and selection results by the stream selection unit 17 added to the internal configuration shown in FIG. 12. In this case, the decoding results by the video encoder are a picture sequence. The selection results by the stream selection unit 17 is a subtitle which reads: "本当は" "ウソだった" "ごめん" "あれから" "3年たった". The stream selection unit 17 selectively combines the decoding results of the PG stream or the decoding results of the text subtitle stream with the picture sequence so that the playback apparatus plays back either the decoding results of the PG stream or the decoding results of the text subtitle stream being,combined as a subtitle with the pictures.

<Description of PSRs>

Figure 15:
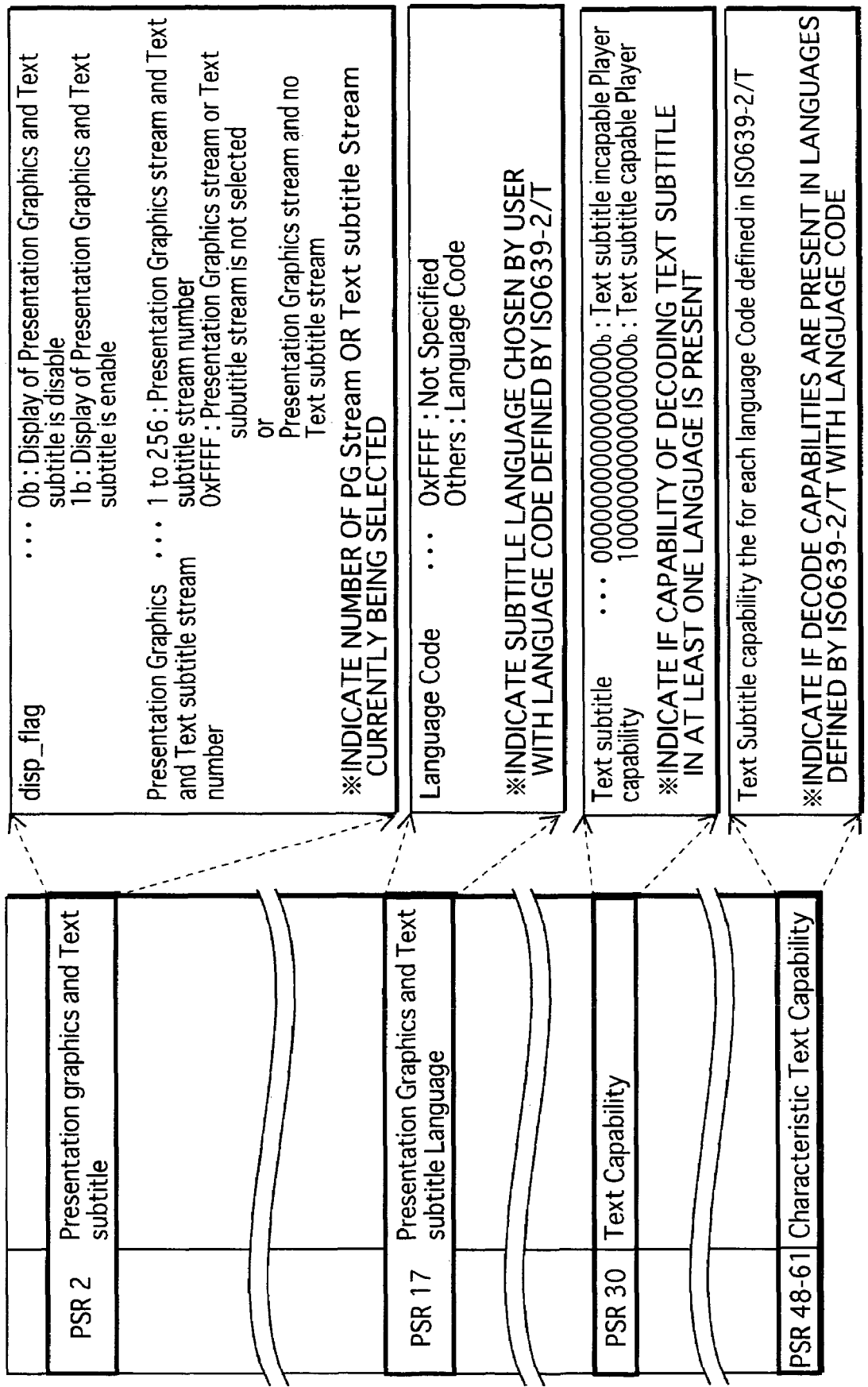
FIG. 15 shows detailed setting of PSR1, PSR2, PSR17, and PSR30.

Thus completes the description of the configuration of the playback apparatus of the present invention. The following describes individual PSRs in the PSR set. Out of the PSR set, PSRs 1, 2, 15, 17, 30, and 48 to 61 indicate selections of audios and subtitles and whether capability for decoding the audios and subtitles is present or absent as well as the language settings in the playback apparatus. FIG. 15 shows the detailed settings of PSR 2, PSR 17, and PSR 30.

Detailed Description of PSRs <1>—PSRs 2, 17, and 30

PSR2 stores therein a stream number of a PG stream or a text subtitle stream that is currently being selected. Here, a stream number is a numeral that shows an ordinal place at which an entry-attribute set that corresponds to the PG stream or a text subtitle stream is written in an STN_Table, and each stream number is dependent on an individual STN_Table.

Further, PSR2 includes a disp_flag. When the disp_flag is set at "0", it means that it is impossible to display the corresponding PG stream or text subtitle stream. When the disp_flag is set at "1", it means that it is possible to display the corresponding PG stream or text subtitle stream.

PSR17 indicates the setting for a subtitle language in the playback apparatus using the language codes according to the ISO 639-2/T. Here, the language setting is to store in the playback apparatus which one of the 430 languages, the user wishes to use during the playback. The language setting stored in PSR17 merely reflects the user's preference, and it does not mean that a BD-ROM has recorded thereon PG streams/text subtitle streams that correspond to the language the user has selected. It does not mean that the playback apparatus has a Decode Capability for the language set in PSR17, either. PSR17 merely stores therein the user's preference as a setting for the subtitle language.

When the uppermost bit of PSR30 is set at "0", it means that the playback apparatus is not capable of displaying text subtitles, whereas when the uppermost bit of PSR is set at "1", it means that the playback apparatus is capable of displaying text subtitles.

Even if the playback apparatus is capable of decoding text subtitle streams, some text subtitle streams corresponding to some languages are decodable, while other text subtitle streams corresponding to other languages are undecodable.

Detailed Description of PSRs <2>—PSRs 48 to 61

A text subtitle stream expresses a subtitle using character codes. However, as it is observed more prominently in Southeast Asia such as in Japan, China, and Korea, different languages may have different character codes. Accordingly, flags are prepared for different languages respectively, so that it is possible to judge whether a language being a target is properly displayable or not. Each of PSRs 48 to 61 in the PSR set indicates the decoding capability for text subtitle streams in a different one of the languages defined with the language codes according to the ISO 639-2/T.

Figure 16:
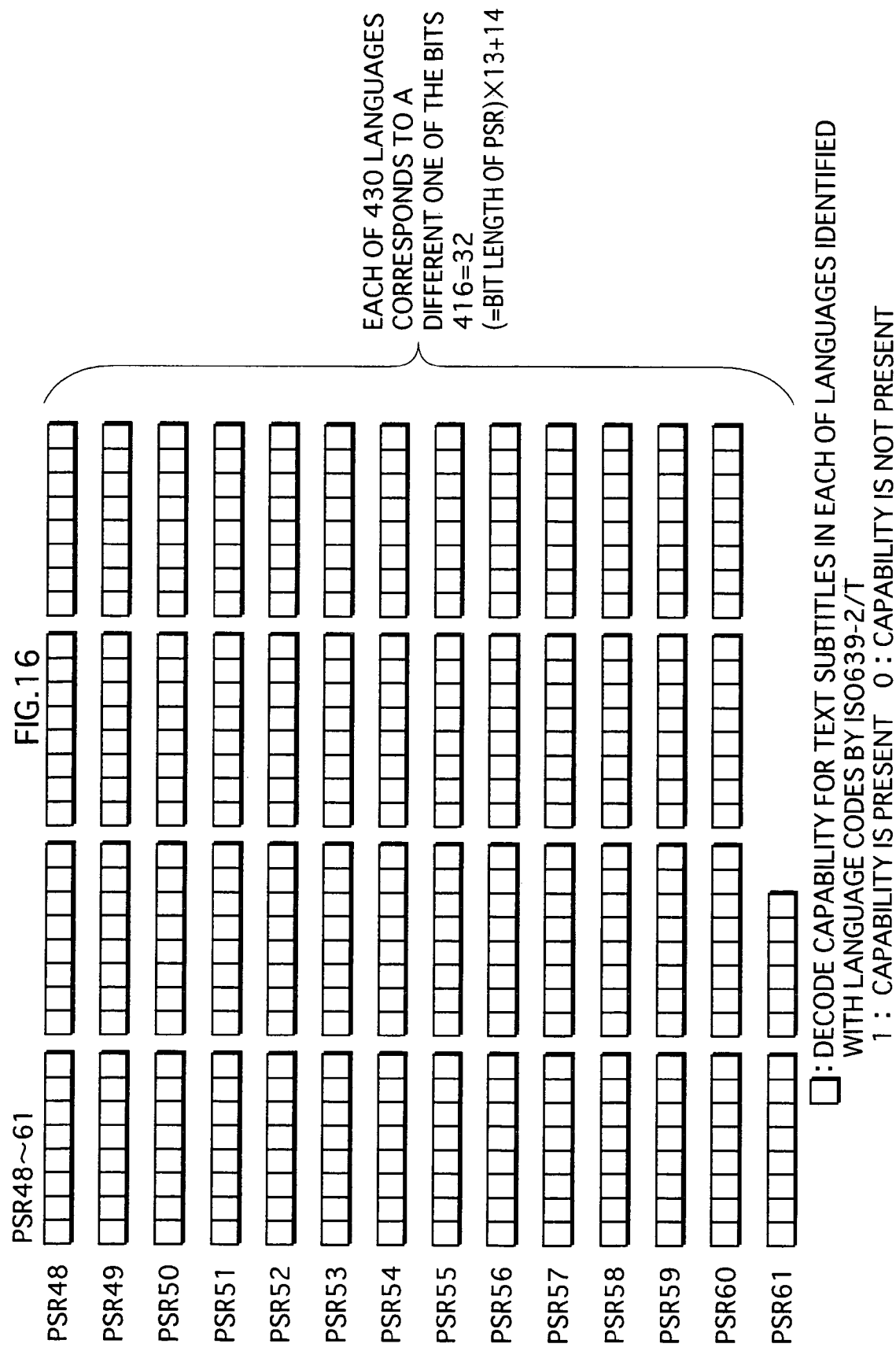
FIG. 16 shows internal configurations of PSRs 48 to 61.

FIG. 16 shows internal configurations of PSRs 48 to 61. Each of the squares in the drawing is a Decode Capability flag that indicates the Decode Capability in a different one of the languages.

PSRs 48 to 61 store therein as many flags as the number of the languages. Since only one flag is needed for a language to indicate if the language is displayable or not, one bit is assigned to each language. Even for a minority language used by a relatively smaller number of people, an arrangement is made so as to indicate whether the Decode Capability for the language is present; therefore, the bit configuration shown in the drawing is required to use 430 or more register areas (i.e. 430 languages×1 bit).

Such Decode Capability flags correspond to 430 languages respectively. By referring to one of the Decode Capability flags that corresponds to the textST_language_code written in the STN_Table, it is possible to judge whether or not the capability is present for decoding text subtitles in the language that corresponds to the textST_language_code.

Figure 17:
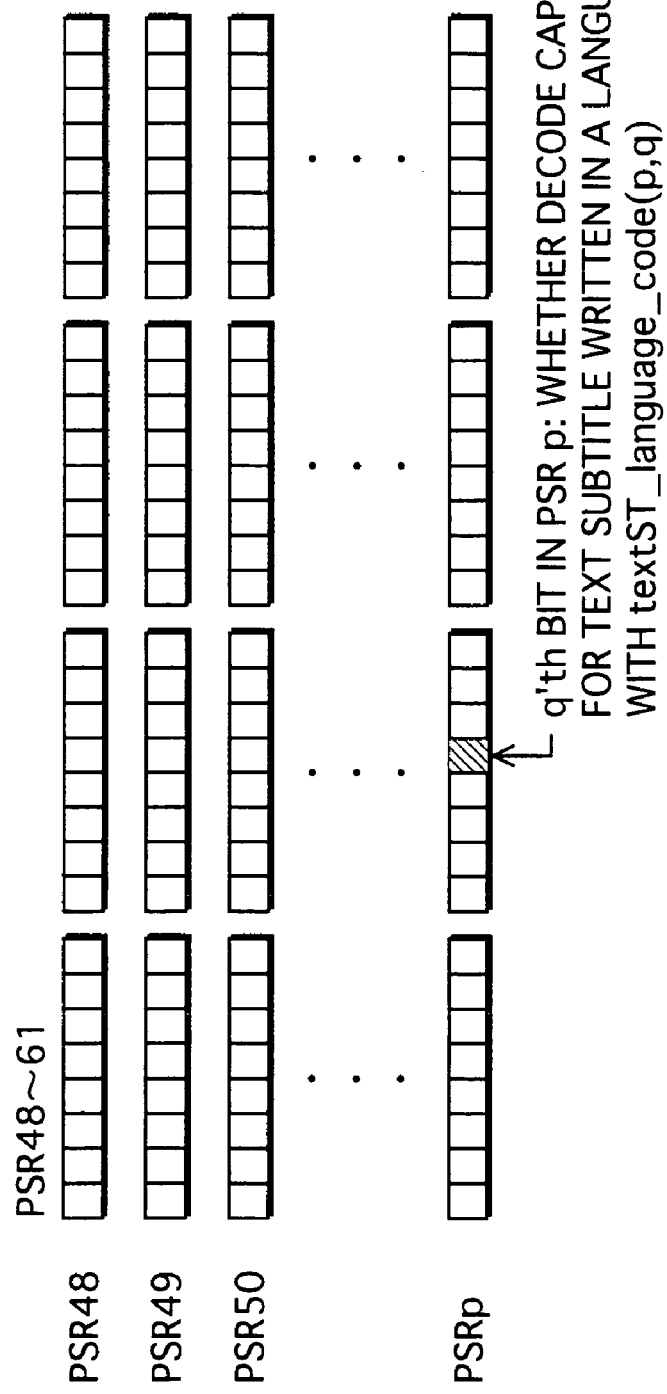
FIG. 17 shows correspondence between a Decode Capability Flag and a textST_language_code in each of PSRs 48 to 61.

FIG. 17 shows correspondence between a Decode Capability Flag and a textST_language_code in each of PSRs 48 to 61. Each of the Decode Capability flags in PSRS 48 to 61 is identified with a PSR number p and a bit position q. The language attribute of the text subtitle stream is expressed with a textST_language_code. By converting the textST_language_code to a PSR number p and a bit position q in each of PSRs 48 to 61, it is possible to judge whether or not the Decode Capability for text subtitle streams is present.

FIG. 18 shows values stored in PSR 53, among PSRs 48 to 61. PSR53 includes thirty-two Decode Capability flags in total. Each of the three-byte codes such as "jpn", "jav", and "ita" is a textST_language_code. It is understood from the drawing that PSR53 has thirty-two Decode Capability flags in total that are expressed with textST_language_codes. FIG. 19 shows the meanings of textST_language_codes. When referring to the meanings shown in the drawing, it is understood that the three-byte code "ita" refers to the Italian language, whereas the three-byte code "jpn" refers to the Japanese language. The three-byte code "jav" refers to the Javanese language. Since the rest of the PSRs also indicate whether Decode Capabilities are present or not using a value in one bit each, the Decode Capability flags for 430 languages in total are represented by PSRs 48 to 61. Thus completes the description of the characteristic portion of the PSR set according to the present embodiment. The following describes the characteristic portion of the stream selection unit 17.

<Description of the Stream Selection Unit 17>

Figure 20:
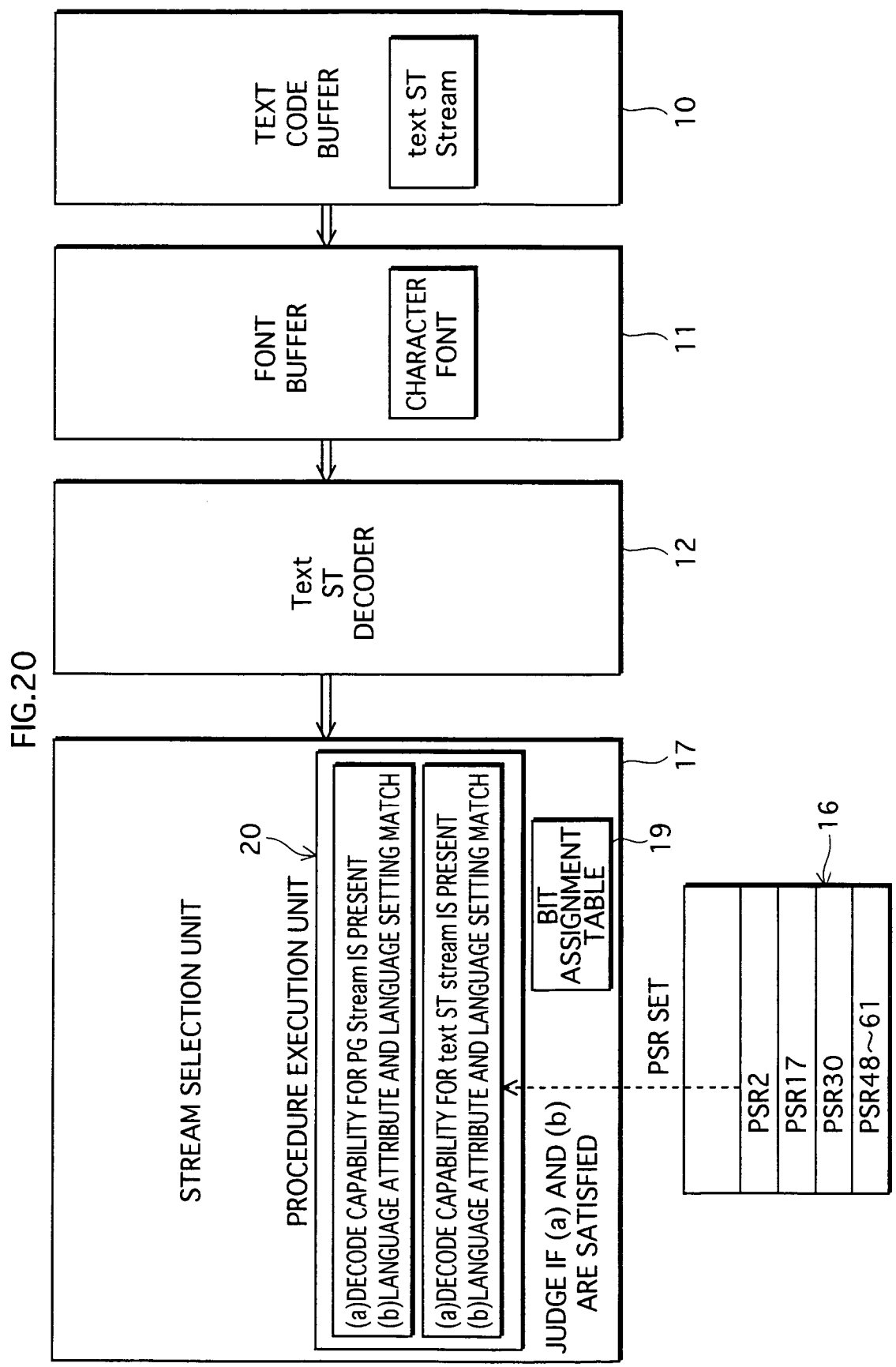
FIG. 20 shows the characteristic portion of the stream selection unit 17 in the first embodiment.

FIG. 20 shows the characteristic portion of the stream selection unit 17 in the first embodiment. The stream selection unit 17 is characterized with that it has a bit assignment table 19 and a procedure execution unit 20.

Characteristic 1—Bit Assignment Table 19

The bit assignment table 19 shows assignment of a three-byte code sequence indicating a textST_language_code and a PSR number and a bit position in each of PSRs 48 to 61. FIG. 21 shows correspondence among a PSR number, a bit position, and a textST_language_code in each of PSRs 48 to 61. As shown in the drawing, the three-byte code "jpn" being a textST_language_code corresponds to the PSR number "53" and the bit number "b8".

The three-byte code "jav" corresponds to the PSR number "53" and the bit number "b7".

The three-byte code "ita" corresponds to the PSR number "53" and the bit number "b9".

Since these kinds of correspondence are stored, it is possible to obtain a PSR number and a bit position in PSRs 48 to 61 from a textST_language code written in an STN_Table. By referring to the one-bit set value indicated at the PSR number and the bit position, it is possible to judge whether the Decode Capability is present for the language identified with the textST_language_code. Thus completes the detailed description of the bit assignment table.

Characteristic 2—Procedure Execution Unit 20

In the case where a piece of PlayItem information is switched to another piece of PlayItem information or in the case where a user has made an operation to switch from one stream number to another, the procedure execution unit 20 performs a predetermined procedure and writes a new stream number into PSR2. Since the stream selection unit 17 selects a PG stream or a text subtitle stream in accordance with the stream number written into PSR2, one of the PG stream and the text subtitle stream is to be played back according to the setting of PSR2. The procedure to be executed due to a PSR2 setting resulting from the switching of PlayItem information will be called "Procedure when playback condition is changed". The procedure to be executed due to a PSR2 setting resulting from a user operation will be called "Procedure when a change is requested".

The reason why the procedure is executed when PlayItem information is switched is because since an STN_Table exists for each piece of PlayItem information, there is a good possibility that some text subtitle stream that is playable with a piece of PlayItem information may be unplayable with another piece of PlayItem information.

In addition, the reason why the other procedure is executed when a user operation has made is because the stream number to be stored into PSR2 according to the user operation may not be always correct, and it is necessary to make recovery in the case where an incorrect stream number is to be written into PSR2.

In the "Procedure when playback condition is changed" and the "Procedure when a change is requested", a priority order is given to each PG stream and text subtitle stream depending on the judgment results of how many of the criteria (a) and (b) are satisfied by each of the PG stream and the text subtitle stream. The stream number of one of the streams having the highest priority order is written into PSR2.

Detailed description of the procedure execution unit 20 <1>

<"Procedure when Playback Condition is Changed">

Figure 22:
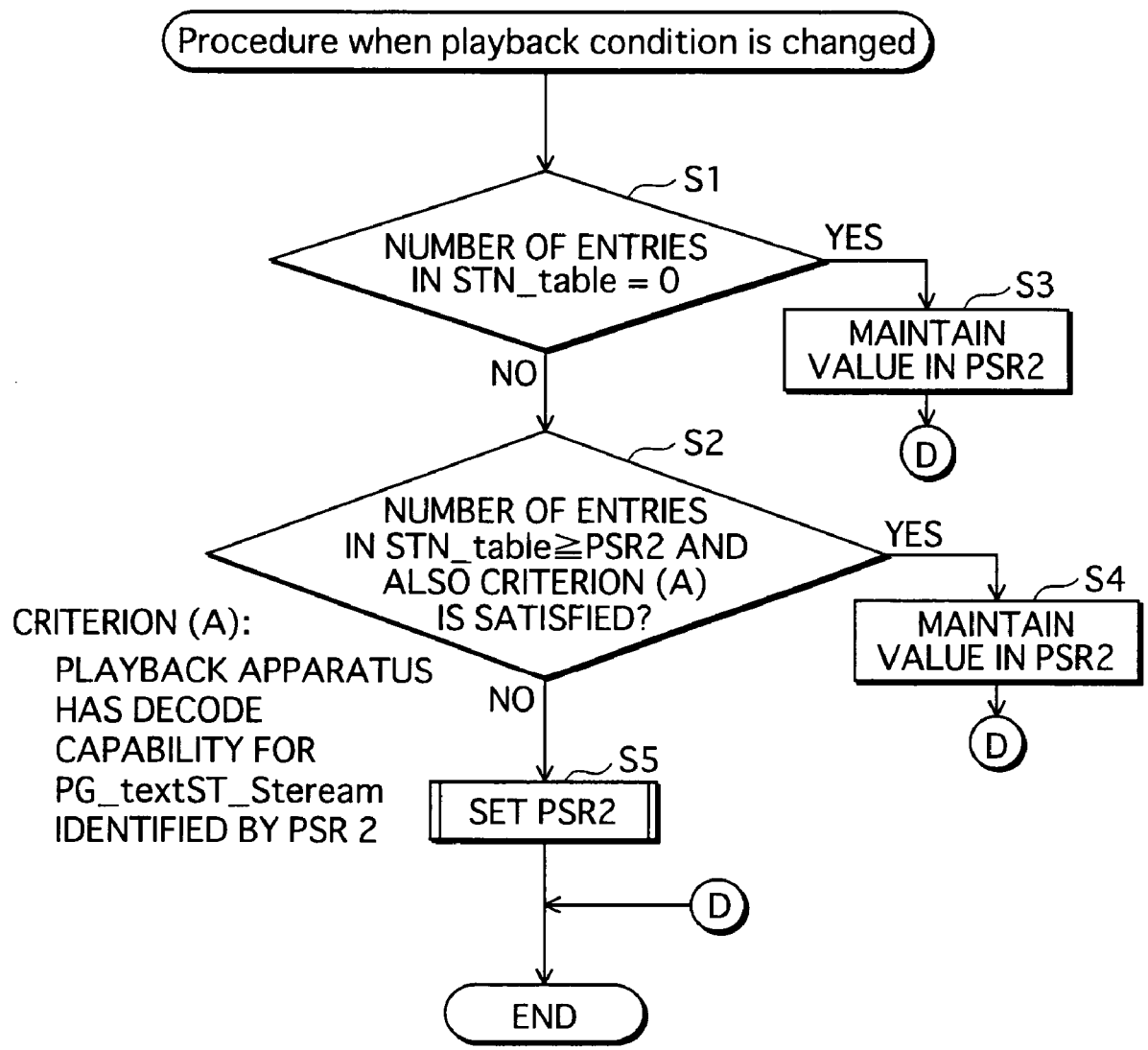
FIG. 22 is a flow chart that shows the processing of the "Procedure when playback condition is changed"

The processing for the "Procedure when playback condition is changed" is shown in FIG. 22. This procedure is for setting PSR2 with a combination of two judgment steps, namely Steps S1 and S2.

In Step S1, it is judged whether or not the number of the entries in the STN_Table is 0. In the case where the number of the entries is 0, the value in PSR2 is maintained in Step S3.

In Step S2, in the case where the number of the entries in the STN_Table is not 0, it is judged whether the number of the entries in the STN_Table is larger than a value in PSR2 and also the criterion (A) is satisfied. The criterion (A) is if the playback apparatus has a capability for decoding the text subtitle stream specified by PSR2. If the judgment result of Step S2 is Yes, the value in PSR2 is maintained (Step S4). In the case where the value in PSR2 is larger than the number of the entries or in the case where the criterion (A) is not satisfied, some valid value is set into PSR2 in Step S5.

Detailed Description of the Procedure Execution Unit 20 <2>

"Procedure when a Change is Requested"

Figure 23:
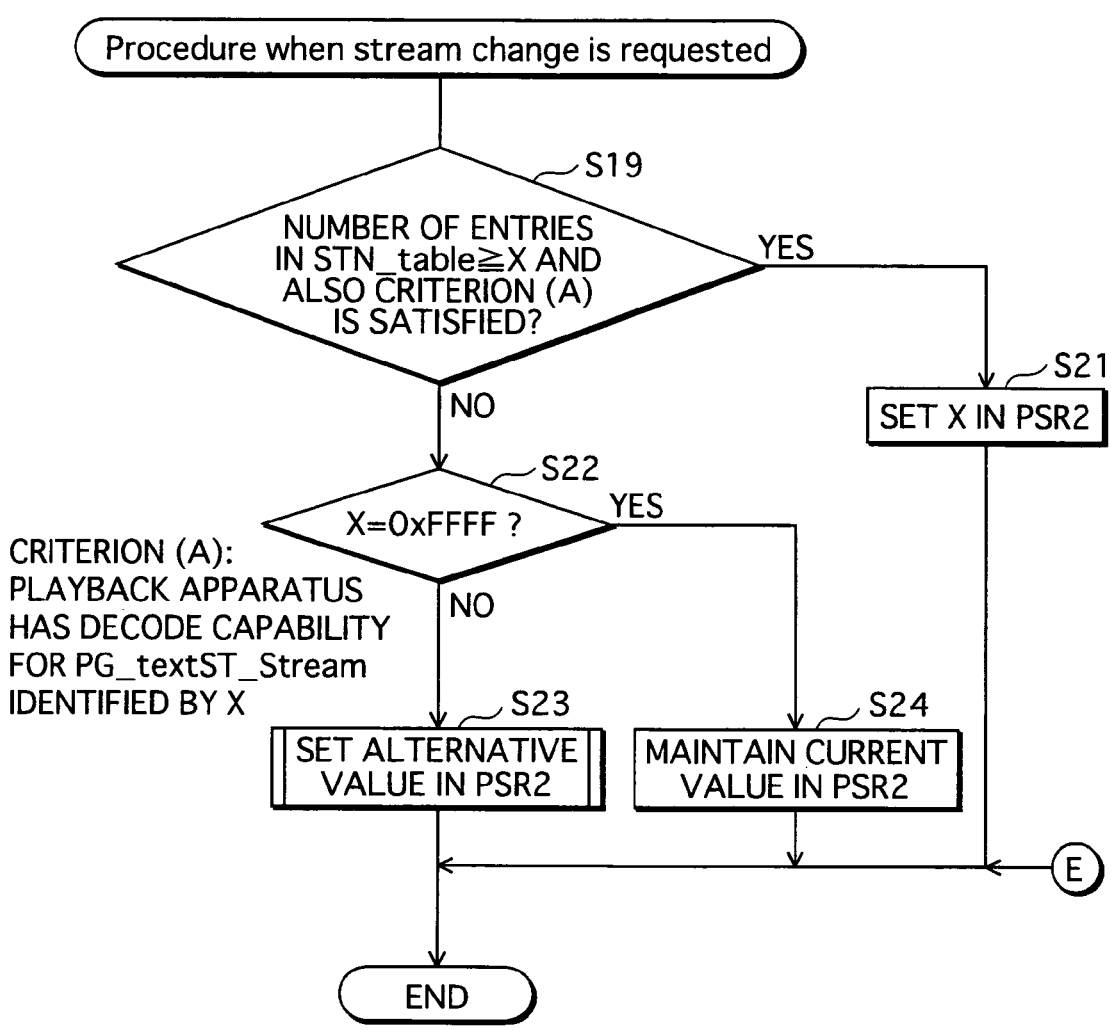
FIG. 23 is a flow chart that shows the setting procedure to be performed when a stream is changed.

The following describes the "Procedure when a change is requested". FIG. 23 is a flow chart that shows the setting procedure to be performed when the stream is changed. This flow chart in FIG. 23 is different from the one in FIG. 22 in that the word "PSR2" in FIG. 22 is replaced with a letter "X". This X is a value based on a piece of User Operation information outputted from the operation receiving unit 3 or a button command within an IG stream.

In Step S19 shown in the flow chart, it is judged whether or not the number of the entries in the STN_Table is larger than X and also the criterion (A) is satisfied. The criterion (A) is if the playback apparatus has a capability for decoding the PG stream or the text subtitle stream specified by PSR2. If the value X satisfies this criterion, X is set into PSR2 (Step S21).

In the case where X is larger than the number of the entries or in the case where the criterion (A) is not satisfied, it is judged whether or not X is an invalid value, namely, 0xFFFF (Step S22). If X is 0xFFFF, it is considered that the number of the PG stream or the text subtitle stream which the user wishes to select is invalid; therefore, the value X based on the user operation is ignored, and the value in PSR is maintained (Step S24).

In the case where the value X is not 0xFFFF, the value X is set into PSR2 (Step S23).

Detailed Description of the Procedure Execution Unit 20 <3>

<Procedure for Setting Some Valid Value into PSR2>

Figure 24:
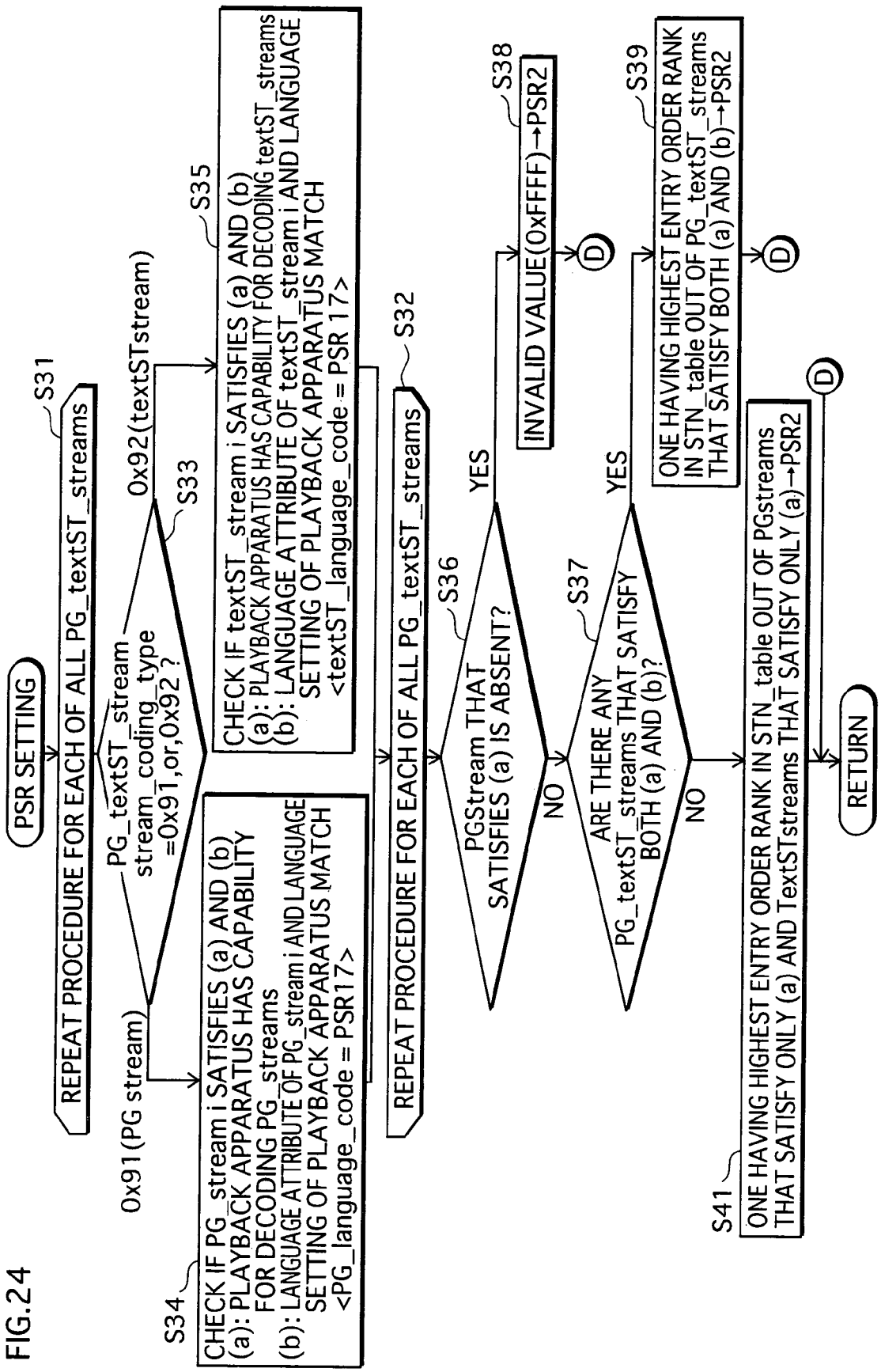
FIG. 24 is a flow chart that shows the setting procedure for PSR2.

In the flow chart mentioned above, the details of the processing in Step S5 and Step S23 are shown in FIG. 24. FIG. 24 is a flow chart that shows the setting procedure for PSR2.

Each of Steps S31 and S32 in the flow chart is a loop processing in which the processing in Steps S33 to S35 is repeated for each of the PG_textST_streams written in the STN_Table. A PG_textST_stream being the target in the loop processing will be referred to as a PG_textST_stream i. In Step S33, it is judged whether the stream_coding_type of the PG_textST_stream i is 0×91 or 0×92. In the case where it is 0×91, the procedure advances to Step S34.

In step S34, it is judged whether the PG_stream i satisfies the criteria (a) and (b) shown below:

(a): The playback apparatus has a capability for decoding the PG stream i.

(b): The language attribute of the PG stream i and the language setting of the playback apparatus match.

The judgment on the criterion (b) is made by judging whether the PG_language_code in the STN_Table matches PSR17.

In Step S35, it is judged whether the textST_stream i satisfies the criteria (a) and (b) shown below:

(a): The playback apparatus has a capability for decoding the text subtitle stream i.

(b): The language attribute of the text subtitle stream i and the language setting of the playback apparatus match.

The judgment on the criterion (a) is made by judging whether the corresponding bit in PSRs 48 to 61 indicates that "the decoding capability is present". The judgment on the criterion (b) is made by judging whether the textST_language_code in the STN_Table matches the value set in PSR17.

After the processing in Steps S33 to S35 is repeated for each of all the PG_textST_streams, the processing in Steps S36 to S41 is to be performed.

In Step S36, it is judged if there are any PG streams that satisfy the criterion (a). If no such PG stream exists, an invalid value "0xFFFF" is set into PSR2 (Step S38).

In Step S37, it is judged if there are any PG_textST_streams that satisfy both the criteria (a) and (b). If such PG_textST_streams exist, the one having the highest entry order rank in the STN_Table out of the PG_textST_streams satisfying both (a) and (b) is set into PSR2 (Step S39).

In Step S41, the one having the highest entry order rank in the STN_Table out of the PG streams that satisfy only (a) and the textST_streams that satisfy only (a) is set into PSR2. The following describes the processing in the flow chart using specific examples.

Figure 25:
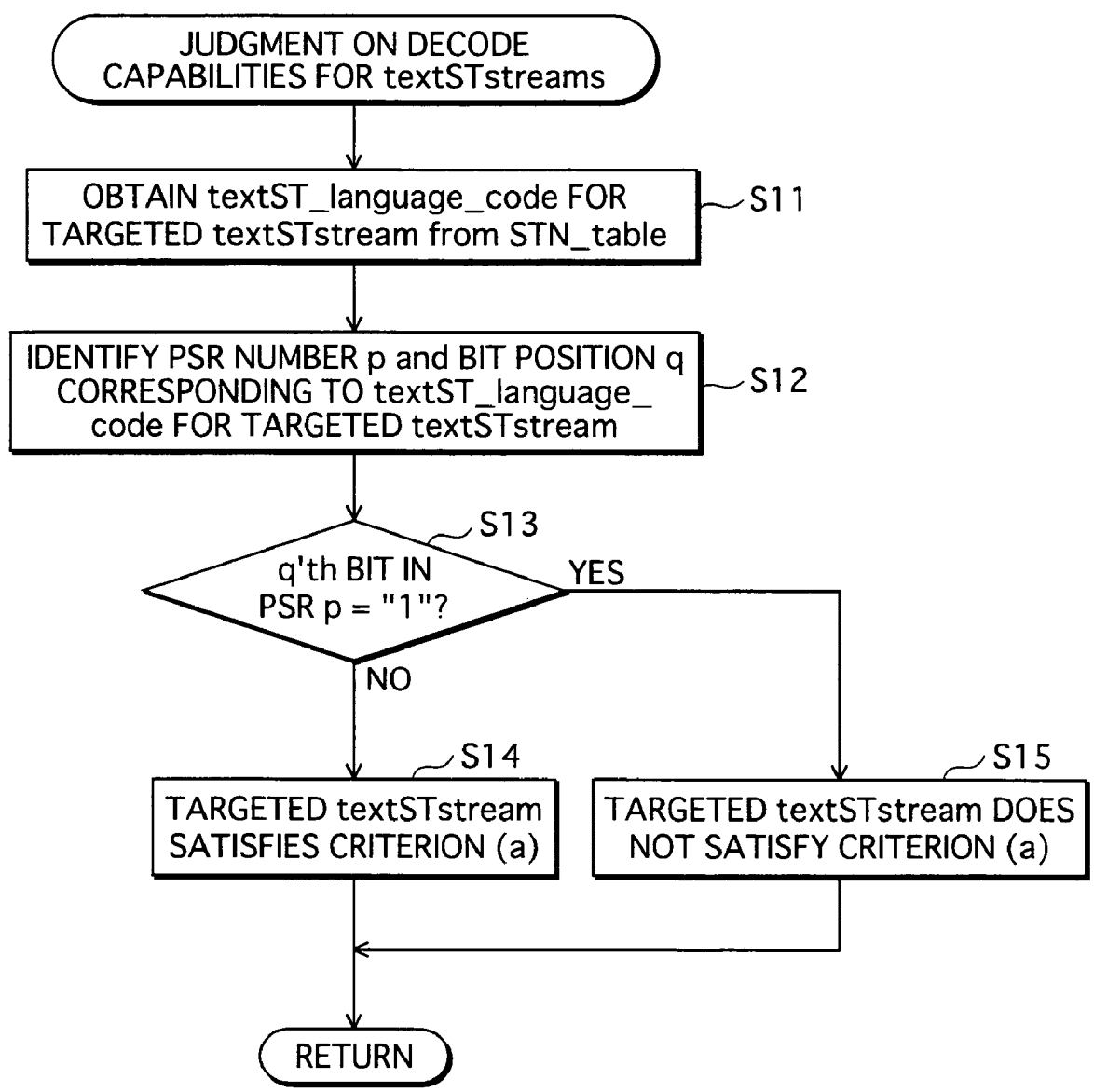
FIG. 25 is a flow chart that shows that judgment procedure for judging whether the decode capability for a text subtitle stream is present.

Whether the Decode Capability for a text subtitle stream is present or not is judged based on the flow chart shown in FIG. 25. FIG. 25 is a flow chart that shows that judgment procedure for judging whether the Decode Capability for a text subtitle stream is present. As shown in the flow chart, the textST_language code for a text subtitle stream being the target is obtained from the STN_Table (Step S11) and by referring to the assignment table, a PSR number p and a bit position q are identified that correspond to the textST_language_code for the text subtitle stream (Step S12). It is then judged whether the q'th bit of PSR p is "1" or "0" (Step S13). In the case where the q'th bit of PSR p is "1", it is judged that the text subtitle stream being the target satisfies the criterion (a) (Step S14). Conversely, in the case where the q'th bit of PSR p is "0", the text subtitle stream being the target does not satisfy the criterion (a) (Step S15).

Detailed Description of the Procedure Execution Unit 20 <3>

<Specific Example of the Setting of PSR2>

The playback apparatus discussed in this specific example has the capabilities for decoding text subtitle streams in Japanese and Chinese as shown in FIG. 26B, but does not have the capabilities for decoding French and Italian. The language setting in PSR 17 is made for the Chinese language.

The following discussion is based on the case where an STN_Table shown in FIG. 26B is loaded into such a playback apparatus. In the STN_Table, entries of the text subtitle streams in Japanese, French, Chinese, and Arabic (textST_streams 1, 2, 3, and 4) are written.

When the STN_Table with such a description is the processing target, as shown in FIG. 26C, it is checked if each of the PG_textST_streams satisfies the criterion (a) and (b) in Step S34 and Step S35. Here, the text subtitle stream in Japanese satisfies only the criterion (a) out of the two criteria. The text subtitle stream in Chinese satisfies both the criteria (a) and (b).

Since the criterion satisfaction of each stream has been found out, a highest rank is given to the Chinese text subtitle stream that satisfies both the criteria (a) and (b). As a result, the Chinese text subtitle stream is to be selected.

Detailed Description of the Procedure Execution Unit 20 <4>

<Specific Example of the Setting of PSR2>

The following describes a selection of a text subtitle stream according to the order ranks of the entries in an STN_Table, with reference to FIG. 27. The playback apparatus discussed in this example has the capabilities for decoding the Japanese and Chinese languages like in FIG. 26A. The language setting in PSR 17 is made for the Korean language.

The following discussion is based on the case where an STN_Table shown in FIG. 27B is loaded into such a playback apparatus. In the STN_Table, entries of the text subtitle streams in Japanese . . . Arabic (textST_streams 1, 2, 3, and 4) are written.

When the STN_Table with such a description is the processing target, as shown in FIG. 27C, it is checked if each of the PG_textST_streams satisfies the criterion (a) and (b) in Step S34 and Step S35. Here, the text subtitle stream in Japanese satisfies only the criterion (a) out of the two criteria. The text subtitle stream in Chinese satisfies only the criterion (a), too.

When there is more than one text subtitle stream that satisfies only the criterion (a), the order rank of each stream is determined based on the order ranks of the entries in the STN_Table. In the present example, since the order rank for the Japanese is the highest in the STN_Table, the Japanese text subtitle stream is to be selected. Thus completes the description of the procedure execution unit 20. The following describes the processing procedure performed by the control unit 15.

Characteristic 3—Processing Procedure Performed by the Control Unit 15

Figure 28:
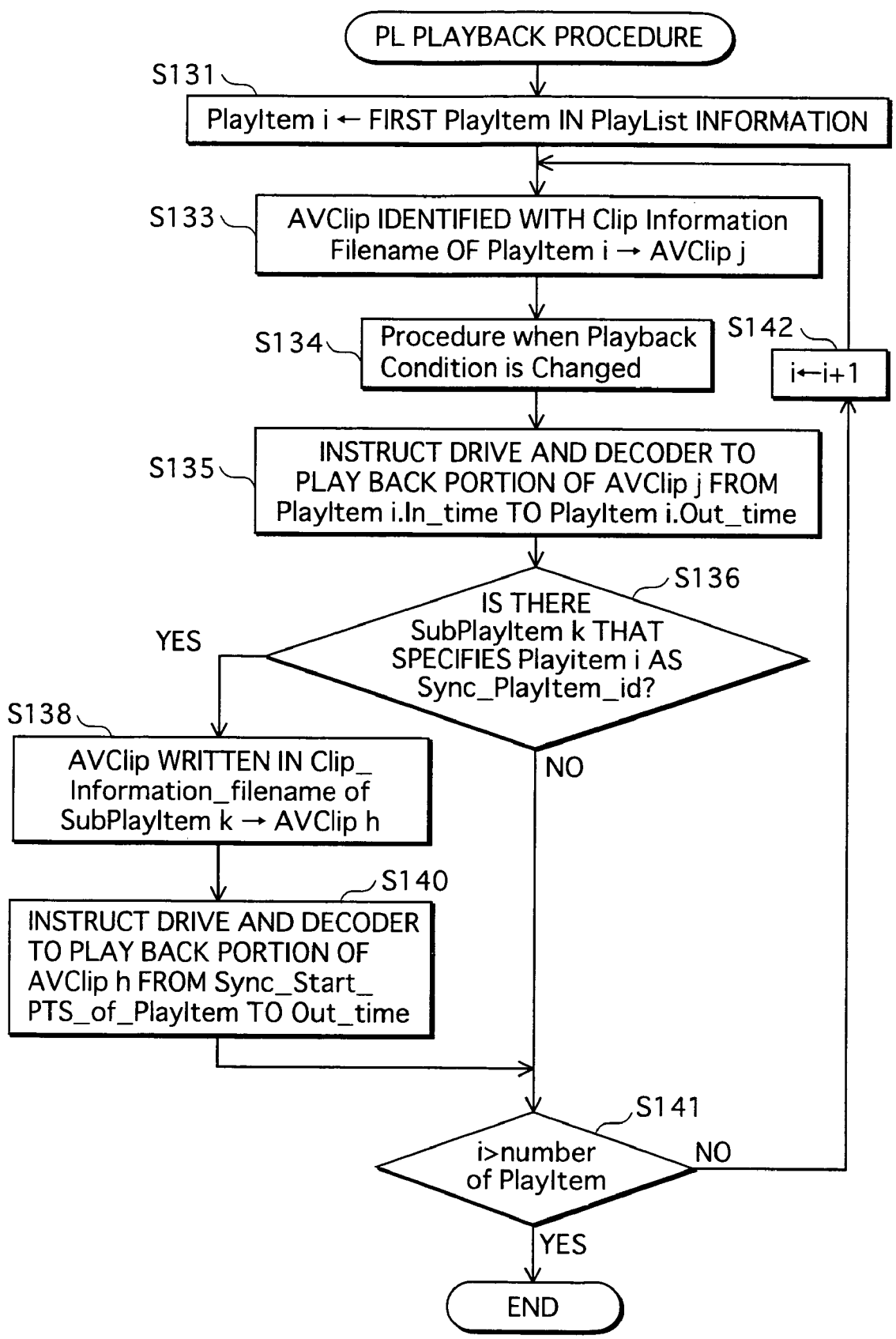
FIG. 28 is a flow chart that shows a playback procedure performed by the control unit.

FIG. 28 is a flow chart that shows a playback procedure performed by the control unit 15. As shown in the flow chart, a first piece of PlayItem information in the PlayList information is taken as PlayItem information i so that the loop processing in Step S133 to S142 is performed. The control variable in the loop processing in Steps S133 to S142 is the variable i. The processing of incrementing the control variable i after performing the processing in Steps S133 to S140 is repeated until the variable i exceeds the number of PlayItems (Step S141).

The following describes the processing in Steps S133 to S140. In this series of processing, an AVClip written in the Clip_information_file_name of the PlayItem information i is taken as AVClip j (Step S133) and used as the target of playback. In Step S134, the "Procedure when Playback Control is changed" is performed and then the drive apparatus and the decoder are instructed to play back the portion from PlayItem.In_time to PlayItem.Out_time (Step S135).

In Step S136, it is judged whether there is SubPlayItem k that specifies PlayItem information i as a Sync_PlayItem_id. If no such subPlayItem k exists, the procedure advances to Step S141.

If such SubPlayItem k exists, an AVClip written in the Clip_information_file_name of the SubPlayItem k is taken as AVClip h (Step S138), and the drive apparatus and the decoder are instructed to play back a portion of AVClip h from Sync_Start_PTS_of_PlayItem to Out_time (Step S140) and the procedure advance to Step S141.

By repeating this series of processing for each of all the pieces of PlayItem information that constitute the PlayList information, the playback of the AVClip defined by the PlayList information is achieved. In this loop processing, every time a piece of PlayItem information is played back, the procedure execution unit 20 performs the "Procedure when Playback Control is Changed". Due to this performing by the procedure execution unit 20, either a PG stream or a text subtitle stream is to be selected. In the case where the selected stream is a text subtitle stream and is specified by a piece of SubPath information, the text subtitle stream is to be played back through the procedure in Steps S136 to S140.

As explained so far, according to the present embodiment, PSRs 48 to 61 indicate, for each of the languages, whether or not the capabilities for displaying the text subtitles are present. When a user wishes to have a text subtitle in a certain language displayed, it is possible to immediately judge if the text subtitle in the language is displayable or not by referring to the value set in a corresponding bit of the register set.

Since it is possible to judge if the text subtitle in each language is displayable or not by referring to a value set in a corresponding bit, even if text subtitles are available in hundreds of different languages, it is possible to immediately judge if subtitles in a desired language are displayable or not.

Second Embodiment

In the second embodiment, detailed description is provided for the internal configurations of text subtitle streams and the TextST decoder 12. FIG. 29 shows the internal configuration of a text subtitle stream.

The first tier in the drawing shows a SubPlayItem information time axis. The second tier shows an EP_map. The third tier shows a text subtitle stream. The following describes the internal configuration of the text subtitle stream shown in the third tier.

The text subtitle stream is made up of only one piece of "style information" at the head and a plurality of pieces of "display information". There is only one piece of "style information" at the head of a text subtitle stream. A piece of style information is made up of one or more "style IDs" each of which is an identifier for the style itself; one or more "font IDs" each of which indicates font data to be used in the expansion to a bit map; one or more "font sizes" used when the expansion to the bit map is performed; and one or more "display positions" each of which shows the horizontal and vertical positions in a display area in the PG plane 8. In a text subtitle stream, these types of information are altogether managed as a "style". There is a possibility that more than one styles is defined in a piece of style information. (In the example shown in FIG. 29, two styles are defined.)

The font sizes are written in the piece of style information so that the minimum size for the font buffer can be determined. In other words, since a font set needs to be pre-loaded, an arrangement is made so that the font data that must be read is clearly indicated before the stream is played back.

Each piece of display information is made up of the "display starting time" of a subtitle; the "display ending time" of the subtitle; a "text code sequence" which is a code sequence for expressing the subtitle; and a "reference value of the style ID" that uniquely specifies a display position at which the text subtitle should be displayed. The EP_map corresponding to the text subtitle specifies each of pieces of display information that constitute the text subtitle as an entry position. Thus, as shown in FIG. 28, in order to play back a portion of a text subtitle, the TextST decoder 12 plays back some of the pieces of display information that correspond to SubPlayItem_In_time and SubPlayItem_Out_time in SubPlayItem information. Thus completes the description of the style information and the display information.

Figure 30A:
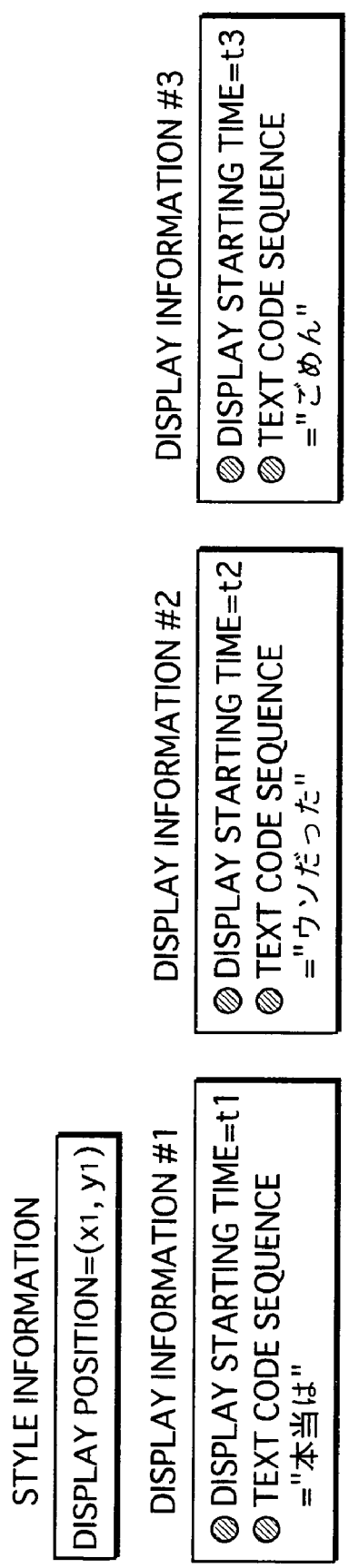
FIG. 30A shows examples of settings of style information and display information.

FIG. 30A shows examples of settings of style information and display information. In this example of settings, style information #1 is set so as to indicate a coordinate (x1, y1) in the Presentation Graphics plane 8.

The three pieces of display information shown in FIG. 30A indicate display areas for the subtitle defined by the style information. The display starting times in the pieces of display information are set at t1, t2, and t3, respectively. The text character sequences in the pieces of display information are set to be "本当は" "ウソだった" "ごめん", respectively. Because of these settings, the subtitle display sequentially changes according to the pieces of display information, as the playback time for the video proceeds.

Figure 30B:
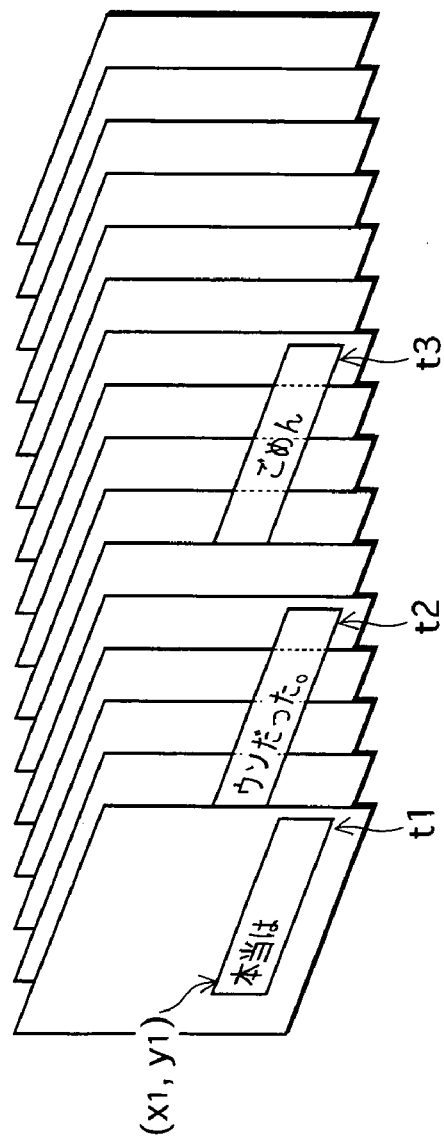
FIG. 30B shows a composite image to be displayed with the text subtitle stream shown in FIG. 30A.

The following discussion is based on the case where the synchronization between the text subtitle stream that includes the pieces of display information shown in FIG. 30A and an AVClip recorded on a BD-ROM is defined by PlayList information stored in the Local Storage 32. As a result of the text character sequences being arranged on the Presentation Graphics plane 8 according to the display positions and the display starting times indicated in the pieces of display information, a composite image as shown in FIG. 30B is to be played back.

Thus completes the description of the internal configuration of text subtitle streams according to the present embodiment.

The following describes an EP_map. The EP_map shown at the second tier in FIG. 29 indicates entry positions of the pieces of display information in a text stream in correspondence with entry times on a SubPlayItem information time axis. Since such correspondence is indicated, it is possible to obtain an address of each piece of display information in the text subtitle from an arbitrary point on the SubPlayItem information time axis.

Thus completes the description of text subtitle streams.

The following describes the playback of a text subtitle stream with the use of SubPlayItem information. As shown in FIG. 29, since the EP_map indicates the correspondence between the entry times and the entry positions, by converting In_times and Out_times included in the SubPlayItem information to entry positions of the text subtitle stream, it is possible to obtain the address of the pieces of display information corresponding to the In_times.

Figure 31:
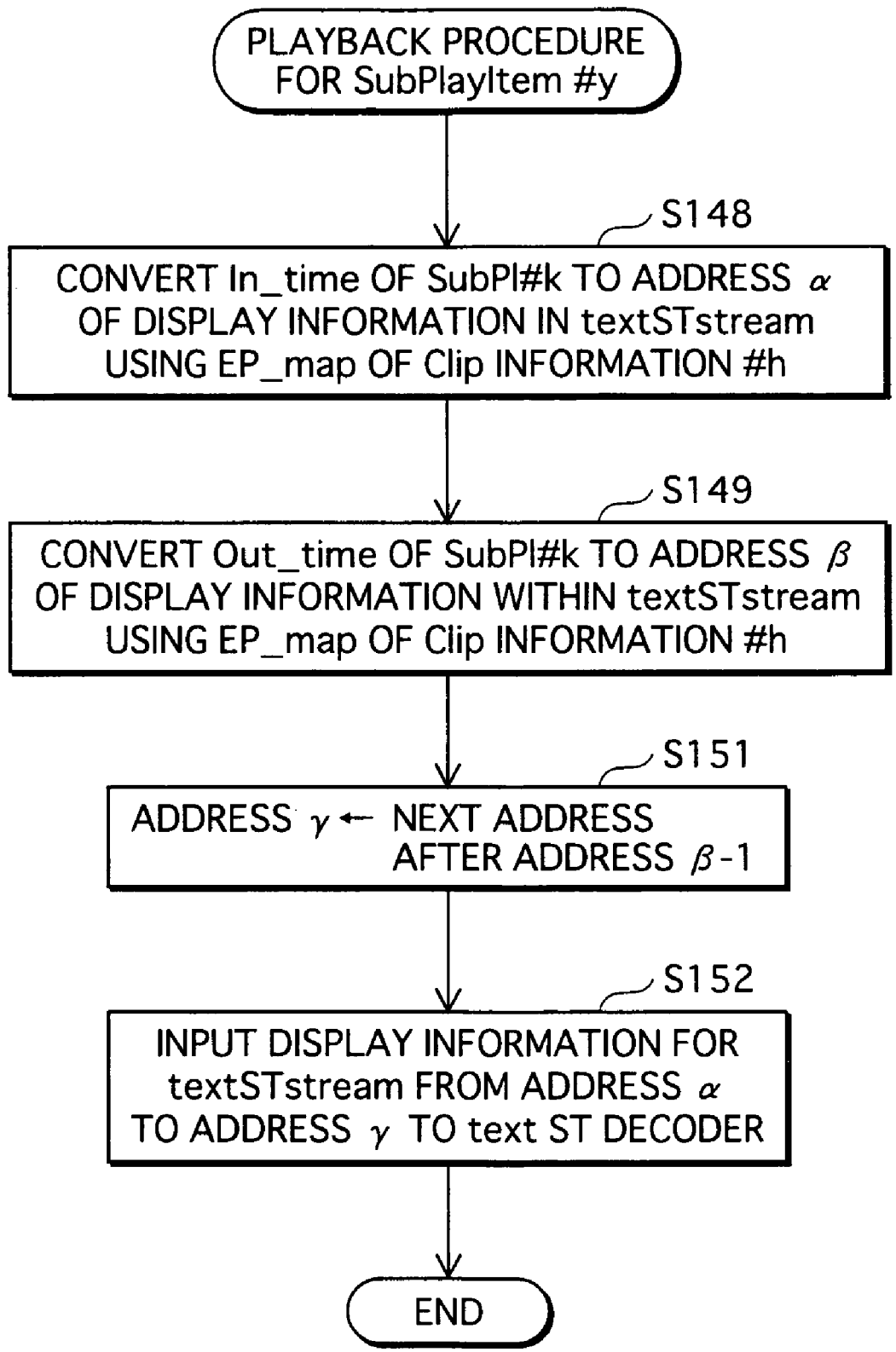
FIG. 31 is a flow chart that shows a playback processing based on SubPlayItem #y.

FIG. 31 is a flow chart that shows the details of Step S140 in FIG. 28 and shows a playback processing for a text subtitle stream.

In Step S148, the In_time of SubPlayItem #y is converted to a relative address α of the piece of display information in the text subtitle stream, with the use of an EP_map of a current Clip information. In Step S149, the Out_time of SubPlayItem #y is converted to a relative address β of the piece of display information in the text subtitle stream, with the use of the EP_map of the current Clip information. The next address after the address β obtained through the conversion is sought out and an address immediately before the next address is taken as an address γ (Step S151). With the use of the address γ obtained this way, a portion of the text subtitle stream from the address α to the address γ is inputted to the TS decoder (Step S152). According to this flow chart, by converting the In_time in the SubPlayItem information to an entry position in the text subtitle stream, it is possible to play back the text subtitle stream based on the SubPlayItem information.

Through the processing described above, since both a MainPath and a SubPath are played back, a composite image made up of a video and a subtitle is to be displayed.

The following describes the internal configuration of the TextST decoder 12 in the present embodiment.

Figure 32:
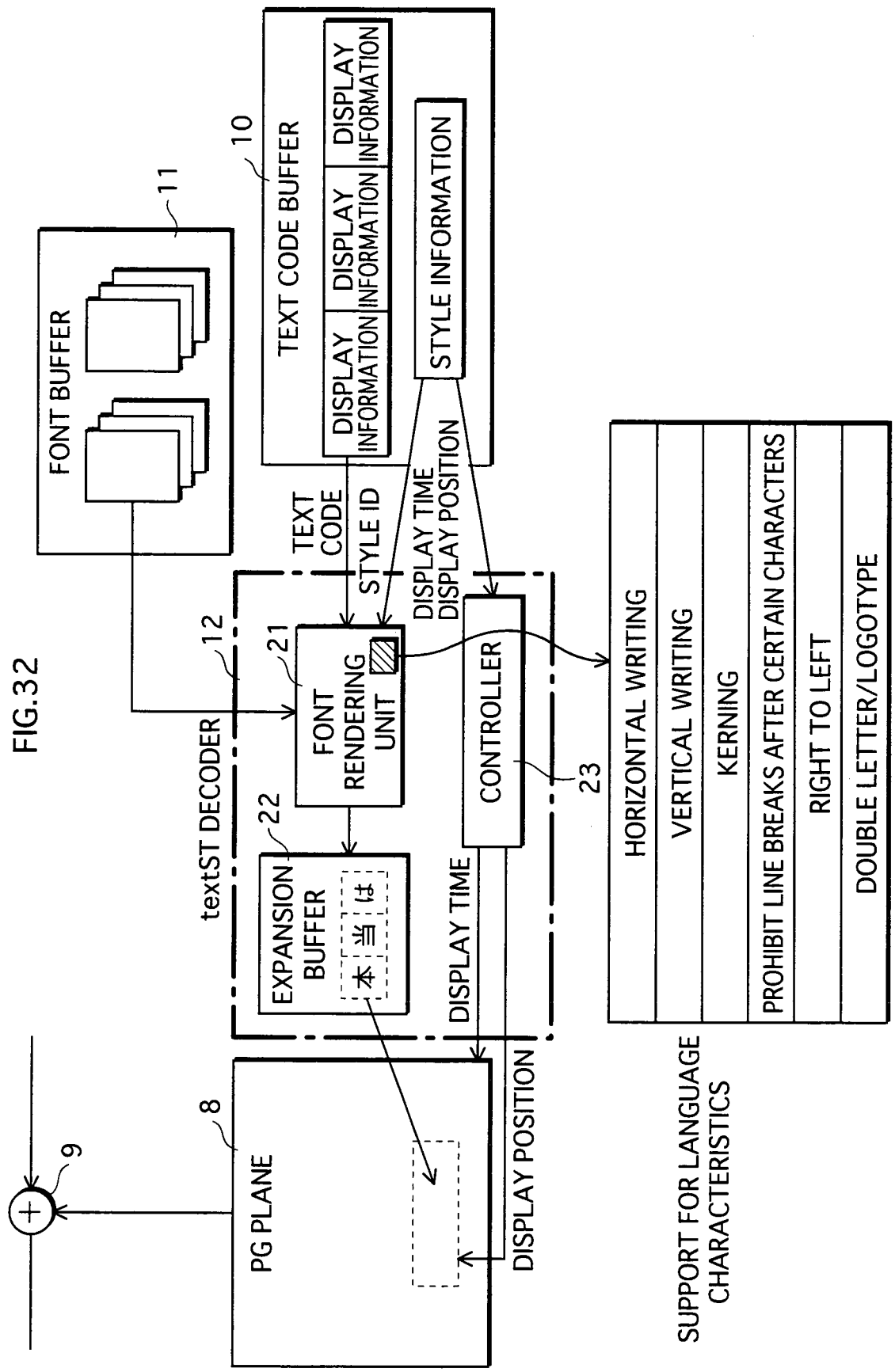
FIG. 32 shows an internal configuration of the Text ST decoder 12.

FIG. 32 shows the internal configuration of the Text ST decoder 12. As shown in the drawing, the TextST decoder 12 comprises a font rendering unit 21, an expansion buffer 22, and a controller 23.

The font rendering unit 21 expands a code sequence in the piece of display information stored in the text code buffer 10 into a bit map. When performing this expansion, the font rendering unit 12 extracts the style ID from the piece of display information, takes out font data that corresponds to the style ID from the buffer, and uses the font data.

The expansion buffer 22 stores therein the bitmap obtained as a result of the expansion performed by the font rendering unit 21.

The processing of reading a code sequence that constitutes a text subtitle stream and the font data that is necessary for expanding the code sequence into a buffer is referred to as "to pre-load" or "pre-loading". In the case where it is possible to read a plurality of streams into the text code buffer 10 and the font buffer 11, the priority order of the reading is determined according to the order in the STN_Table or the like, which is described in the first embodiment. When as many streams as possible are read into the text code buffer 10 and the font buffer 11, sequentially starting with the stream having a highest priority order, it is possible to increase the number of streams that are mutually switchable during a playback without causing a seek.

The controller 23 writes the bit map stored in the expansion buffer 22 to the PG plane 8 according to the display time and the display position indicated in the piece of display information.

When the font rendering unit 21 performs the expansion into the bit map, control is provided so that the language characteristics of the language corresponding to the text subtitle stream can be supported. The language characteristics to be supported includes horizontal writing, vertical writing, kerning, prohibition of line breaks after certain characters, writing from the right to the left, and double letter/logotype.

Here, kerning is a function to narrow spaces between characters depending on the shape of each character in order to improve the appearance. The "prohibition of line breaks after certain characters" refers to a function of prohibiting "。" (a full stop in Japanese) from being positioned at the beginning of a line due to arrangements of the fonts.

Thus completes the internal configuration of the TextST decoder 12. The following describes a newly-noted technical problem that may be experienced when subtitles are expressed with code sequences, although it is not experienced when subtitles are expressed with graphics.

<Technical Problem Related to Expression with Code Sequences>

In the case where a subtitle is expressed with graphics, it is easy to arrange so that the appearance is the same in any playback apparatus. In the case where a subtitle is expressed with character codes, it is necessary to have a module (the font rendering unit 21) called a font generator or a renderer for converting the character codes into a bit map and displaying it on a screen, as shown in the internal configuration in FIG. 32. Different font generators may have different configurations as to the appearance of characters and the languages to be supported.

The reason for this is because in the case where subtitles are expressed with graphics, the appearance is determined during the process of authoring, whereas in the case where subtitles are expressed with character codes, the appearance of the subtitles depends on the performance of the font generator in each playback apparatus.

Shapes of characters may vary more or less even in existing HTML browsers for browsing Web pages, and that is not a very big problem; however, the differences caused by language characteristics as described below may be considerably prominent.

FIG. 33A explains the differences in layouts related to some language characteristics of the Japanese language. "SHAPES OF PARENTHESES" shown in FIG. 33A indicate that the orientations of the parentheses in the horizontal writing are different from those in the vertical writing by 90 degrees. "POSITION OF LETTER" indicates that the position of a small character of "ya" for example needs to be slightly adjusted for each case of the horizontal writing and the vertical writing. "SHAPE OF PROLONGED-SOUND SYMBOL" indicates that the shape of the character itself needs to be changed for each case of the horizontal writing and the vertical writing. FIG. 33B explains a layout related to some language characteristic of the Arabic language. As shown in FIG. 33B, the characters are written from the right to the left in Arabic.

In order for a font generator to generate such special characters and languages, providing corresponding font information is not good enough, and it is necessary to support the language characteristics with rendering functions of the font rendering unit 21 which renders bit maps. Since such support is required, it is desirable to consider that the decoding capability is present only when all aspects of such support are completely provided, in view of quality assurance.

In addition, since BD-ROM playback apparatuses sold in the European and American countries seldom need to display subtitles in Japanese or Arabic, they do not necessarily need to have a font generator for displaying the characters in these languages properly. It is not that each of all the playback apparatuses needs to support all the languages. Since supporting languages incur extra costs, it is not desirable to have all the playback apparatuses support all the languages. If each of all the playback apparatuses must support proper displays of all the languages, it is not desirable to have a situation where it is not possible to manufacture playback apparatuses in some countries because the knowledge of all the target languages necessary for the manufacturing is not available and it is impossible to find out how to manufacture font generators. On the other hand, it is desirable to have as many displayable languages as possible in order to enhance the added value to the manufactured products.

Consequently, in order to give information to an application for controlling text subtitle streams as to which languages can be properly displayed, in the present embodiment, PSRs 48 to 61 are set as shown in FIG. 34.

FIG. 34 shows judgment criteria for setting Decode Capabilities for three languages, namely, Japanese, English, and Arabic.

The table at the top shows whether or not capabilities are present for rendering the character fonts in English, Japanese, and Arabic. The table at the bottom shows whether or not capabilities are present for supporting the language characteristics of English, Japanese, and Arabic.

By referring to the table at the bottom, it is understood that, as for subtitle displays in English, the language characteristics of English are judged to be supported only when the functions of "horizontal writing", "kerning", "doubleletter/logotype" are all supported as bit maps are written into the PG plane 8 (When the language characteristics are supported, SUPPORT FOR LANGUAGE CHARACTERISTICS→1).

As for subtitle displays in Japanese, the language characteristics of Japanese are judged to be supported only when the functions of "horizontal writing" "vertical writing" "prohibit line breaks after certain characters", "characters in smaller size" are all supported as bit maps are written into the PG plane 8. (When the language characteristics are supported, SUPPORT FOR LANGUAGE CHARACTERISTICS→1).

As for subtitle displays in Arabic, the language characteristics of Arabic are judged to be supported only when the functions of "rendering from the right to the left" and "double letter/logotype" are all supported as bit maps are written into the PG plane 8. (When the language characteristics are supported, SUPPORT FOR LANGUAGE CHARACTERISTICS→1).

These functions are based on a premise that a function of expanding code sequences to bit maps (i.e. rendering) is available. Consequently, in the present embodiment, each of the decode capability flags in PSRs 48 to 61 for Japanese, English, and Arabic is turned on, i.e. is set at "1", only when both of the rendering capability and the support capability for the language characteristics are satisfied for the corresponding language.

As playback apparatuses are produced on a commercial basis, engineers at manufacturing companies check which ones of the plurality of criterion shown in FIG. 34 are supported and which ones are not supported by the TextST decoder 12. PSRs 48 to 61 are set according to the criterion of the rendering capability and the support capability. With this arrangement, it is possible to properly make judgment of whether the procedure execution unit 20 is able to decode text subtitle streams and to optimize text subtitle displays in different languages.

Although PSRs 48 to 61 indicate decode capabilities for each of different languages in the present embodiment, it is acceptable to have an arrangement wherein PSRs 48 to 61 indicate whether or not the language characteristics are supported for each of the functions to be supported, such as horizontal writing, vertical writing, kerning, prohibition of line breaks after certain characters, double letter/logotype and so on, instead of indicating for each of the languages. When this arrangement is used, as long as the required functions are determined for each language, it is not necessary to use as many register areas as the number of the languages. In such a case, when each required function is supported, the flag is turned on, and when each required function is not supported, the flag is turned off. In this example, each playback apparatus needs to store therein a correspondence table as shown in FIG. 34; however, since such a correspondence table may be incorporated as a program, instead of as the registers, it is possible to update the program in the event the number of the languages has increased.

As attribute information of text subtitle streams, it is acceptable to indicate, in Clip information, which functions are required for display, instead of the aforementioned information related to the language attributes, i.e. the language is Japanese or English.

Third Embodiment

In the first embodiment, the judgment is made on whether or not the Decode Capability is present in different languages by referring to only the values set in the Decode Capability flags shown in PSRs 48 to 61. In the present embodiment, it is possible to increase the number of the languages in which the subtitles are displayable.

When the target language is not supported by the playback apparatus, font data is supplied by way of a disc or downloading; therefore, even if the positions of the characters maybe improper, the subtitle display will be still readable. Consequently, unsupported languages should be displayed depending the status of each playback apparatus and the user settings. In the case where it is desired to avoid improper displays in unsupported languages, the display should be made impossible.

The following describes possibility of subtitle display in an "unsupported language" whose language characteristics are not supported.

Figure 35B:
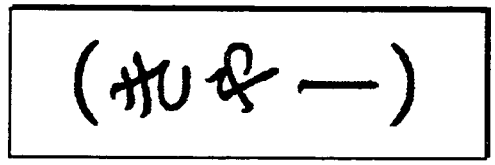
FIGS. 35A and 35B show a subtitle in Japanese in which the vertical writing criterion is completely supported and a subtitle in Japanese in which the vertical writing criterion is not completely supported.
Figure 35A:
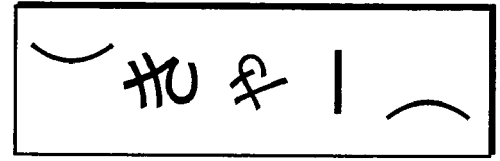

FIGS. 35A and 35B show a subtitle in Japanese in which vertical writing criterion is completely supported and a subtitle in Japanese in which vertical writing criterion is not completely supported. Manufacturing companies that manufacture playback apparatuses would not like to have product claims from users due to some unreadable characters resulting from displays of an unsupported language. For this reason, some manufacturing companies may wish to make it impossible for the playback apparatuses to perform such displays.

On the other hand, even if proper displays of the Japanese language are not supported, the characters may be still readable as shown in FIG. 35B. If the Japanese audio is not provided and the user is not able to understand audios and subtitles in other languages, he/she may wish to have any kind of display even if the characters are more or less difficult to read. If a playback apparatus is able to have a setting by which the subtitles display can be enabled when the user wishes, even though the manufacturer of the playback apparatus in principle has disabled the display, the number of the languages in which subtitles are displayable is increased by far, and the convenience of the user is much improved. In the present example, the term "user/users" refers to end users (final consumers); however, an engineer at a manufacturing company may be a user, too, and the termmerely refers to "a person in general who operates the apparatus".

As explained so far, some manufacturing companies that pay close attention to quality assurance would like to disable a subtitle display like the one shown in FIG. 35B, but some users may wish to have even the subtitle display like the one shown in FIG. 35B, as long as a subtitle display is available.

In order to harmoniously accommodate both the demand of manufacturing companies and the demand of the users, the present embodiment provides improvements as described below. For making it possible to select unsupported languages, the playback apparatus according to the present embodiment has an internal configuration as shown in FIG. 36. The improvements illustrated in this drawing are as follows:

(i) b23 to b16 in PSR 30 have a permission flag that indicates whether or not selecting unsupported languages is permitted.

(ii) In a reserved area of a PSR, it is indicated whether each of the languages belonging to a specific language group is an unsupported language.

(iii) The procedure execution unit 20 makes a selection of the unsupported languages according to b23 to b16 in PSR 30.

(iv) The self test unit 31 and the set-up unit 32 are provided in the control unit 15.

Improvements <1>—b23 to b16 in PSR 30

FIG. 37 shows bit assignments for b23 to b16 in PSR 30 according to the third embodiment. In this drawing, in b23 to b16 in PSR 30, it is indicated whether or not the user selection of unsupported languages is permitted or not.

To be more specific, in the case where b23 to b16 in PSR 30 is "00000000" (=OFF), the unsupported languages will not be displayed even if the user has selected one of them. It is also acceptable to have an arrangement wherein the user is not able to even select. In the case where b23 to b16 in PSR 30 is "10000000" (=ON), the user is able to choose to have a text subtitle stream displayed on a screen although the display may not be proper. Thus completes the description of the improvement made to b23 to b16 in PSR 30.

The following describes the improvement in the reserved area.

Improvements <2>—Reserved Area

Figure 38:
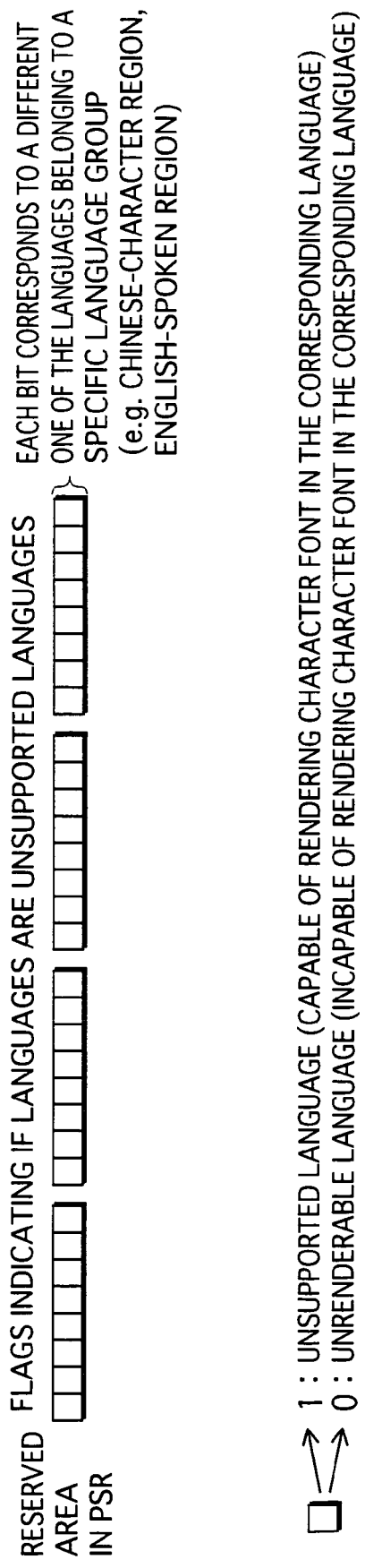
FIG. 38 shows a bit configuration in a reserved area of a PSR.

FIG. 38 shows a bit configuration in the reserved area of the PSR. The reserved area shows whether or not each of the languages belonging to a specific language group, such as a Chinese character region, is an unsupported language. The bits in the reserved area are in correspondence with the different languages in a specific language group, respectively. When a bit is set to be "1", it means that the corresponding language is an unsupported language, whereas when a bit is set to be "0", it means that the corresponding language is a language for which the playback apparatus does not have the rendering capability (i.e. an unrenderable language). With this arrangement of bit settings, it is possible to find out whether each of the languages belonging to a specific language group is an unsupported language or not. The assignment as to which one of the bits in the reserved area corresponds to which one of the languages is made with the use of an assignment table as shown in FIG. 21. Thus completes the description of the improvements in the PSR. The following describes the improvements made to the self test unit 31.

Improvements <3>—Self Test Unit 31

With the self test unit 31, an engineer at a manufacturing company performs testing for the rendering capability and the language characteristic support before the apparatus is shipped from the factory. The appropriate ones of PSRs 48 to 61 are set according to the results of the testing. The set-up unit 32 stores therein various test patterns, provides them for the TextST decoder 12 so that a test display is performed to find out about support for the language characteristics during subtitle displays. The test results are displayed on a display device. In the case where the rendering capability is present and the support capability is not present for a language, the language is registered as an unsupported language according to an operation by the engineer at the manufacturing company. In the case where neither the rendering capability or the support capability is present, the language is registered as an unrenderable language according to an operation by the engineer at the manufacturing company.

Improvements <4>—Set-up Unit 32

Figure 39A:
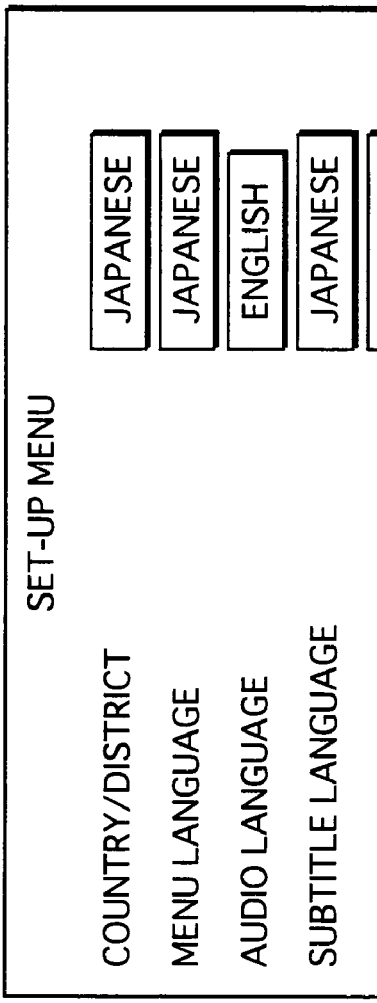
FIGS. 39A and 39B show menus to be displayed when the user wishes to increase the number of the languages.

The set-up unit 32 displays a set-up menu according to a user operation on the remote controller 300 and rewrites the values set in b23 to b16 in PSR30. FIG. 39A shows a set-up menu. As shown in the drawing, the items for which the setting can be received via the set-up menu include five items such as "country/district", "menu language", "audio language", "subtitle language", and "increase displayable languages". The characteristic of the set-up unit 32 lies in that it is possible to receive a designation of whether the number of displayable languages should be increased or not from a user.

Figure 39B:
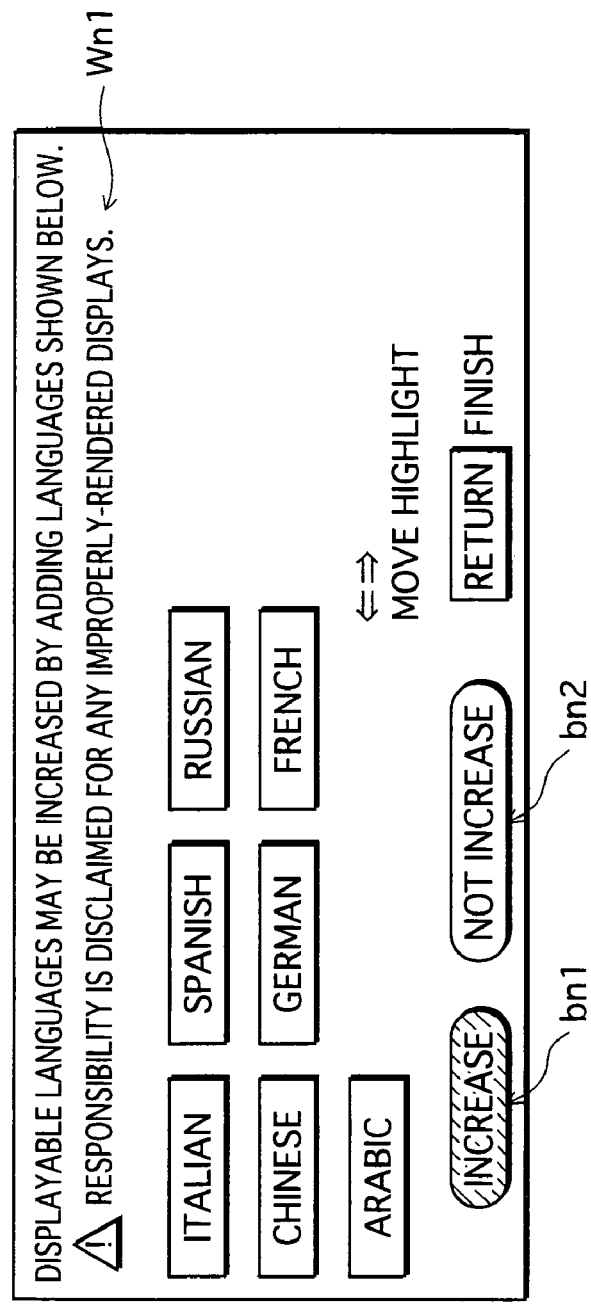

FIG. 39B shows a menu to be displayed in the case where the user wishes to increase the number of the displayable languages. The menu shown in the drawing includes a list of unsupported languages (showing Italian, Spanish, Russian in the drawing), the warning text Wn1 to be displayed when text subtitle streams in the unsupported languages are to be displayed, and the buttons bn1 and bn2 for receiving a selection of whether or not the number of the languages should be increased.

The warning text Wn1 is for giving the user a warning that when a subtitle in one of the unsupported languages is displayed, part of the subtitle may be improper. The buttons bn1 and bn2 are for receiving a selection of whether or not the number of the languages should be increased even if such a waning is given. Thus completes the description of the improvements of the constituent elements of the present embodiment. The following describes the processing procedures of the procedure execution unit 20, the self test unit 32 and the set-up unit 32, with reference to the flow chart in FIG. 40.

Figure 40:
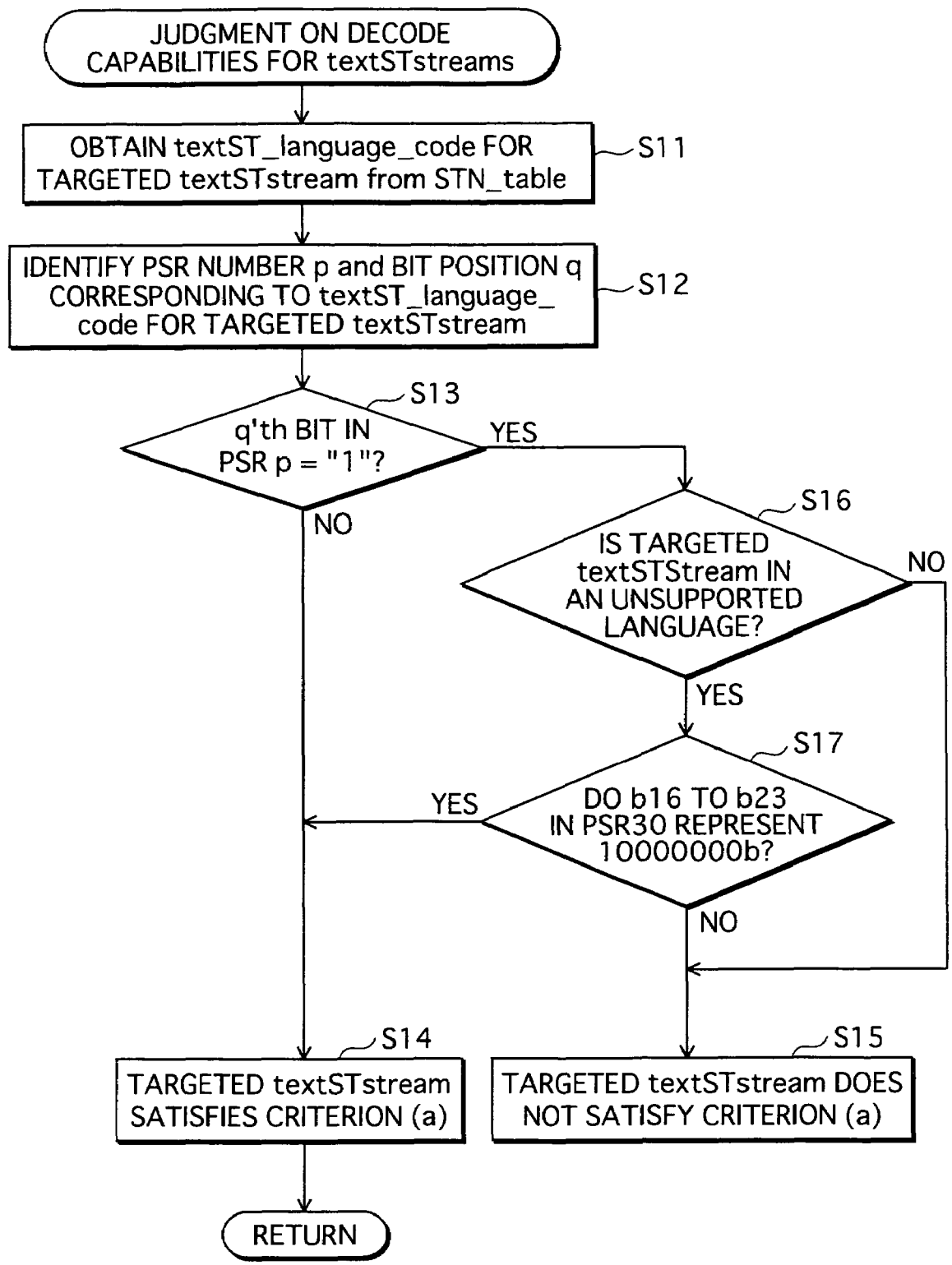
FIG. 40 is a flow chart that shows a judgment procedure for text subtitle streams in the third embodiment.

FIG. 40 is a flow chart that shows a judgment procedure for text subtitle streams in the third embodiment. This flow chart is obtained by adding Steps S16 and S17 to the flow chart shown in FIG. 25.

In Step S16, it is judged whether or not a target text subtitle stream is in an unsupported language. In Step S17, it is judged whether or not b23 to b16 in PSR 30 represents 10000000b. In the case where the judgment results are "Yes" for Step S16 and "Yes" for Step S17, even if the text subtitle stream is in an unsupported language, it is considered that the criterion (a) is satisfied. In the case where the judgment results for one of Steps S16 and S17 is "No", it is judged that the criterion (a) is not satisfied.

Figure 41:
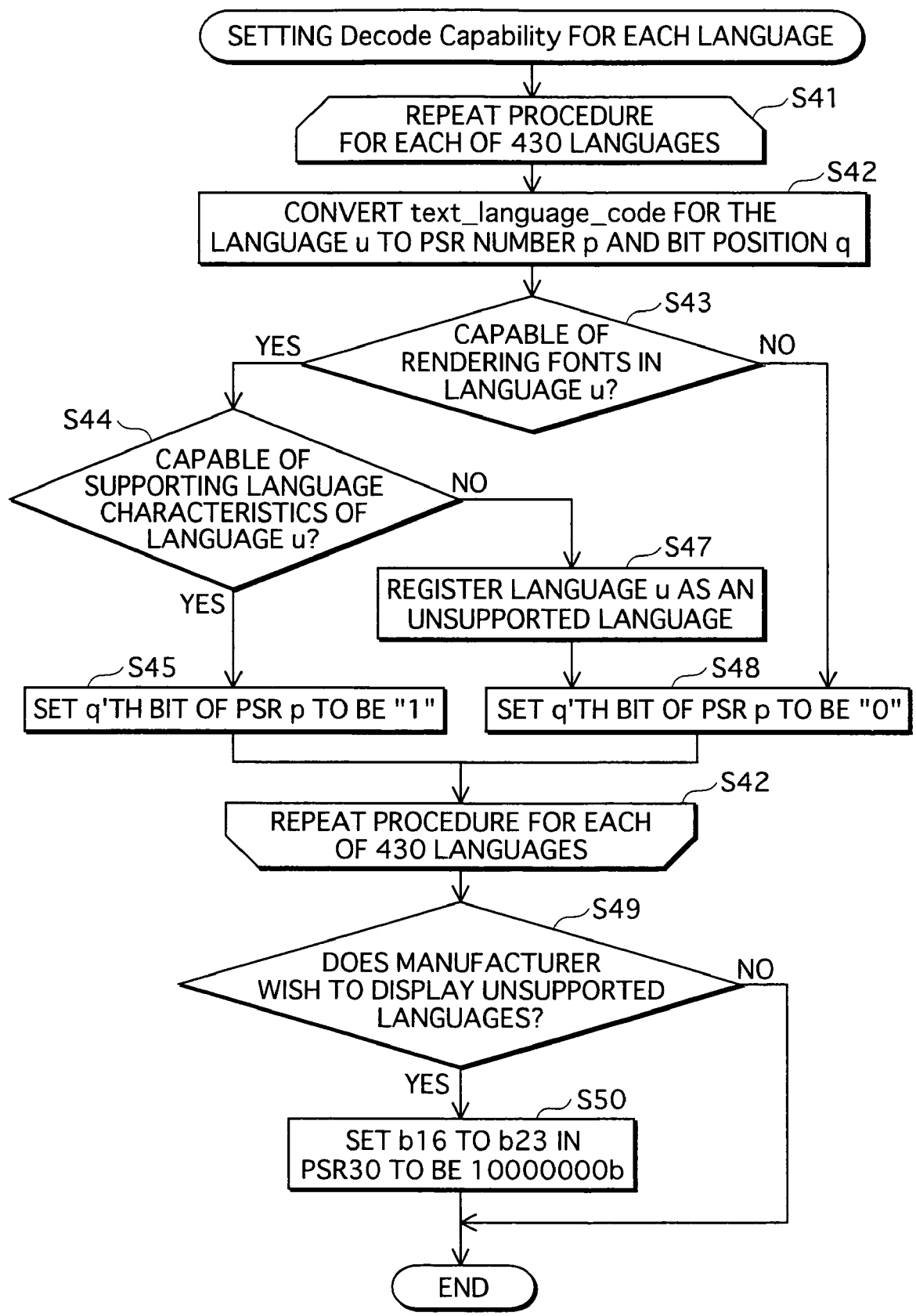
FIG. 41 is a flow chart that shows a judgment procedure for decode capabilities in each of the languages.

FIG. 41 is a flow chart that shows a processing procedure by the self test unit 31. The flow chart shows a loop processing for repeating the processing in Step S42 to S48 for each of 430 languages that are identified with the use of textST_language_code. The language targeted in the loop processing is referred to as a language u. In Step S42, the textST_language_code of the language is converted to a PSR number and a bit position.

In Step S43, it is judged whether the rendering capability for the fonts in the language is present. In the case where the judgment result is that the rendering capability is not present, the q'th bit of the PSR p is set to be "0" (Step S48).

In Step S44, it is judged whether or not the capability for supporting the language characteristics is present. In the case where the judgment result is that the support capability is present, the q'th bit of PSR p is set to be "1" (Step S45). In the case where the judgment result is that the support capability is not present, the language u is registered as an unsupported language (Step S47), and the q'th bit of PSR p is set to be "0" (Step S48).

After the processing above is performed for each of all the languages, the processing in Step S49 and S50 is to be performed. Step S49 is a step of inquiring of the user whether or not subtitle displays in unsupported languages should be performed. In the case where the user wishes to have subtitles in the unsupported languages displayed, Step S50 is performed. Step S50 is the processing for setting b23 to b16 in PSR30 to be 1000 0000. In the case where the user does not wish to have subtitles in the unsupported languages displayed, the processing in Step S50 is skipped. Thus completes the description of the processing procedure by the self test unit 31.

FIG. 42 is a flowchart that shows the processing procedure performed by the set-up unit 32. The set-up unit 32 displays a set-up menu (Step S51), and then judges whether or not there are any unsupported languages (Step S52). If no unsupported language exists, the procedure advances to Step S54. If one or more unsupported languages exist, a setting item for receiving "INCREASE DISPLAYABLE LANGUAGES" is added to the set-up menu (Step S53), and a selection from the setting items in the set-up menu is waited for (Step S54).

When a setting item has been selected, it is judged whether the selected setting item is for increasing the number of the languages (Step S55). If it is not, an appropriate processing procedure is performed for setting the country/district, the menu language, the audio language, and the subtitle language. (Since this processing procedure is not the main gist of the present invention, the explanation thereof will be omitted).

In the case where the selected item is for increasing the number of the languages, the menu shown in FIG. 39 is displayed (Step S56), and a user operation is waited for (Steps S57 and S58). When a move key is pushed (Step S57: YES), a part in the set-up menu is highlighted (Step S59). When a finishing operation is performed (Step S58: YES), it is judged whether a button for increasing the number of the languages is high lighted (Step S60). If the button is not highlighted, the processing is completed. If the button is highlighted, b23 to b16 in PSR30 are set to represent 10000000 (Step S61), and the processing shown in this flow chart is completed.

As explained so far, according to the present embodiment, since the manufacturing company is able to set the flag (b23 to b16 in PRS30) for allowing a user to select even unsupported languages, it is possible to switch the setting as to whether or not the stream selection unit 17 is able to select each of the unsupported languages. Since it is possible to determine whether the selection of unsupported language is enabled or not with just the setting of the flag, the manufacturing company of playback apparatuses are able to easily change the setting as to whether selecting unsupported languages is prohibited in order to have strict quality assurance or selecting unsupported languages is permitted with self-responsibility of users.

With this arrangement, users are able to have text subtitles displayed in a language in which inconvenience may be caused, while acknowledging the possibility that the subtitle displays may have some inconvenience. Since the subtitles in the unsupported languages are displayed with self-responsibility of the users, it is possible to harmoniously cater to both the users and the manufacturing companies.

Alternatively, it is acceptable that the flag (b23 to b16 in PSR30) for allowing a user to select an unsupported language is recorded in Clip information together with text subtitle streams. Further, it is acceptable to have an arrangement wherein, in the case where the flag is recorded both in the playback apparatus and on a disc, processing is performed according to a logical OR or a logical AND.

Fourth Embodiment

According to the third embodiment, in the case where the user wishes to have subtitles in unsupported languages displayed, the processing is performed so that the Decode Capabilities in the unsupported languages are judged to be present. According to the present embodiment, in the case where the user wishes to have subtitles in the unsupported languages displayed, the Decode Capabilities corresponding to the unsupported languages shown in PSRs 48 to 61 are all updated so as to indicate "Decode Capability is present".

FIGS. 43A and 43B show, in comparison, settings of Decode Capability for a case where the user does not wish to have displays in an unsupported language and in a case where the user wishes to. In FIG. 43A, for a language in which the rendering capability="1" and also the support capability="0", the Decode Capability is set to be "0".

In contrast, in FIG. 43B, in the case where the user wishes to have subtitles in the unsupported languages displayed, for a language in which the rendering capability="1" and also the support capability="0", the Decode Capability is changed to be "1". In the present embodiment, an updating processing is performed so that the Decode Capability is changed to be "1" for a language in which the rendering capability="1" and also the support capability="0".

The improvements for realizing this updating process are made in the set-up unit 32.

Figure 44:
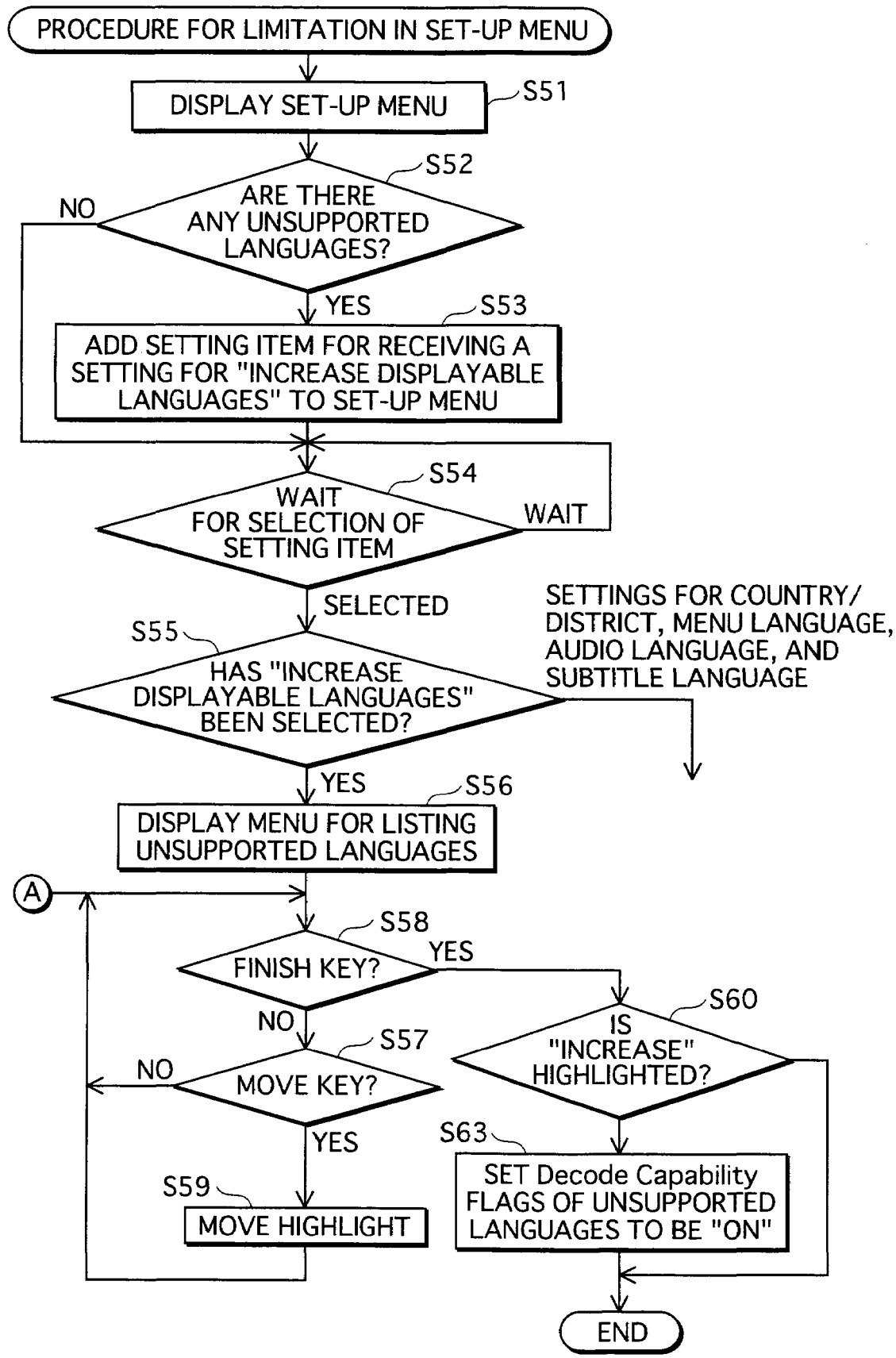
FIG. 44 is a flow chart that shows the processing procedure performed by the set-up unit 32 according to the fourth embodiment.

FIG. 44 is a flow chart that shows the processing procedure performed by the set-up unit 32 according to the fourth embodiment. This flow chart is based on the flow chart shown in FIG. 42. The difference from the flow chart in FIG. 42 lies in that Step S63 is performed instead of Step S61. Step S63 is performed in the case where it is judged that the button for increasing the number of the languages is highlighted (Step S60: YES). In Step S63, the Decode Capability flags indicating the Decode Capabilities in all the languages corresponding to the unsupported languages are set to be "1". As a result of Step S63, in the case where the user wishes to increase the number of the languages, the Decode Capability flags for all those languages are set to be "1" altogether.

As explained so far, according to the present embodiment, if the user wishes, the Decode Capability flags corresponding to the unsupported languages shown in PSRs 48 to 61 are set to be "1"; therefore, the procedure for setting PSR 2 is easier.

Fifth Embodiment

The fifth embodiment is related to interruptions during playbacks. The "interruption during playbacks" mentioned here refers to an interruption that occurs during a playback due to reading of unpre-loaded text subtitle stream from a BD-ROM into a buffer when an AVClip is played back. Such an interruption is caused when a user attempts to select s text subtitle stream that is written in an STN_Table but has not been pre-loaded.

In the case where subpath information specifies a plurality of streams, there is a possibility that only some of the streams can be read into the buffer, depending on the capacities of the text code buffer 10 and the font buffer 11. When switching occurs from a stream to an unpre-loaded stream, a disc seek is performed on the BD-ROM so as to read the data, and thus the playback of the AVClip is interrupted.

Figure 45:
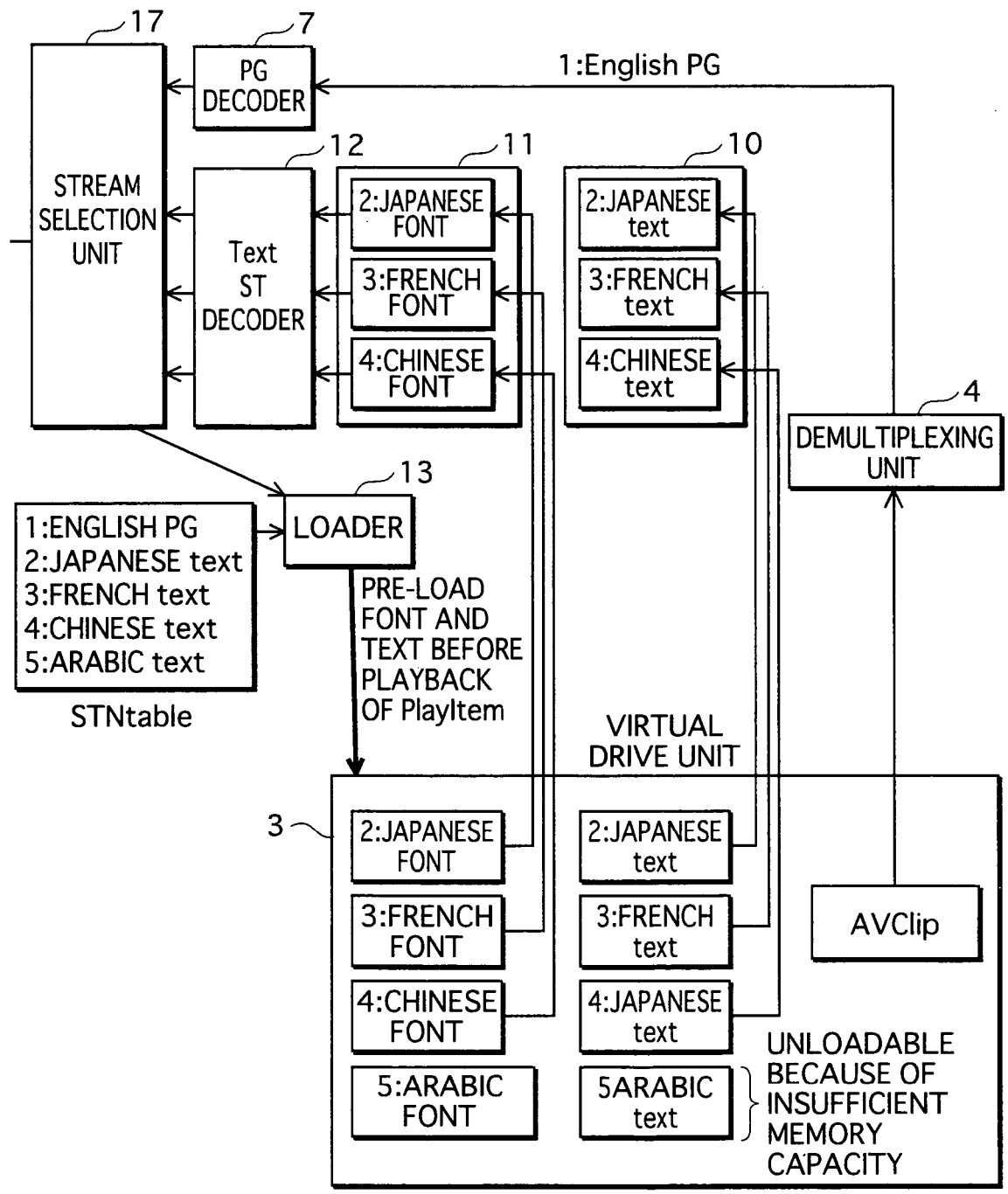
FIG. 45 shows a preloading into a buffer, performed by the loader 13.

FIG. 45 shows how switching between text subtitle streams is performed in the case where the capacities of the text code buffer 10 and the font buffer 11 are only for three languages.

In the drawing, after text subtitle streams for three languages, namely Japanese, French, and Chinese have been pre-loaded, the playback of a MainPath is started. When the loader 13 is to perform the pre-loading based on the STN_Table shown in FIG. 10, the pre-loading performed by the loader 13 is shown in FIG. 45. FIG. 45 shows a pre-loading into a buffer, performed by the loader 13. More specifically, the text subtitle streams are sequentially loaded into the buffer starting with the one having a higher writing order in the STN_Table. When the buffer is filled, the pre-loading is terminated. The text subtitle stream having the lowest order in the STN_Table (the text subtitle stream in Arabic in the example shown in the drawing) will not be pre-loaded into the buffer.

Figure 46:
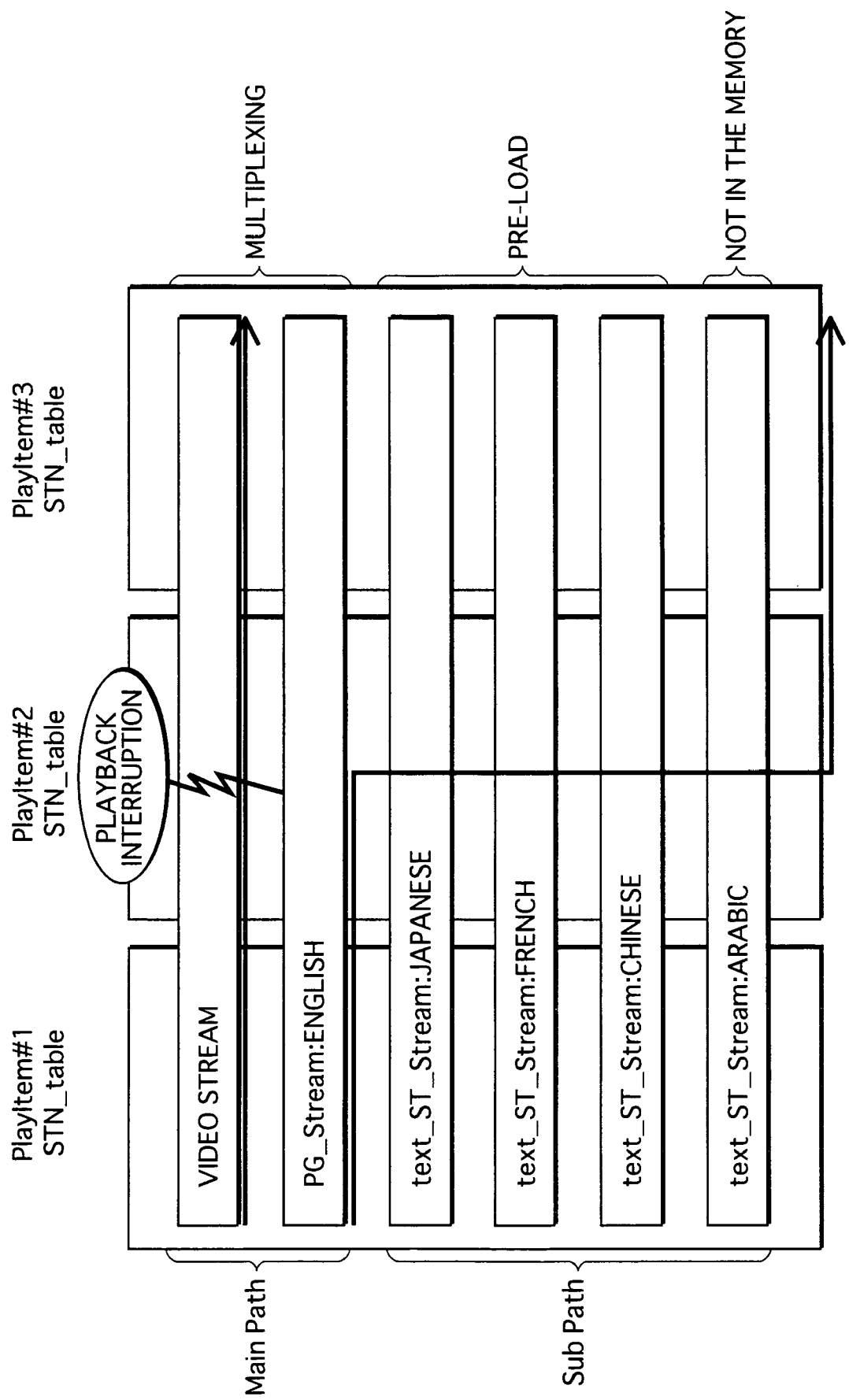
FIG. 46 shows a selection, to be made by the stream selection unit 17, of a text subtitle stream that has not been pre-loaded.

Since the text subtitle stream in Arabic is written in the STN_Table although the stream has not been pre-loaded into the buffer, the stream selection unit 17 may select the un-preloaded text subtitle stream as a playback target, as shown in FIG. 46.

In the case where a text subtitle stream selected by the stream selection unit 17 is not in the buffer, since a processing for loading the stream into a memory needs to be performed, the text subtitle stream is read into the buffer during the playback of the AVClip. In such a case, the stream selection unit 17 temporarily suspends the playback of the AV stream, and then after the Arabic text subtitle steam has been read into the text code buffer 10 and the font buffer 11, the playback is resumed from the point at which the playback is suspended.

Figure 47:
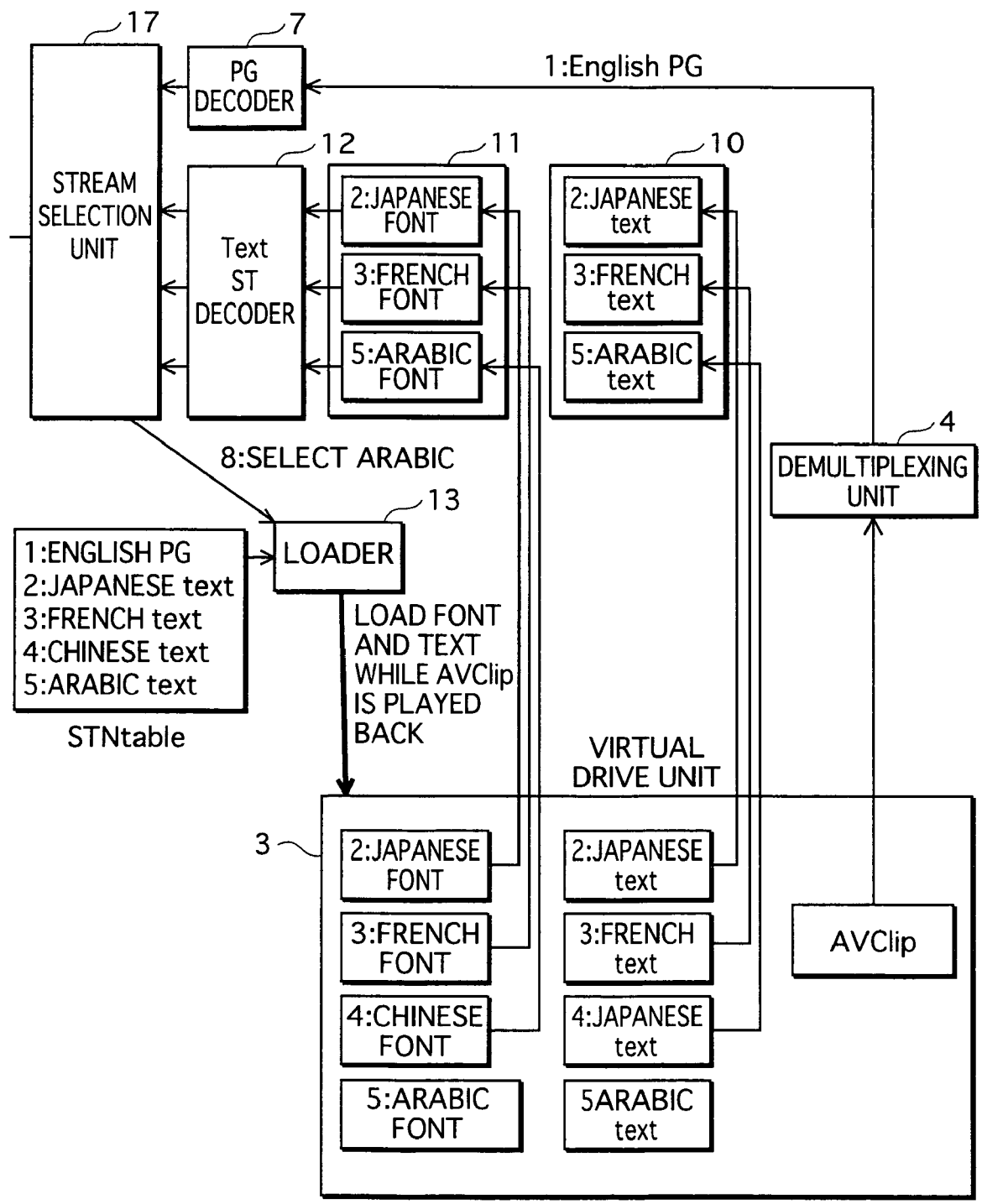
FIG. 47 schematically shows a loading processing performed by the loader 13 in a case where the user has selected, during a playback of an AVClip, a text subtitle stream that has not been pre-loaded.

FIG. 47 schematically shows a loading processing performed by the loader 13 in a case where the user has selected, during a playback of an AVClip, a text subtitle stream that has not been pre-loaded.

Figure 48A:
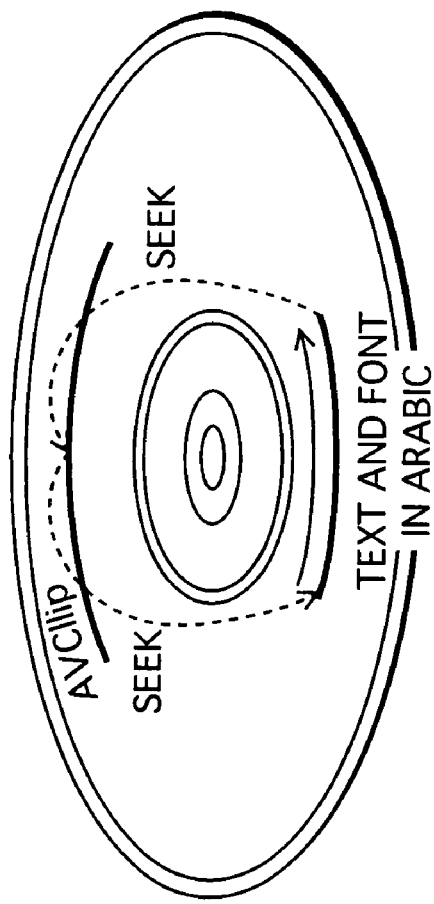
FIG. 48A shows a seek from a recording area of an AVClip to a recording area of a text subtitle stream and a seek from a recording area of a text subtitle stream to a recording area of an AVClip.
Figure 48B:
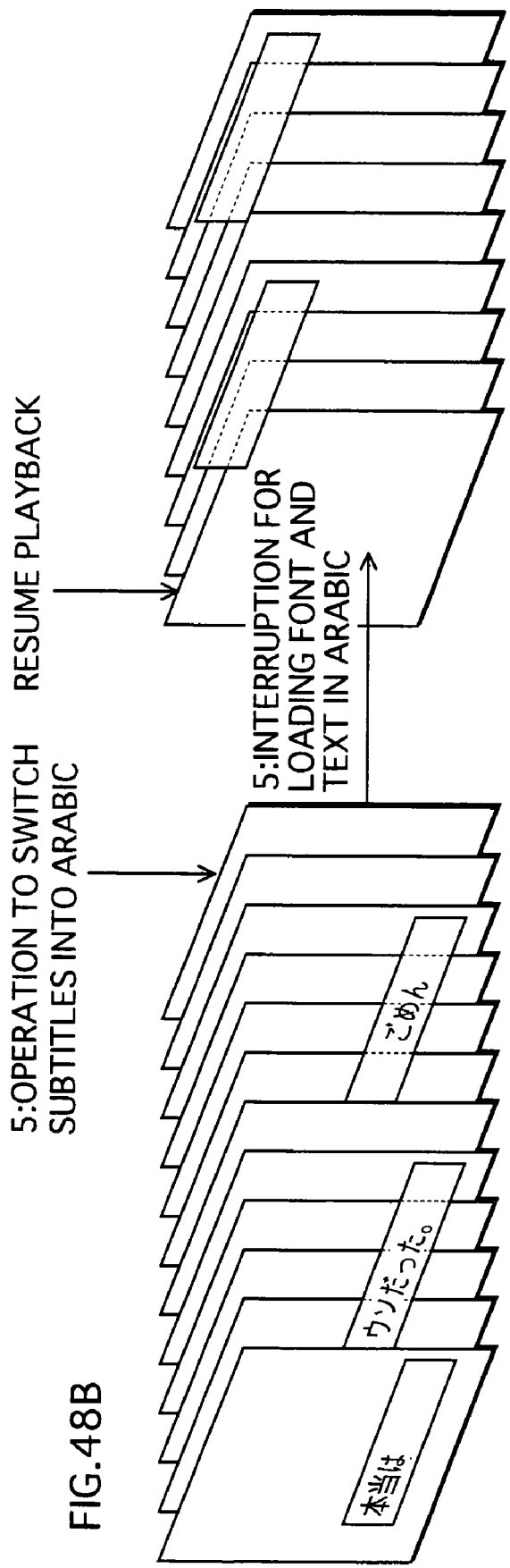
FIG. 48B shows an interruption during a playback of AVClips due to a discontinuity in supply of AVClips to a decoder.

During the playback of the AVClip, the optical pick-up unit attempts to read the unpre-loaded text subtitle stream while accessing the AVClips at the same time. The reading in this case involves a seek from the recording area of the AVClip to the recording area of the text subtitle stream and a seek from the recording area of the text subtitle stream to the recording area of the AVClip, as shown in FIG. 48A. While the seeking is performed, since the supply of AVClip to the decoder is interrupted as shown in FIG. 48B, the playback of the AVClip is interrupted. It is not very reasonable that while so much attention is paid to prevent interruptions during playbacks of text subtitle streams in some languages, an interruption occurs during a playback in a language that has not been pre-loaded. Some users, however, may wish to increase the number of languages to which a subtitle display switch can be made even if the playback of the AVClip may be interrupted. The manufacturing company will have a hard time deciding which one should be prioritized, to avoid the playback interruption or to increase the number of the languages.

Various factors will affect decisions related to the demand for a continuous playback of an AVClip, i.e. playing back an AVClip without interruptions and the demand for prioritizing the switching between streams even if the playback of an AVClip may be interrupted. Consequently, the playback apparatus needs to have a standard on which prioritizing of the demands can be based. In the present embodiment, such a standard is provided within the playback apparatus.

FIG. 49 shows an internal configuration of the playback apparatus in the present embodiment. The following describes the improvements made in the playback apparatus according to the present embodiment with reference to the drawing. The improvements made in the present embodiment are four points as below:

(i) An improvement made to the loader 13 shown in the drawing is that a pre-load management table 33 is added.

(ii) An improvement made to the PSR set is that a permission flag is added to a reserved area of a PSR.

(iii) An improvement made to the stream selection unit 17 is, when a judgment is made as to which one of a PG stream and a text subtitle stream should be selected, other judgment criteria are added, such as if the permission flag is on and if the text subtitle stream has been pre-loaded, to the aforementioned judgment criterion (a) and (b).

(iv) An improvement made to the set-up unit 32 is the permission flag is turned off and on according to a user operation.

The following describes in detail each of the improvements made to the playback apparatus in the present embodiment.

Improvements <1>—Pre-Load Management Table 33

The pre-load management table 33 is a table that shows which ones of the text subtitle streams written in an STN_Table have been pre-loaded and which ones have not been pre-loaded. In order to perform the pre-loading into the text code buffer 10 and the font buffer 11, the loader 13 generates the pre-load management table based on the STN_Table. When a preloading of an individual text subtitle stream is completed, the item in the pre-load management table 33 corresponding to the text subtitle stream is turned "ON". The pre-loading of the text subtitle streams is repeated until the text code buffer 10 and the font buffer 11 are filled. As a result of this processing, the pre-load management table shows text subtitle streams of which the pre-loading has been completed and text subtitle streams of which the pre-loading has not been completed.

Improvements <2> Seamless Flag

FIG. 50 shows an example of a seamless flag provided in a reserved area of a PS. The leaders in the drawing show the meanings of the seamless flag. The seamless flag shown in this drawing is provided in a reserved area of a PSR. When the seamless flag is set to be "1", it means that a seamless playback is prioritized. In other words, it means that a selection of a text subtitle stream that will cause an interruption during the playback of the AVClip is not permitted. In the case where the seamless flag is set to be valid i.e. set to be "1(=ON)", a playback of the AVClip without interruptions (a seamless playback) is prioritized; therefore, switching to a stream that has not been pre-loaded is prohibited. In the case where the seamless flag is set to be invalid i.e. set to be "0(=OFF)", seamless playbacks of AVClips are not so important; therefore, it is possible to switch over to any stream registered in the STN_Table. When switching over to an unpre-loaded stream is performed, the playback of the AVClip is suspended so that the switching can be performed. Thus completes the description of the seamless flag.

Improvements <3> Stream Selection Unit 17

The stream selection unit 17 according to the present embodiment judges whether or not the user wishes to have a switching between text subtitle streams that may cause an interruption during a playback of an AVClip based on the value set in the seamless flag. According to the judgment result, the procedure is performed for determining whether or not a text subtitle stream that is not in the buffer should be a selection option.

Figure 51A:
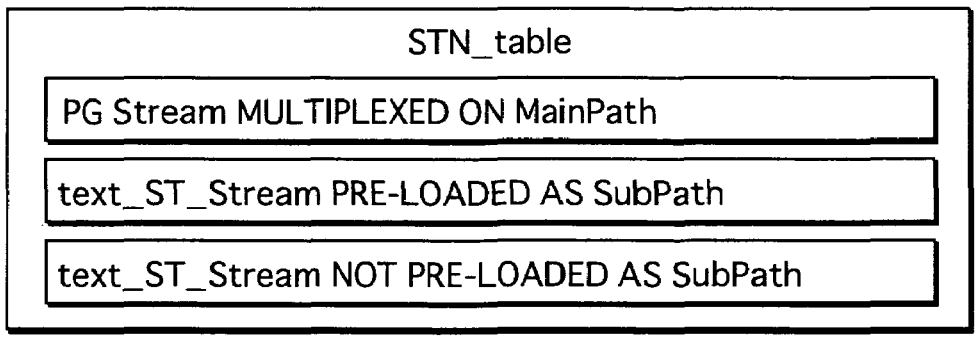
FIG. 51A is an STN_Table in which a PG stream multiplexed onto an AVClip and a pre-loaded text subtitle stream, and an unpre-loaded text subtitle stream are written.
Figure 51B:
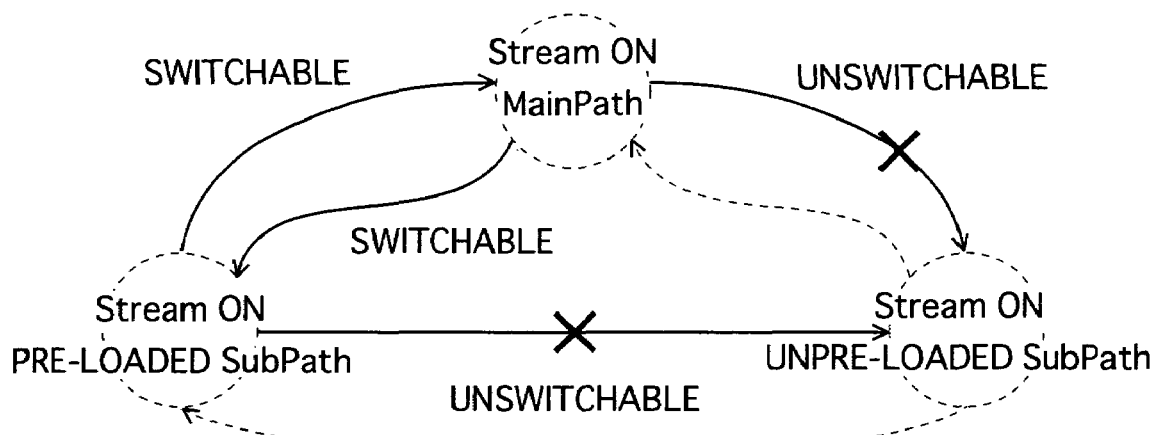
Figure 51C:
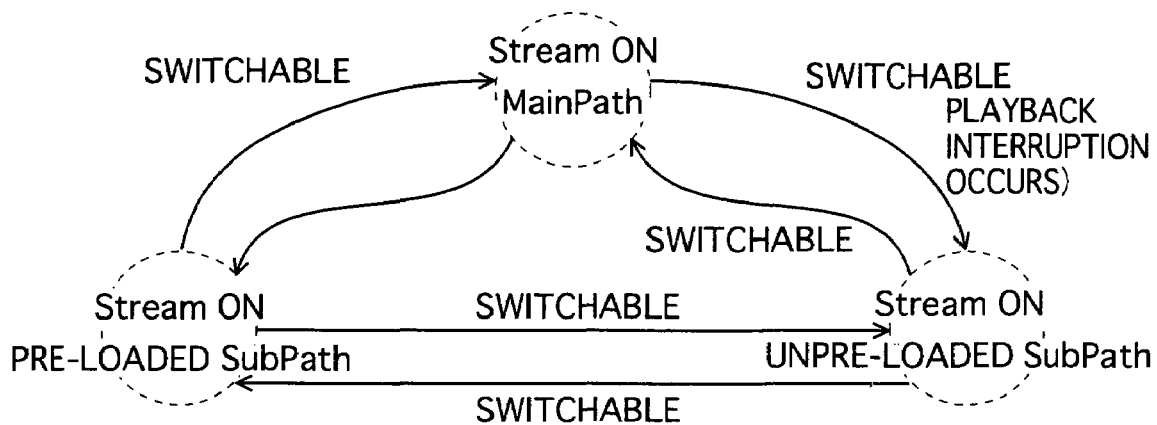
FIG. 51C shows state transitions in a case where the seamless flag is set to be off.

As shown in FIG. 51A, it is assumed that a PG stream multiplexed onto an AVClip, a text subtitle stream that has been pre-loaded, and another text subtitle stream that has not been pre-loaded are written in an STN_Table. When the seamless flag is set so that a seamless playback is prioritized, there will be a state transition as shown in FIG. 51B. The circles in the drawing schematically represent the PG stream on the MainPath side, the text subtitle stream on the SubPath side that has been pre-loaded, and the text subtitle stream on the SubPath side that has not been pre-loaded. The arrows show the switching between the streams. In the case where the seamless flag is on, it is possible to perform a switching from the PG stream to the pre-loaded text subtitle stream as well as a switching from the pre-loaded text subtitle stream to the PG stream. Conversely, in the case where the seamless flag is off, as shown in FIG. 51C, it is impossible to perform a switching from the PG stream to the unpre-loaded text subtitle stream and a switching from the unpre-loaded text subtitle stream to the PG stream. Thus completes the description of the improvements made to the stream selection unit 17.

Improvements <4>—Set-up Unit 32

Figure 52A:
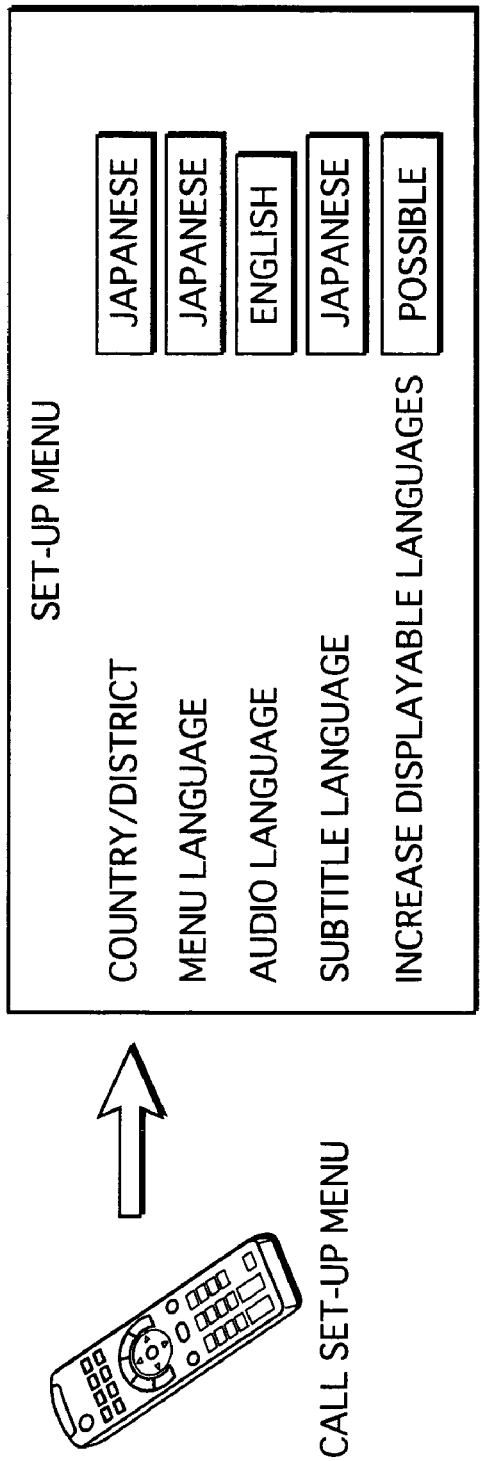
FIG. 52A shows a set-up menu to be displayed according to the embodiment.

The set-up unit 32 displays a set-up menu in accordance with a user operation on the remote controller 300, like in the third embodiment, and updates the seamless flag in the reserved area of the PSR. FIG. 52A shows a set-up menu to be displayed by the self test unit 31 in the present embodiment.

The items for which the settings can be received via the set-up menu include five items such as "country/district", "menu language", "audio language", "subtitle language", and "increase displayable languages". The characteristic of the set-up unit 32 lies in that it is possible to receive a designation of whether the number of displayable languages should be increased or not from a user. To "increase the number of the languages" in the present embodiment is different from that in the first through third embodiments. In the present embodiment, it means to add text subtitles in a language that is not allowed to be selected in order to realize seamless playbacks, to the selection options.

Figure 52B:
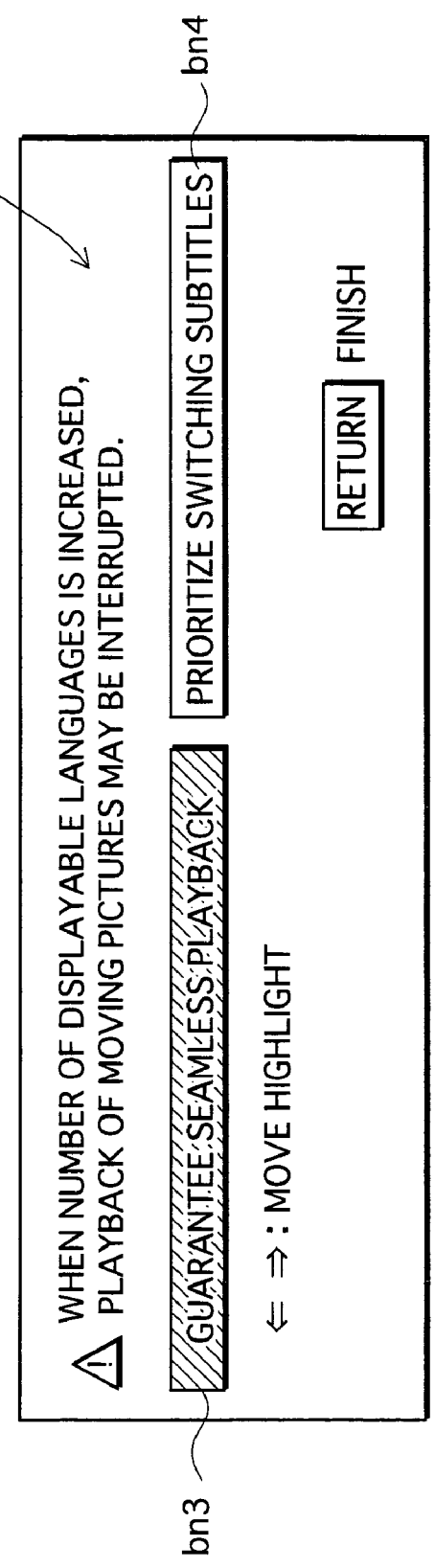
FIG. 52B shows a menu to be displayed when the user wishes to increase the number of the languages.

FIG. 52B shows a menu to be displayed when the user wishes to increase the number of the languages. The menu shown in the drawing includes a warning text Wn2 indicating that increasing the number of the languages may cause an interruption during the playback of the video, a button bn3 for receiving an operation to have seamless playbacks guaranteed, and a button bn4 for receiving an operation to prioritize subtitle switchings over seamless playbacks.

The warning text Wn2 indicates that increasing the number of the languages may cause an interruption during the playback of the video. The aforementioned buttons bn3 and bn4 are for receiving a selection of whether or not the number of the languages should be increased even if such a warning is given. With the use of such a display, the user is able to select whether a subtitle display should be performed or not with self-responsibility. With this arrangement, it is possible to harmoniously accommodate the demand for playing back an AVClip without interruptions and the demand for prioritizing switchings between streams even if the playback of an AVClip may be interrupted.

Thus completes the description of the improvements made to the constituent elements in the present embodiment. The following describes the selection procedure performed by the stream selection unit 17 according to the present embodiment.

Figure 53:
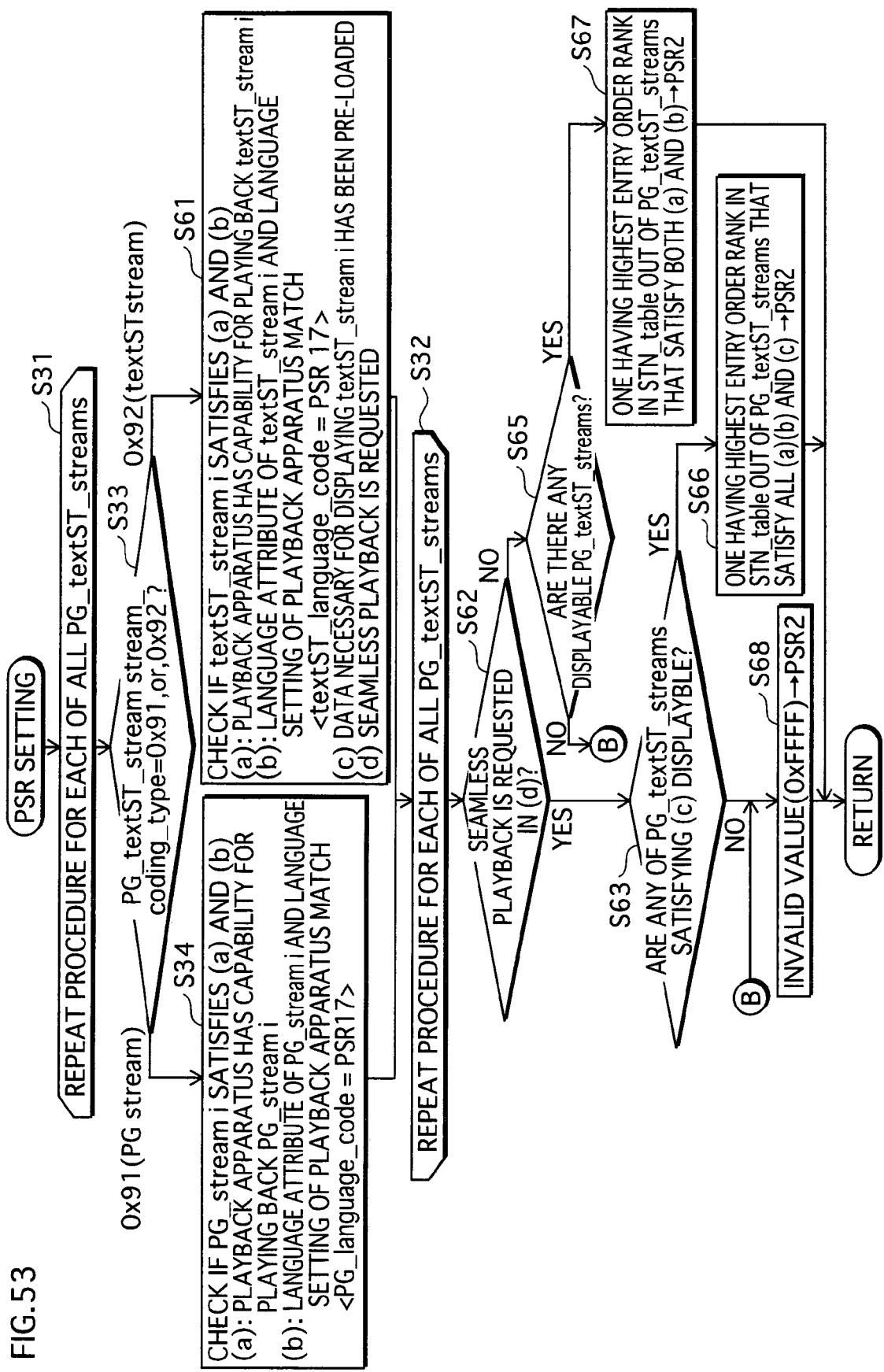
FIG. 53 is a flow chart that shows a selection procedure according to the fifth embodiment.

FIG. 53 is a flowchart that shows the selection procedure performed by the stream selection unit 17 according to the fifth embodiment. This flow chart is obtained by improving the one shown in FIG. 24. Like in FIG. 24, each of Steps S31 and S32 in the flow chart is a loop processing in which the processing in Steps S33 to S34 and Step S61 is repeated for each of the PG stream and the text subtitle stream written in the STN_Table. Although the processing in Steps S33 and S34 is the same as the one shown in FIG. 24, the processing in Step S61 is different from FIG. 24.

To be more specific, in Step S61, it is judged whether text_ST stream i satisfies the following four criterion (a), (b), (c), and (d):

(a) If the playback apparatus has a capability for decoding the text subtitle stream i.
(b) If the language attribute of the text subtitle stream i matches the language setting of the playback apparatus.
(c) If the data required for displaying the text subtitle stream i has been pre-loaded.
(d) If a seamless playback is requested.

The judgment of whether or not the criterion (c) is satisfied is made by referring to the pre-load management table. The judgment of whether or not the criterion (d) is satisfied is made by referring to the permission flag in the reserved area of the PSR.

After the processing in Steps S33 to S35 is repeated for each of all the PG_textST_streams, the processing in Step S62 to S63 and in Steps S65 to S68 is performed.

In Step S62, it is judged whether or not a seamless playback is requested according to the seamless flag. In Step S63, it is judged whether or not any of the PG streams and text subtitle streams satisfying the criterion (c) are displayable.

In the case where a seamless playback is not requested according to the seamless flag, the judgment result in Step S62 is NO, and the processing like the one shown in FIG. 24 is to be performed. In other words, it is judged if there are any displayable PG streams or displayable text subtitle streams (Step S65), and if there are, out of the PG streams and the text subtitle streams satisfying both the criteria (a) and (b), the one having the highest order rank in the STN_Table is set into PSR2 (Step S67). If there are not, an invalid value is set into PSR 2 (Step S68).

When a seamless playback is requested according to the seamless flag (Step S62: YES), and also there are one or more text subtitle streams satisfying the criteria (c) (Step S63: YES), out of the PG streams and the text subtitle streams satisfying all of the criteria (a), (b) and (c), the one having the highest entry order rank is set into PSR2 (Step S66).

In the case where a seamless playback is requested according to the seamless flag (Step S62: YES), but there is no text subtitle stream satisfying the criterion (c) (Step S63: NO), an in valid value is set into PSR2 (Step S68). Thus completes the description of the flow chart in FIG. 53.

Figure 54:
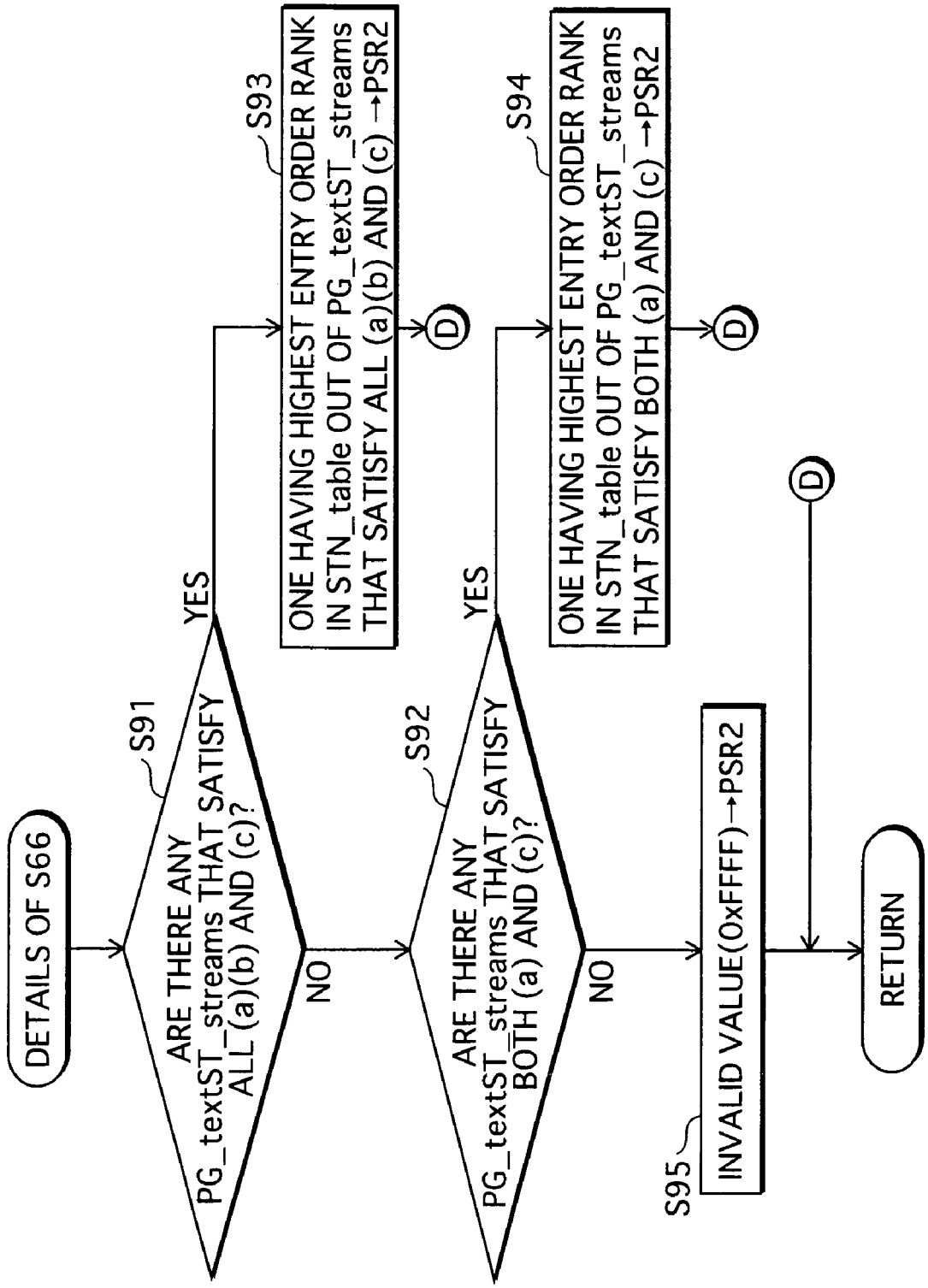
FIG. 54 is a flow chart that shows in detail the processing in Step S66 shown in FIG. 53.

FIG. 54 is a flow chart that shows in detail the processing in Step S66 in FIG. 53.

In Step S91, it is judged if there are any PG streams and text subtitle streams that satisfy all of the criteria (a), (b), and (c). If there are, out of the PG streams and the text subtitle streams satisfying all of the criteria (a), (b) and (c), the one having the highest order rank in the STN_Table is set into PSR2 (Step S93).

If there is no PG stream or text subtitle stream that satisfies all of the criterion (a), (b), and (c), the processing in Step S92 is to be performed. In Step S92, it is judged if there are any PG streams or text subtitle streams that satisfy both of the criteria (a) and (c). If there are, out of the PG streams and the text subtitle streams satisfying both of the criteria (a) and (c), the one having the highest order rank in the STN_Table is set into PSR2 (Step S94).

Figure 55:
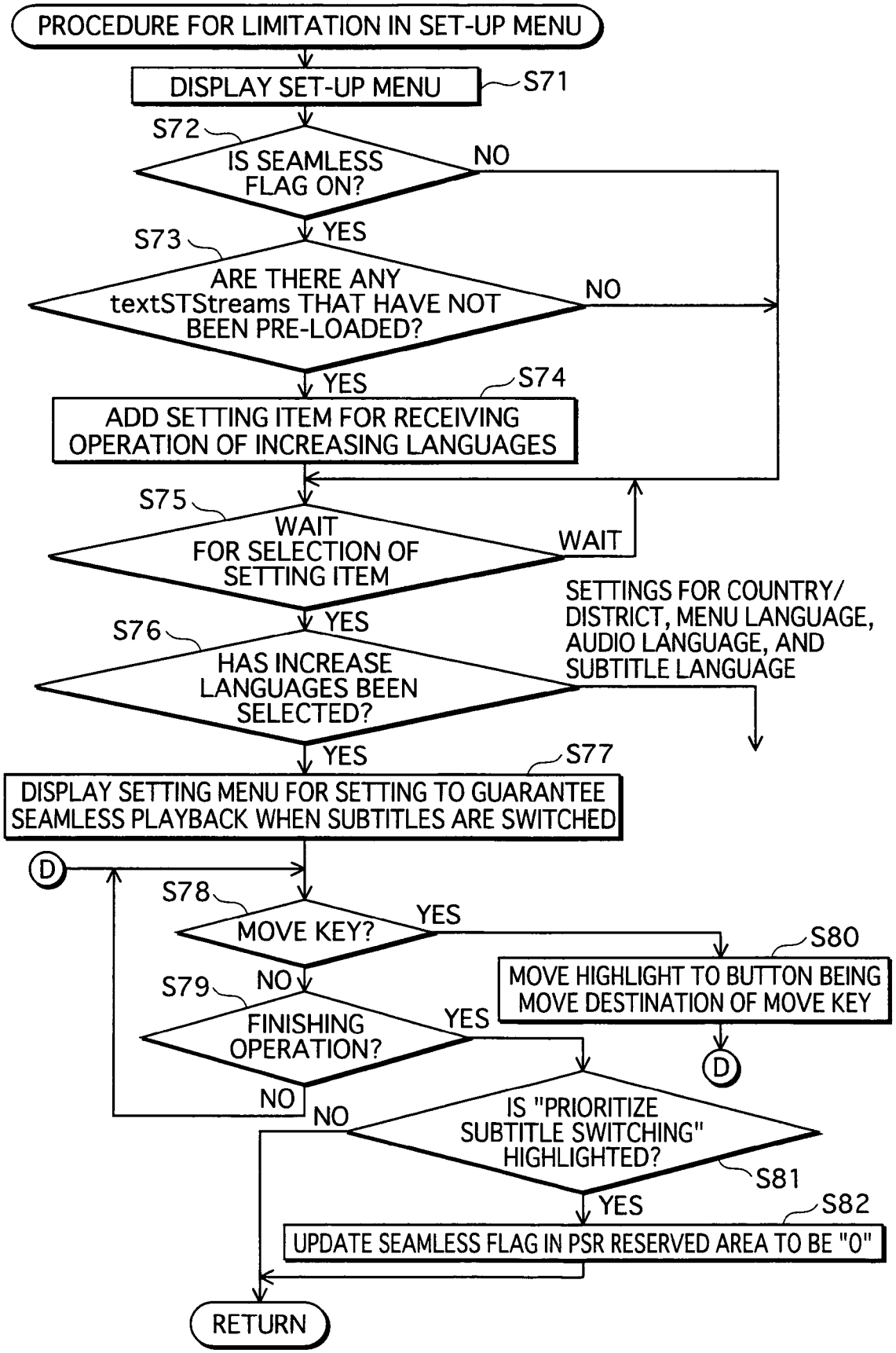
FIG. 55 is a flow chart that shows a processing procedure performed by the set-up unit 32.

Thus completes the processing procedure performed by the procedure execution unit 20 according to the present embodiment. The following describes the setting of the seamless flag performed by the set-up unit 32. FIG. 55 is a flow chart that shows the setting procedure of the seamless flag performed by the set-up unit 32.

FIG. 55 is a flow chart that shows a processing procedure performed by the set-up unit 32. After the set-up unit 32 displays a set-up menu (Step S71), the judgment processing in Steps S72 and S73 is performed. In Step S72, it is judged whether the seamless flag is turned on. In Step S73, it is judged if there are any text subtitle streams that are written in an STN_Table but have not been pre-loaded.

If the judgment results of both Step S72 and S73 are YES, a selection item for receiving an operation to increase the number of the languages is added to the set-up menu. If one of the judgment results in Steps S72 and S73 is NO, Step S74 is skipped.

Subsequently, a selection from the setting items in the set-up menu is waited for (Step S75).

When a setting item has been selected, it is judged whether the selected setting item is for increasing the number of the languages (Step S76). If it is not, an appropriate processing procedure is performed for setting the country/district, the menu language, the audio language, and the subtitle language. (Since this processing procedure is not the main gist of the present invention, the explanation thereof will be omitted).

In the case where the item selected by the user is for increasing the number of the languages, the menu shown in FIG. 52B is displayed, and a user operation is waited for (Steps S78 and S79). When a move key is pushed (Step S78: YES), a highlight in the set-up menu is moved (Step S80). When a finishing operation is performed (Step S79: YES), it is judged whether a button for "prioritizing switching of subtitles" is highlighted (Step S81). If the button for prioritizing switching of subtitles is not highlighted, the processing is completed. If the button for prioritizing switching of subtitles is highlighted, the seamless flag in the reserved area is updated to be "0" (Step S82), and the processing shown in this flow chart is completed.

As explained so far, according to the present embodiment, the seamless flag indicates which one of the demands should be prioritized when there are a demand for a continuous playback of an AVClip, i.e. playing back an AVClip without interruptions and a demand for prioritizing switchings of streams even if the playback of the AVClip may be interrupted. Consequently, it is possible to harmoniously accommodate these demands.

In the present embodiment, description is provided for a case in which the AVClip on the MainPath side, the text subtitle stream on the SubPath side, as well as the font data are all recorded on a BD-ROM.

If a stream on the SubPath side like the text subtitle stream is recorded on a recording medium different from the one having the data for the MainPath, for example, if it is recorded on a hard disk to which access can be made relatively fast, but the decoder buffer for the AVClip still does not experience an underflow, it is acceptable to have an arrangement wherein switching to an unpre-loaded stream is permitted even if the seamless flag is set to be valid so that seamless playbacks of AVClips should be prioritized.

Further, in the case where a stream on the SubPath side is recorded on an optical disc, but the decoder buffer for the AVClip still does not experience an underflow because the speed of access to the optical disc is fast enough, it is acceptable to have an arrangement wherein switching to an unpre-loaded stream is permitted.

Furthermore, a seek during a playback of a MainPath occurs because a text subtitle stream constituting SubPath information is recorded on a BD-ROM on which MainPath is also recorded; therefore, it is acceptable to start the playback of the MainPath after copying the stream on the SubPath side onto a recording medium, such as a hard disk, to which access can be made relatively fast. With this arrangement, it is possible to inhibit occurrence of an unnecessary seek during a playback.

Sixth Embodiment

Figure 56:
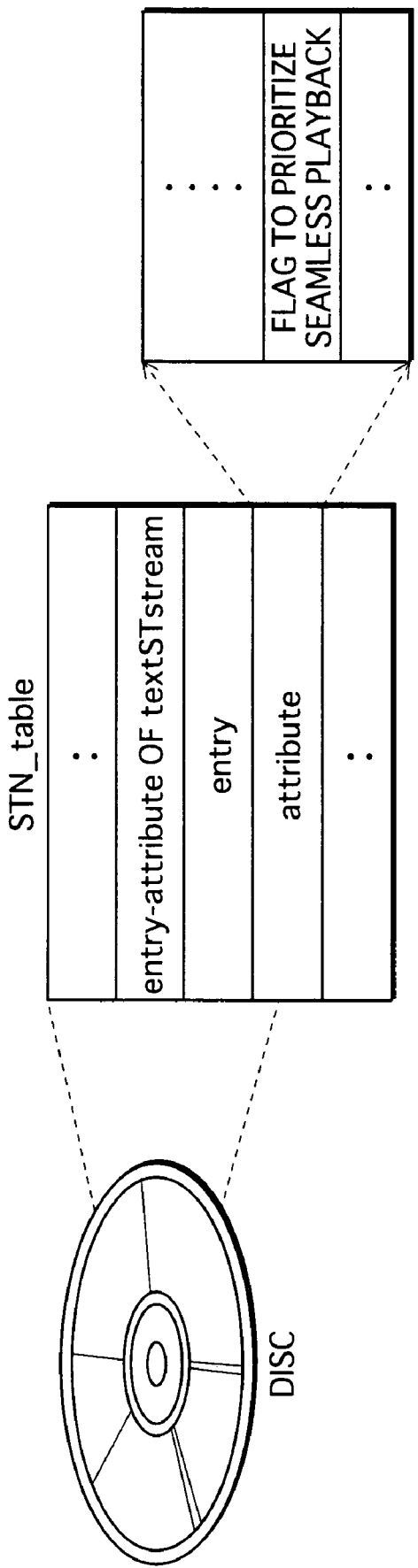
FIG. 56A shows an internal configuration of an STN_Table according to the sixth embodiment.
FIG. 56B shows meanings of the seamless flag provided in the STN_Table.

In the fifth embodiment, a PSR indicates which one is prioritized between seamless playbacks of AV clips and switchings of text subtitle streams. In the present embodiment an improvement is made to an STN_Table. In the present example, in a pair made of an attribute and a PID in an STN_Table, a seamless flag is provided for the attribute. FIG. 56A shows an internal configuration of an STN_Table in the sixth embodiment. As shown in the drawing, in an STN_Table according to the present embodiment, a set made up of an entry and an attribute corresponding to a text subtitle stream, a seamless flag is provided for the attribute.

FIG. 56B shows the meanings of the seamless flag provided in the STN_Table. The meanings of the seamless flag shown in the drawing are the same as the ones shown in FIG. 50. Since the seamless flag in the STN_Table defines the designation of which one should be prioritized between seamless playbacks of AVClips and increasing the number of languages to which subtitles can be switched, people in charge of authoring are able to define in advance which one should be prioritized. In such a case, a seamless flag may be provided for the attribute of an entire disc or for each of the attributes of PlayLists, which are the units of playback, or for each of the attributes of streams.

As explained so far, according to the present embodiment, in the case of normal movie productions, since people in charge of authoring does not want to have interruptions during playbacks of AVstreams, it is possible to reflect the intention of those people in charge onto the playback apparatus with the use of the settings in the STN_Table.

Seventh Embodiment

As for text subtitle streams, it is required to perform two types of pre-loadings, such as a pre-loading of the text subtitle stream itself and a pre-loading of font data.

A text subtitle stream is not displayable unless both of the two types of pre-loaded data are available. Consequently, even if a text subtitle stream is registered in an STN_Table and has been read into the text code buffer, the text subtitle stream is not displayable unless the font data has been read into the font buffer 11; therefore, selecting such a stream should be prohibited.

However, when the capacity of the font buffer is for one font set, it is possible to read only font data whose ID is ID=1 into the font buffer. When a need arises for switching over to font data whose ID is ID=2, it is required to read the data with ID=2 into the font buffer. At that time, as explained above, if it is requested that the AV stream should be played back without interruptions, it is necessary to restrict the re-reading of the font data.

In order to display subtitles with a text subtitle stream, font data is required. When such font data needs to be loaded during a playback of an AVClip, the playback of the video stream may be interrupted.

Figure 57:
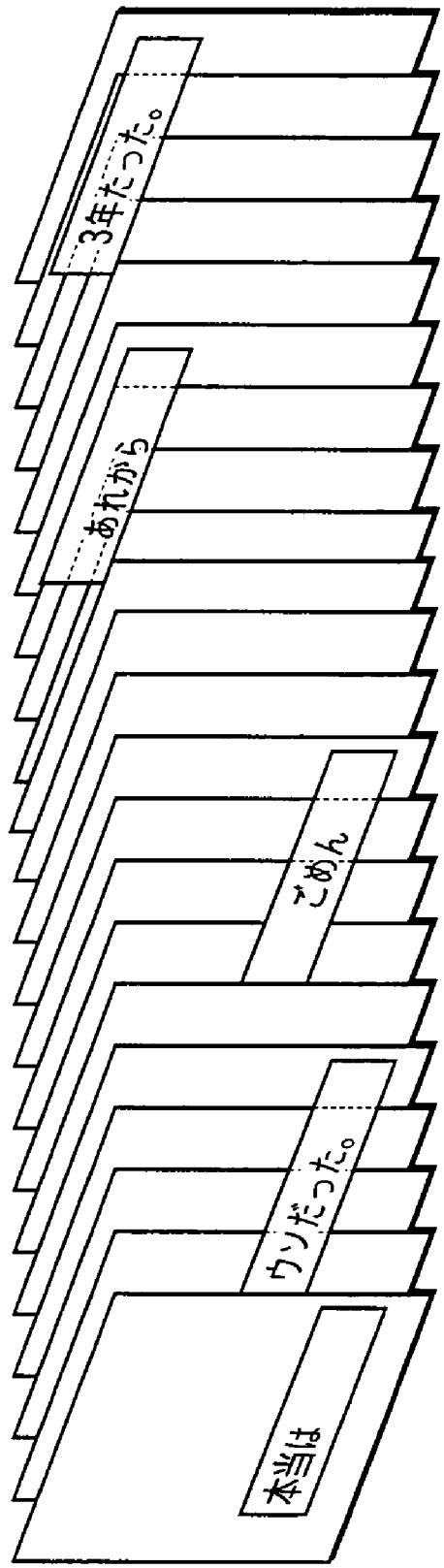
FIG. 57 shows an interruption during a video playback caused by loading of font data.

FIG. 57 shows an example in which the font being used is switched during a playback of a text subtitle stream. As shown in the drawing, to a certain point in time, the subtitle is displayed using the font data whose ID is ID=1, and after the time t1, the subtitle is realized using the font data whose ID is ID=2. In the case where the font data whose ID is ID=2 is not in the buffer, the loader 13 loads the font data during a playback of the AVClip. In order to load the font data, a disc seek occurs, and the playback of the video stream is interrupted.

As discussed in the second embodiment, the style information in a text subtitle stream includes IDs or names of fonts and at which points in time these fonts are required. It is, however, impossible to find out the IDs of the fonts from the description in the style information unless the text subtitle stream itself is analyzed.

In order to cope with this situation, in the present embodiment, the IDs of the required font data are written in Clip information. Since the IDs of the required fonts are listed in the Clip information, it is possible to find out the IDs of the required fonts without having to analyze the file in which the text subtitle stream is stored.

Figure 58:
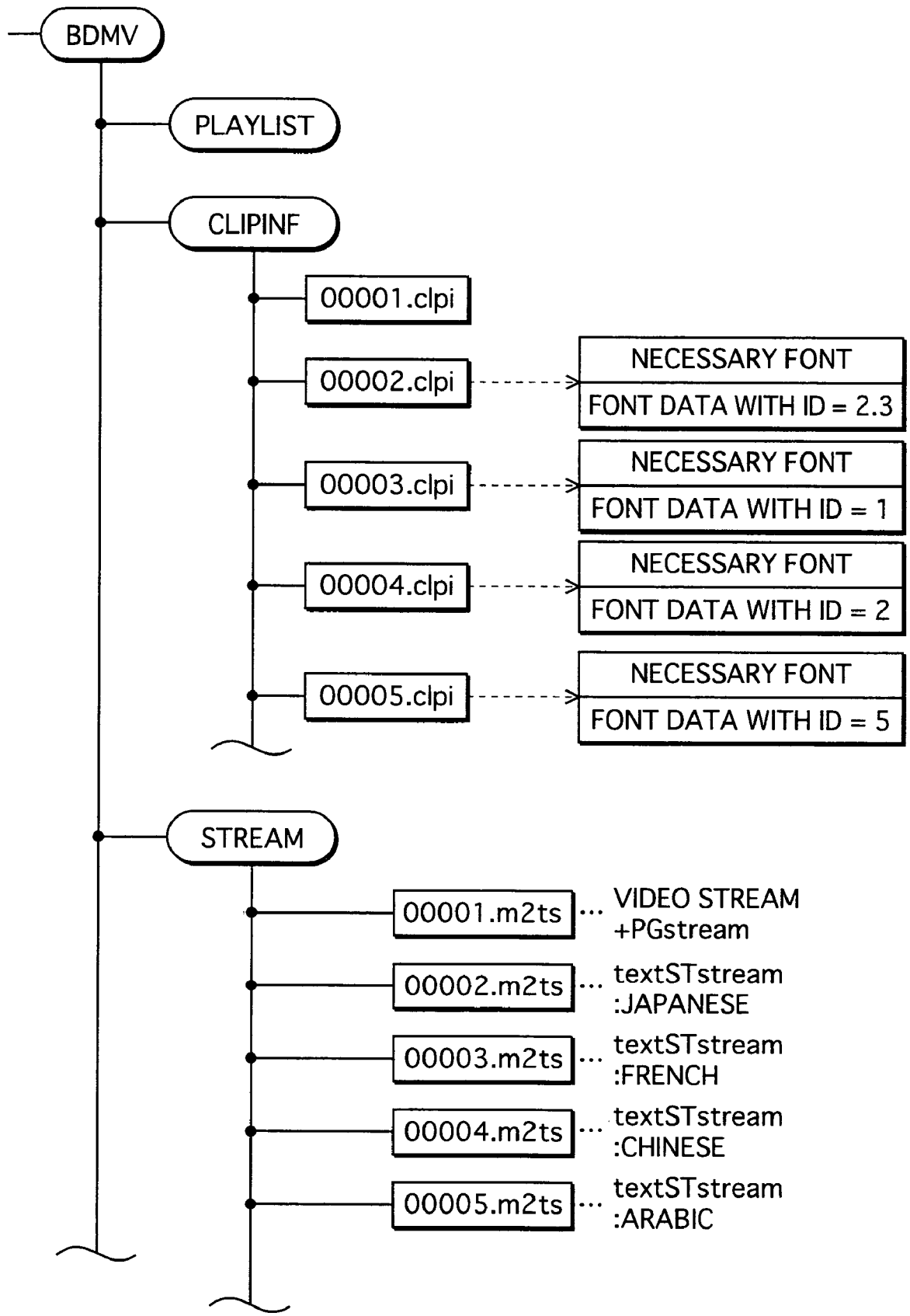
FIG. 58 shows an internal configuration of a recording medium according to the embodiment.

To be more specific, a BD-ROM is configured as shown in FIG. 58. FIG. 58 shows an internal configuration of a recording medium according to the present embodiment. In this drawing, each of the files named 0002.m2ts to 0005.m2ts constitutes a text subtitle stream.

In the directory shown in this drawing, the files named 0002.clpi to 0005.clpi are pieces of Clip information that are in correspondence with AVClips #2 to #5, respectively. The identifiers of sets of font data required for the text subtitle streams are written in these pieces of Clip information corresponding to AVClips (i.e. text subtitle streams). For example, the font data whose ID is ID=2 and the font data whose ID is ID=3 for Clip information #2 means that it is necessary to pre-load the font data whose ID is ID=2 and the font data whose ID is ID=3 in order to play back the AVClip corresponding to this piece of Clip information.

The font data whose ID is ID=1 for Clip information #3 means that it is necessary to pre-load the font data whose ID is ID=1 in order to play back the AVClip corresponding to this piece of Clip information.

As described above, since the identifiers of all the sets of font data required for a playback are written in the Clip information, when pre-loading a text subtitle stream, the loader 13 is able to read all the sets of font data that are required for the playback of the text subtitle stream into the buffer, without missing any, by referring to the Clip information.

Figure 59:
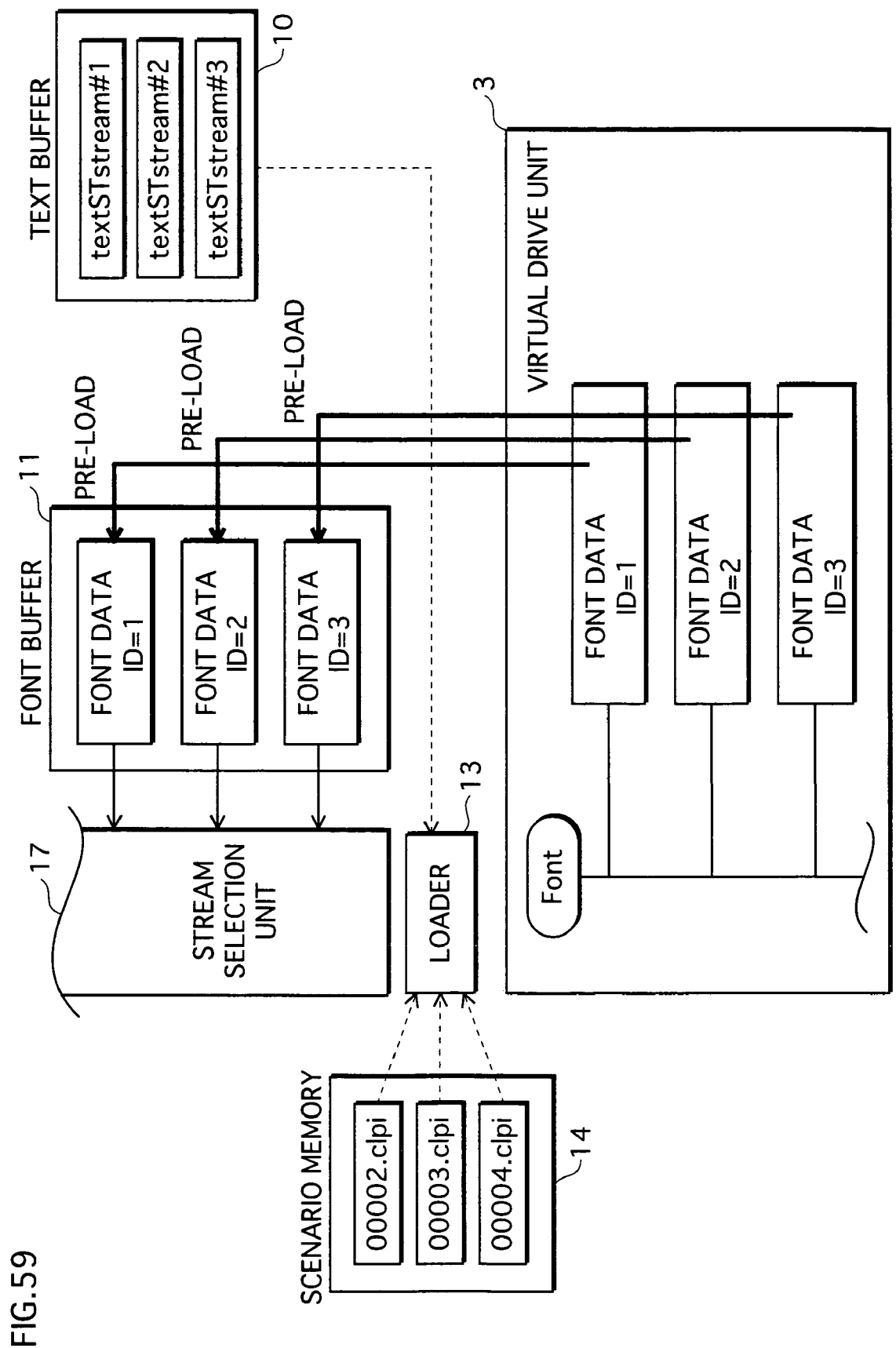
FIG. 59 shows a loading processing performed by the loader 13 according to the sixth embodiment.

FIG. 59 shows a loading processing performed by the loader 13 according to the present embodiment. In this example, a plurality of sets of font data are recorded in the Font directory on the BD-ROM. The identifiers of the font data whose ID is ID=2, the font data whose ID is ID=3, the font data whose ID is ID=1 are written in the pieces of Clip information respectively corresponding to the text subtitle streams. In this case, the loader 13 pre-loads the sets of font data into the font buffer 11 from the directory, according to the identifiers written in the pieces of Clip information. When a text subtitle stream in Japanese is played back, even if the font is switched during the playback, as long as the identifiers of both of the sets of font data are written in the Clip information, it is possible to load these sets of font data into the font buffer 11, without missing any.

Here, even if the font data whose ID is ID=2 becomes necessary during the playback, as shown in FIG. 59, if the font data whose ID is ID=2 is written in the Clip information, the loader 13 pre-loads a text subtitle stream corresponding to the font data whose ID is ID=2 into the buffer, it is possible to prevent interruptions that may occur during the playback of the AVClip.

It should be noted that it is acceptable to have an arrangement wherein all the sets of font data are stored as data being incorporated into a playback apparatus. In such a case, as long as a code sequence is available, the characters are displayable at any time; however, it is difficult to realize incorporation of all the sets of font data for various languages into a playback apparatus. Further, for those people who create contents, it is not very effective to incorporate fonts into a playback apparatus since they wish to have subtitles displayed in creative fonts that are suitable for the atmosphere of each movie. Accordingly, the idea of incorporating font data into playback apparatuses may be used as a countermeasure for an exceptional case in which font data is not available.

Eighth Embodiment

In the previous embodiment, the required font data is written in Clip information. In the present embodiment, file management information is prepared and identifiers of sets of font data are written therein.

Figure 60A:
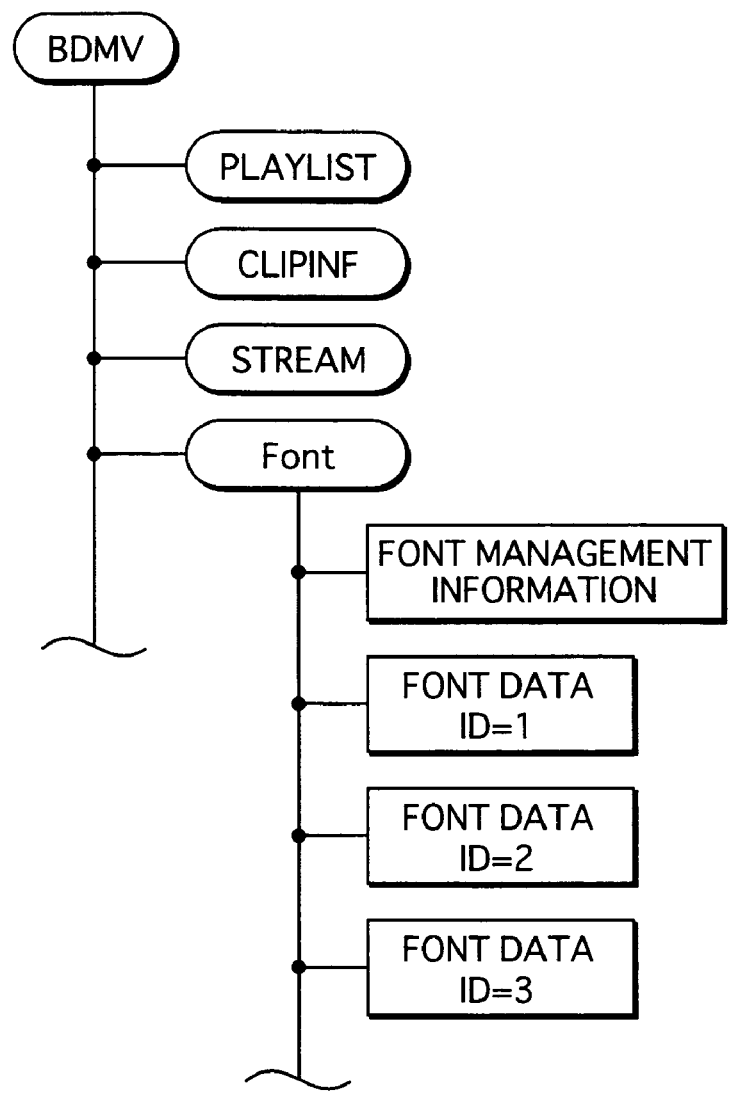
FIG. 60A shows a directory structure of a recording medium according to the seventh embodiment.
Figure 60B:
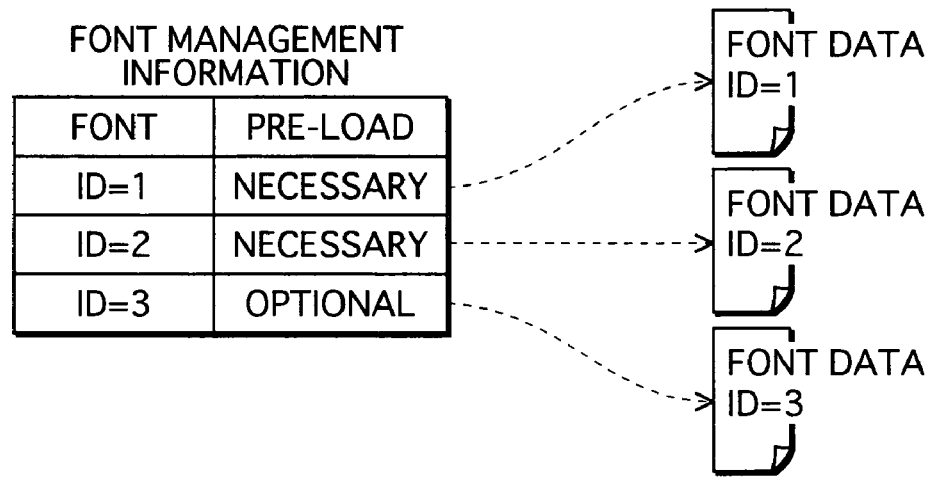
FIG. 60B shows an internal configuration of file management information.

FIG. 60A shows a directory structure on a recording medium according to the present embodiment. Four sets of font data are in the FONT directory. More specifically, file management information and the sets of font data with ID=1, 2, and 3 are in the FONT directory. FIG. 60B shows an internal configuration of the file management information. The file management information indicates whether the pre-loading of each of the sets of font data with ID=1, 2, and 3 is necessary or optional. "Necessary" means that the font is always required for displaying the text subtitle stream. "Optional" means that the font may be required when the user wishes to change displays or fonts. The fonts indicated as necessary need to be read into the font buffer 11 without fail before playing back AV streams.

Figure 61:
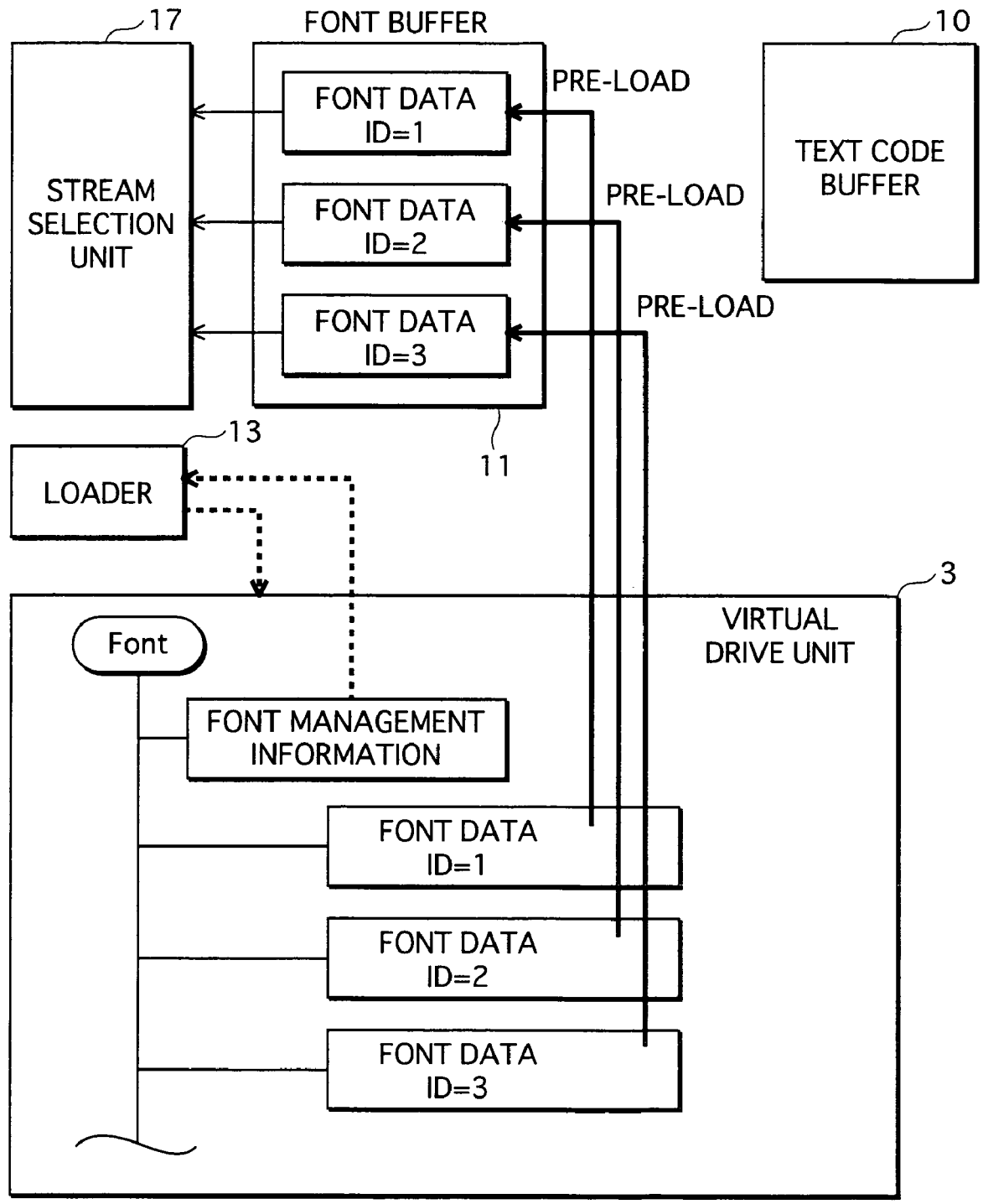
FIG. 61 shows how font data indicated to be necessary is loaded into a buffer.

FIG. 61 shows a pre-loading based on file management information. In the file management information, it is written that the pre-loadings of the font data with ID=1 and the font data with ID=2 are necessary. Consequently, as shown in FIG. 61, the loader 13 loads those sets of font data indicated as necessary into the buffer. After those necessary sets of font data have been loaded into the buffer, the loader 13 loads those sets of font data indicated as optional into the remaining area of the buffer.

As explained so far, according to the present embodiment, whether pre-loading is necessary or optional is written in the file management information. It is therefore possible to reduce the chances of having to load font data which may cause interruptions during playbacks of AVClips, by performing the pre-loading with reference to the file management information.

It should be noted that in the case where necessary font data cannot be found during an analysis of a text subtitle stream or in the case where font data cannot be read into buffer because the font data has not been pre-loaded and a seamless playback is requested, it is acceptable to use, as an alternative, some other fonts that have been read into the text code buffer and the font buffer 11 or the ones that have been incorporated into playback apparatuses.

Ninth Embodiment

The present embodiment discusses a method for avoiding a situation in which unpre-loaded streams need to be read, with improvements made to streams or management information.

A text subtitle stream sometimes has a blank period in which there are no subtitles. Out of pieces of PlayItem information, the piece of PlayItem information that specifies such a blank period as an IN point and an Out_time does not have a part of the corresponding text subtitle stream; therefore, people in charge of authoring may sometimes omit registration of a PID of the text subtitle stream in the STN_Table for such a piece of PlayItem information.

However, some inconvenience described below will occur when description in an STN_Table for a piece of PlayItem information is omitted, even if it is for a blank period.

Figure 62:
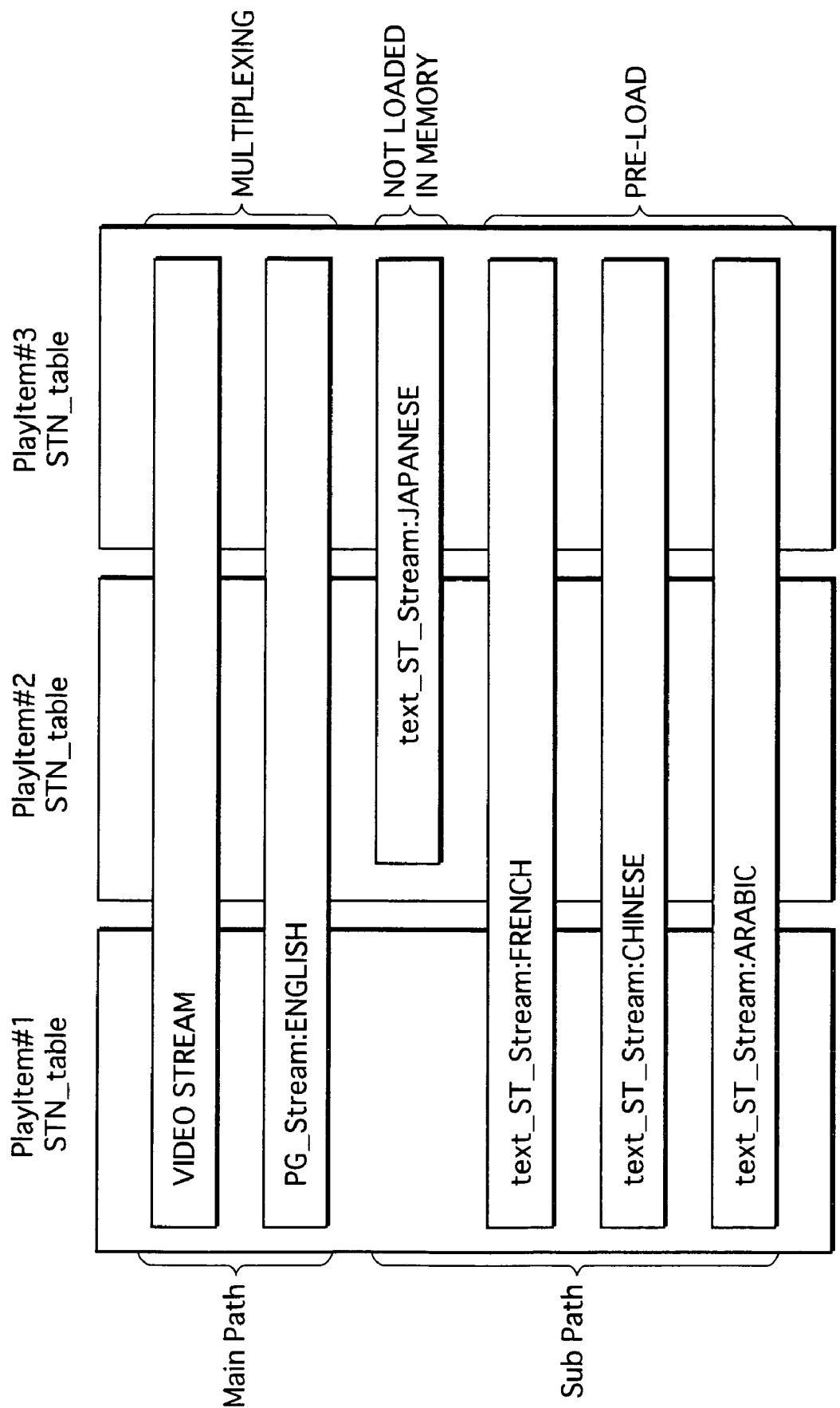
FIG. 62 shows how a plurality of PlayItems are played back in series.

As shown in FIG. 62, a situation is imagined in which a plurality of PlayItems are played back in series. It is assumed that a seamless playback is requested at the border between the PlayItem information #1 and PlayItem information #2.

Since the Japanese text subtitle stream that is included in a SubPath and is to be pre-loaded has a blank period in PlayItem information #1 and is therefore not registered in the STN_Table. This text subtitle stream is to be played back in the sections of the PlayItem information #2 and the PlayItem information #3.

Figure 63:
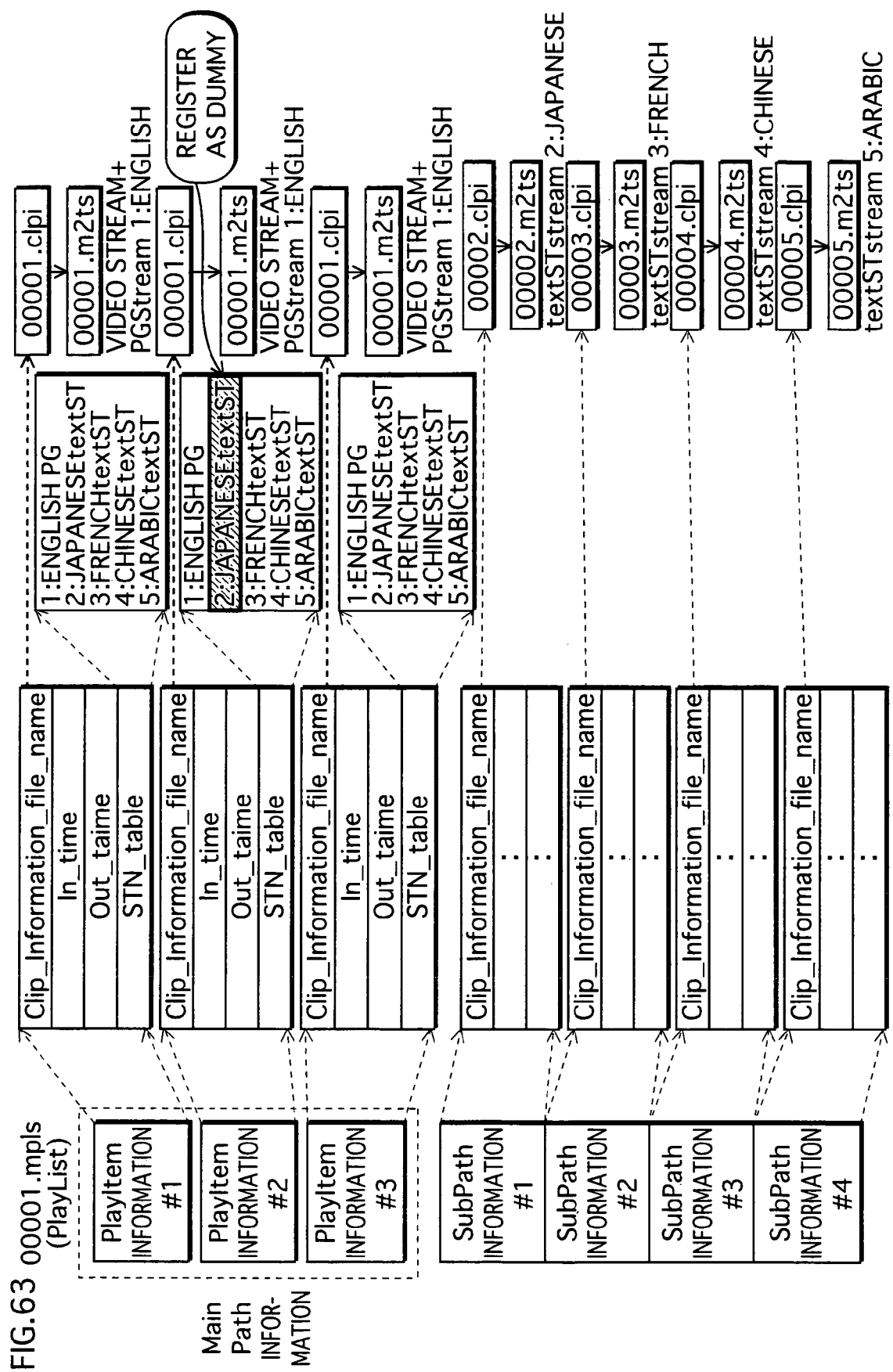
FIG. 63 shows a pre-loading performed based on an STN_Table.

The loader 13 performs a pre-loading based on an STN_Table. As for a pre-loading of a text subtitle stream, the loader 13 performs the preloading of the text subtitle stream written in the STN_Table for the first piece of PlayItem information (PlayItem information #1) out of the pieces of PlayList information. Even if some text subtitle streams become necessary during the playback, the loader 13 does not pre-load those text subtitle streams that are not written in the STN_Table of the first piece of PlayItem information. FIG. 63 shows a pre-loading based on an STN_Table. In this drawing, the Japanese text is written in the STN_Tables for PlayItem information #2 and PlayItem information #3, but is not written in the PlayItem information #1. Consequently, there is a possibility that the loader 13 may not pre-load the text subtitle stream in Japanese.

Before the playback of PlayItem information #2 starts, it is understood that some streams need to be pre-loaded from the STN_Table for PlayItem information #2; however, since a seamless playback is requested for PlayItem information #1 and PlayItem information #2, it is not possible to interrupt the playback of the AV stream, and it is therefore not possible to read the data into the text code buffer 10 and the font buffer 11. As a result, the streams to be pre-loaded which are inherently expected to be displayed will not be displayed.

Figure 64:
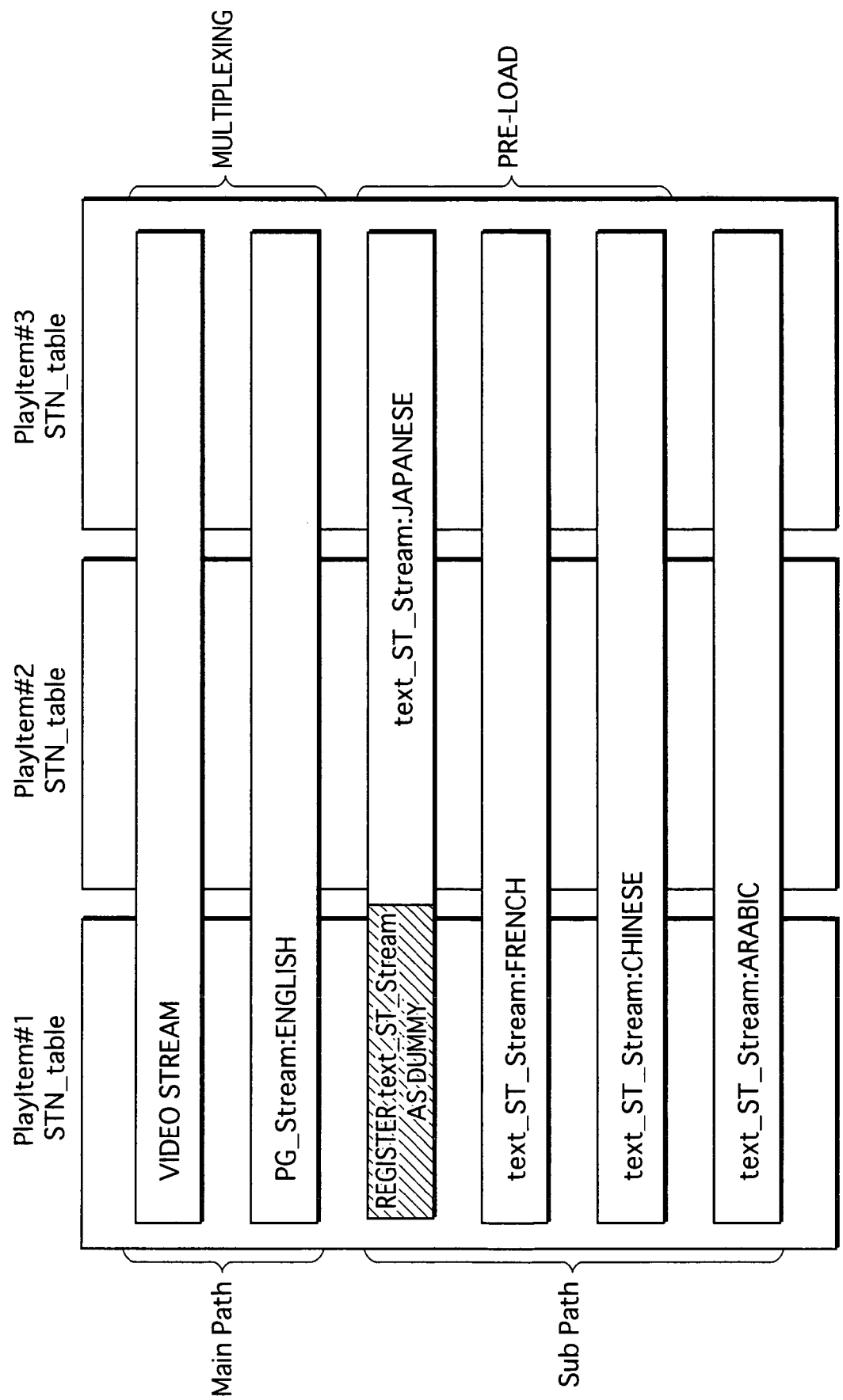
FIG. 64 shows description of an STN_Table according to the ninth embodiment.

In order to cope with this situation, for PlayItems that are to be continuously played back in series, the streams that should be pre-loaded are registered in all the STN_Tables. With PlayItem information #1, PlayItem #1 will not be actually displayed, but since it is registered in the STN_Table, PlayItem #1 being the target is to be pre-loaded. When PlayItem #1 becomes necessary with PlayItem information #2, the data which has been already pre-loaded will be displayed. FIG. 64 shows an example in which even if a part of a text subtitle stream specified with an In_time and an Out_time in a piece of PlayItem information has a blank period, the PID of the text subtitle stream is written in the STN_Table of the piece of PlayItem information. In other words, the STN_Table for the piece of PlayItem information corresponding to the blank period is set to have a dummy value. With this arrangement, the Japanese text is pre-loaded and even if the Japanese language is selected during a playback of an AVClip, it is possible to switch over to the Japanese language without interrupting the playback of the AVClip.

Tenth Embodiment

Like in the previous embodiment, the present embodiment is related to a blank period. In the previous embodiment, the discussion is based on a situation where a blank period exists in the first piece of PlayItem information. In the present embodiment, the discussion will be based on a case where a blank period exists somewhere in PlayItem information. In the case where a portion specified with an In_time and an Out_time in a piece of PlayItem information is a blank period, the PID sometimes may not be written into the STN_Table for the piece of PlayItem information.

Figure 65:
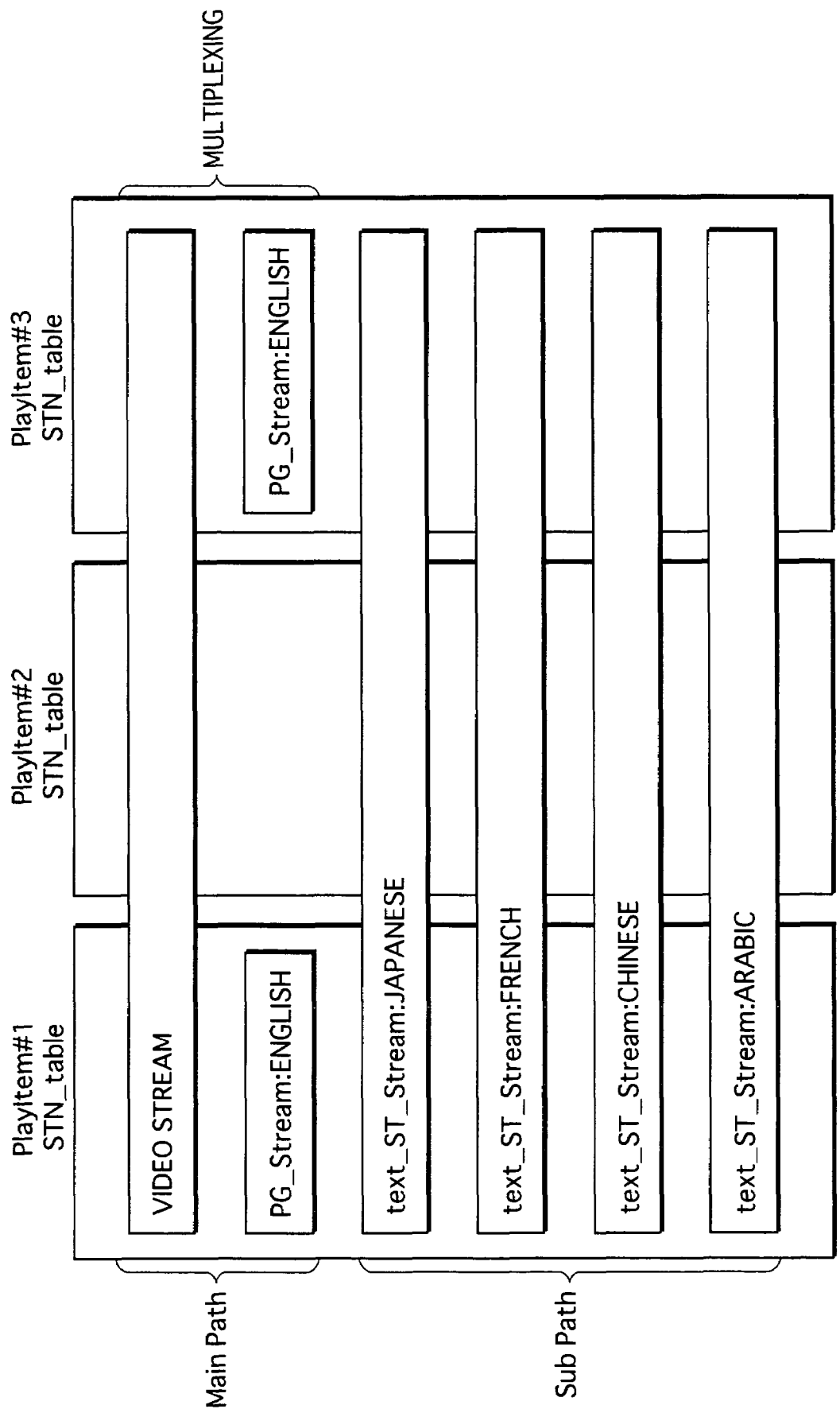
FIG. 65 shows a case in which a PID of a PG stream is written in an STN_Table for PlayItem information #1, but a PG stream for PlayItem information #2 represents a blank period so that no PID of the PG stream is registered in an STN_Table for the PlayItem information #2.

FIG. 65 shows a case in which a PID of a PG stream is written in STN_Tables for PlayItem information #1 and the PlayItem information #3, but a PG stream in the PlayItem information #2 is a blank period so that the PID of the PG stream is not registered in the STN_Table for the PlayItem information #2.

Figure 66:
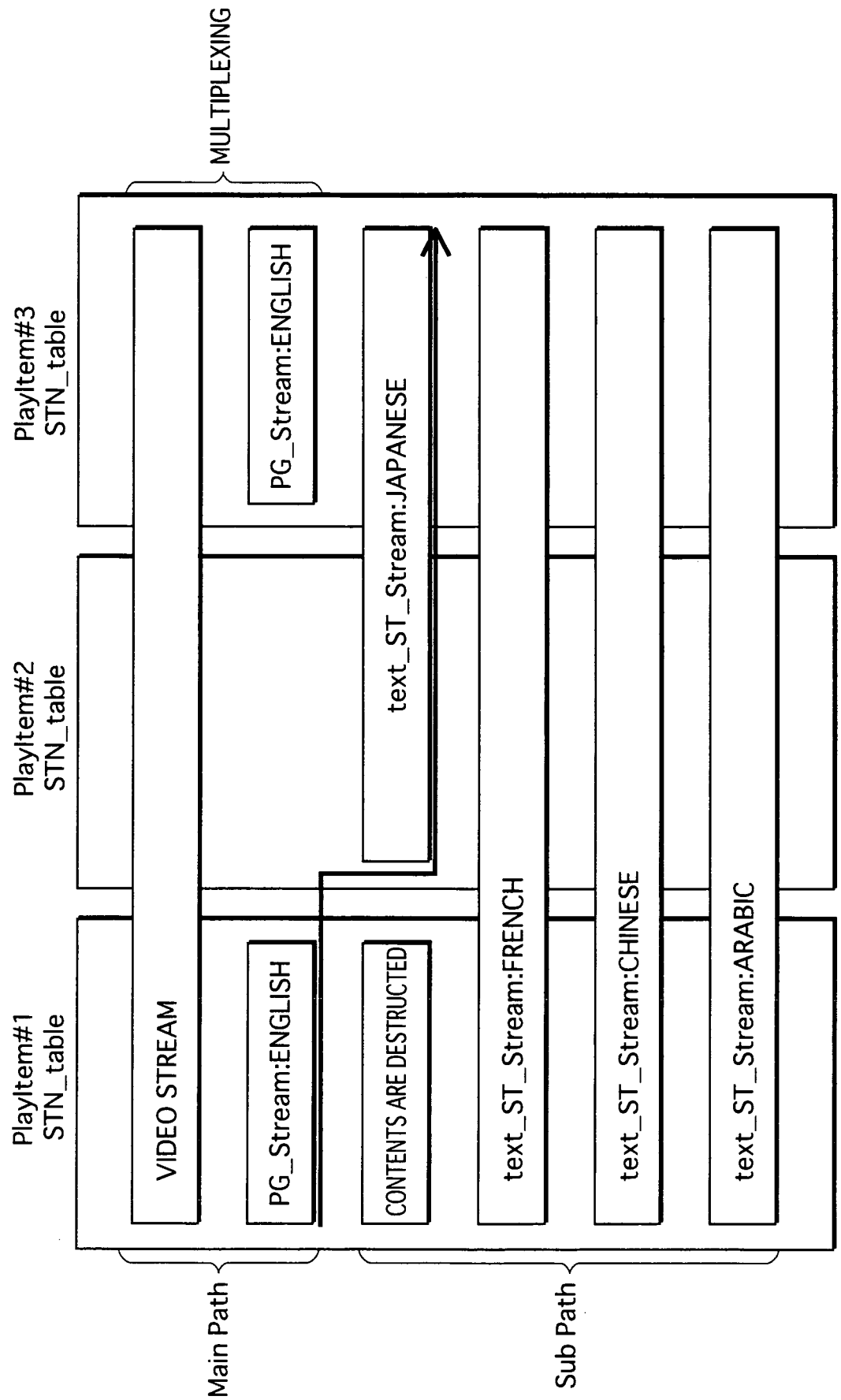
FIG. 66 shows a situation in which the stream registered in the STN_Table is only a text subtitle stream to be pre-loaded, so that the text subtitle stream to be pre-loaded must be selected.

In such a case, the stream registered in the STN_Table for the PlayItem information #2 is only the text subtitle stream to be pre-loaded. As shown in FIG. 66, the stream to be pre-loaded is always selected.

Here, a discussion is provided for a case in which a multiplexed PG stream is selected during the playback of PlayItem information #1, and the contents of the text code buffer 10 and the font buffer 11 are therefore destructed during the playback of PlayItem #1. In such a case, the loader 13 attempts to read the data again even if the data has already been deleted from the text code buffer 10 and the font buffer 11.

Further, when a seamless playback is requested at the border between the PlayItem information #1 and PlayItem information #2, it is not possible to perform the reading, and it is therefore not possible to display the PG stream even if it has been selected.

Figure 67:
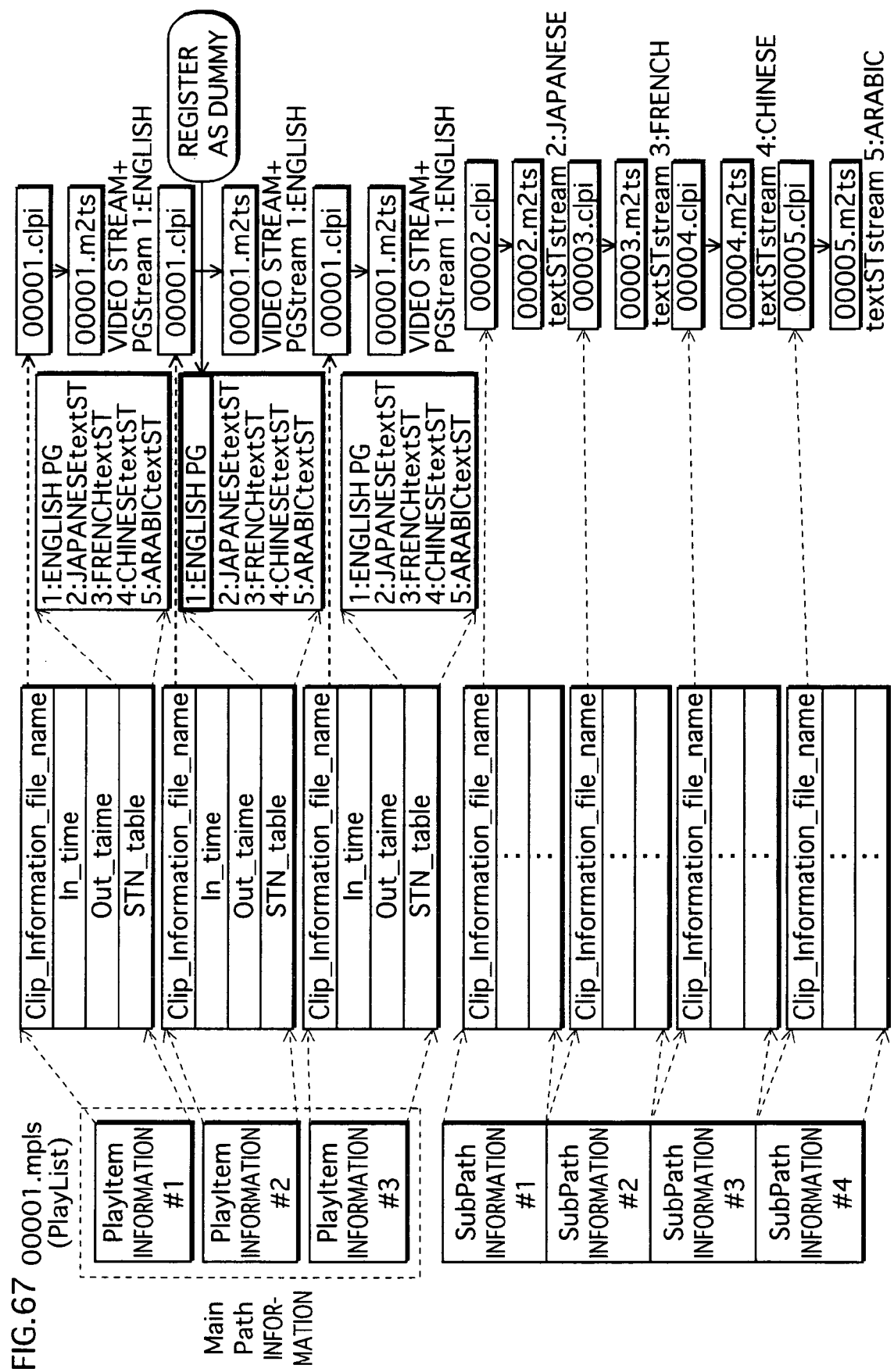
FIG. 67 shows a situation in which no multiplexed PG stream is registered in an STN_Table for the PlayItem information #2 so that a stream to be pre-loaded must be selected.

In order to prevent such a situation, even if a multiplexed stream does not exist in the PlayItem information #2, as shown in FIG. 67, the PID of the PG stream is registered into the STN_Table as a dummy. When such a dummy PID is registered in an STN_Table and if the PG stream is selected during a blank period, the consequence would be that nothing will be displayed, and there will be no problem in selection of streams (FIG. 68). In addition, since it is possible to avoid a situation where a stream to be pre-loaded is inevitably selected. Thus, it is possible to avoid occurrence of seeks, and it is therefore possible to prevent interruptions during playbacks at the stage of authoring.

Additional Information

The description above does not include all the possible embodiments of the present invention. It is possible to embody the present invention in the forms of embodiments with modifications as described below in (A), (B), (C), (D), and so on. The invention claimed in the claims of the present application is described so as to correspond to the embodiments described above and extended forms of the modifications thereof, or generalization thereof. The degree of the extension and the generalization is based on the features according to the technical standard in the field at the time of filing the application.

(A) In all the embodiments described above, a recording medium to be played back is described as a BD-ROM; however, the characteristic of the recording medium of the present invention lies in graphics streams being recorded thereon, and this characteristic does not depend on physical properties of BD-ROMs. The recording medium may be of any type as long as it is possible to record graphics streams thereon. For example, optical discs such as DVD-ROM, DVD-RAM, DVD-RW, DVD-R, DVD+RW, DVD+R, CD-R, CD-RW, and the like, and optical-magnetic discs such as PD, MO and the like are applicable. Semiconductor memory cards such as compact flash cards, Smart Media, Memory Sticks, MultiMedia Cards, and PCM-CIA Cards and the like are also applicable, as are (i) magnetic recording disks such as flexible disks, SuperDisk, Zip, Clik! and the like, and (ii) removable hard disk drives such as ORB, Jaz, SparQ, SyJet, EZFlyer, microdrive and the like. Furthermore, the recording medium may also be a built-in hard disk.

(B) According to the description of all of the embodiments, each of the playback apparatuses decodes an AVClip recorded on a BD-ROM and outputs the decoded AVClip to a TV; however, the playback apparatuses may be structured from only a BD-ROM drive, and the TV may be equipped with all of the other elements. In this case, the playback apparatuses and the TV can be incorporated into a home network connected using IEEE1394. Also, although the playback apparatuses in the embodiments are of a type used after connecting to a TV, integral display-playback apparatuses are also applicable. Furthermore, the playback apparatuses of the embodiments may be only the system LSIs (the integrated circuits) that perform essential parts of the processing. Because these playback apparatuses and the system LSIs are all inventions disclosed in the specification of the present application, acts involving the manufacture of playback apparatuses based on an internal structure of the playback apparatuses shown in the first embodiment are implementations of the inventions disclosed in the specification of the present application. Acts that involve transferring, whether onerous or gratuitous, (retail when cost is involved; a gift when no cost is involved), lending, or importing of playback apparatuses shown in the first embodiment are also implementations of the present invention. Acts that involve approaching the general user about transfer, rental or the like by means of store front displays, catalogue solicitation, pamphlet distribution and the like are also implementations of these playback apparatuses.

(C) Because of the information processing by computer programs shown in the flow charts being realized specifically using hardware resources, computer programs showing the processing procedures in the flowcharts form an invention in their own right. Although all of the embodiments show embodiments that relate to the implementation of computer programs pertaining to the present invention in an incorporated form in the playback apparatuses, the computer programs shown in the embodiments maybe implemented in their own right, separate from the playback apparatuses. The implementation of the computer programs in there own right includes acts that involve: (1) production of the programs, (2) transference of the programs, either onerous or gratuitous (3) lending of the programs, (4) importing of the programs, (5) providing the programs publicly via bi-directional electronic communications circuits, and (6) approaching the general user about transfer, rental and the like by means of store front displays, catalogue solicitation, pamphlet distribution, and so forth.

(D) The "time" elements of the steps that are executed chronologically in the flow charts are considered to be requisite items with which the present invention is identified. Accordingly, it is understood that the processing procedures shown in these flow charts disclose usages of playback methods. Executing the processing shown in these flow charts by chronologically performing the processing in the steps so as to achieve the intended objects of the present invention and to have the functions and effects is implementations of the recording methods of the present invention.

(E) When recording on a BD-ROM, extension headers preferably are appended to TS packets structuring AVClips. The extension headers, which are called TP_extra_header, include an "Arrival_Time_Stamp" and a "copy_permission_indicator", and have a 4-byte data length. TP_extra_header-attached TS packets (hereinafter, abbreviated to "EX-attached TS packet") are arranged into groups of 32 packets, and written into three sectors. Each group comprising 32 EX-attached TS packets is 6,144 bytes in length (=32×192), and matches the 6,144-byte size of three sectors (=2048×3). The grouping of 32 EX-attached TS packets contained in three sectors is referred to as an "Aligned Unit".

A playback apparatus transmits Aligned Units in transmission processing as described below, when used in a home network connected via IEEE1394. That is, a device on the side of the sender removes the TP_extra_header from each of the 32 EX-attached TS packets included in an Aligned Unit, and outputs the TS packets after encoding the TS packet body based on a DTCP standard. When outputting TS packets, isochronous packets are inserted at various positions between TS packets. The positioning of isochronous packets is based on times shown in the Arrival_Time_Stamp in each TP_extra_header. The playback apparatus outputs a DTCP_Descriptor when outputting the TS packets. The DTCP_Descriptor shows a copy permissibility setting in each TP_extra_header. Here, if the DTCP_Descriptor is described so as to show "copy prohibited", TS packets will not be recorded on other devices when used in a home network connected via IEEE1394.

(F) Although digital streams discussed in the embodiments are AVClips complying with a BD-ROM standard, the digital streams may be VOBs (Video Objects) complying with a DVD-Video standard or a DVD-Video Recording standard. VOBs are program streams compliant with ISO/IEC13818-1 obtained by multiplexing video and audio streams. Also, video streams in AVClips may be MPEG-4 format, WMV format, or the like. Furthermore, audio streams may be a Linear-PCM format, MP3 format, or MPEG-AAC format.

(G) Movie productions in the embodiments may be obtained by encoding analog video signals broadcasted by analog broadcast, or may be stream data constituted from transport streams broadcasted by digital broadcast.

Also, contents may be obtained by encoding analog/digital video signals recorded on videotape. Furthermore, contents may be obtained by encoding analog/digital video signals taken directly from a video camera. Alternatively, the contents may be digital copyrighted works distributed from a distribution server.

(H) It is acceptable to have an arrangement wherein the stream selection unit 17 determines a value (a value X) to be set in a PSR based on user operation information outputted from the operation receiving unit 3 and a button command in the IG stream and performs the processing of updating the PSR based on the value X. In such a case, if the user operation information outputted from the operation receiving unit 3 indicates that an audio switch key or a sub-image switch key has been pushed, a value obtained by adding 1 to the value in the PSR is taken as the value X. If the user operation information outputted from the operation receiving unit 3 indicates that a numeral key has been pushed, the numeral value having been pushed is taken as the value X. On the other hand, if a button command outputted from the operation receiving unit 3 is to instruct the playback apparatus to set the PSR, the value specified by an argument of the button command is taken as the value X. After the value X is determined in these ways, it is judged whether the value X is a valid value, an inconstant value, or an invalid value. The processing of updating the PSR is performed according to the result of the judgment. In the case where the value X is valid, the PSR is overwritten with the value X. In the case where the value X is an inconstant value, a most appropriate value is selected and set into the PSR. In the case where the value X is invalid, the value in the PSR is maintained.

(I) It is acceptable to provide a button called "optimization button" in a set-up menu to be displayed to receive the language settings for subtitles. The button information corresponding to the button has a button command for setting an inconstant value in PSR2. When the optimization button is confirmed so that the button command is executed, inconstant values are set in PSR1 and PSR2. The "Procedure when playback condition is changed" is then activated, and an audio stream and a PG_textST_stream that are most appropriate will be selected.

(J) In the first embodiment, the criteria to be satisfied are two, namely (a) and (b); however, it is acceptable to use three or more criteria.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A playback apparatus that plays back a text subtitle stream together with a moving picture, the playback apparatus comprising:
    a register set storing therein a plurality of capability flags;
    an inquiry unit operable to inquire of a user; and
    a selection unit operable to select a text subtitle stream corresponding to a predetermined language from a plurality of text subtitle streams, as a text subtitle stream to be played back, wherein
    the plurality of capability flags respectively correspond to a plurality of languages, wherein each flag corresponding to a language indicates whether or not the playback apparatus has a capability to process a characteristic of the corresponding language,
    the plurality of text subtitle streams include a text subtitle stream that has been eliminated from options for selection by the selection unit because of having, as attribute, a language whose characteristic cannot be processed by the playback apparatus,
    the inquiry unit inquires of a user whether the user wishes to increase a number of languages in which subtitles are displayable even if inconvenience may be caused; and
    in a case where the user performs an affirmative operation in response to the inquiry by the inquiry unit, the text subtitle stream that has, as attribute, the language whose characteristic cannot be processed by the playback apparatus, is included in the selection options.

2. The playback apparatus of claim 1, wherein
    the selection unit detects combinations of conditions, among a plurality of conditions, that are satisfied by each of a plurality of text subtitle streams recorded on a recording medium, and selects one among the plurality of text subtitle streams in accordance with the combination of satisfied conditions,
    a first condition among the plurality of conditions is that an ability to decode and convert character codes representing a subtitle into a character bit map is present in the playback apparatus,
    a second condition is that an ability to represent a language characteristic of a text subtitle stream when displaying the character bit map is present in the playback apparatus,
    a third condition is that a language code of a text subtitle stream matches a language setting in the playback apparatus, and
    the inconvenience during the playback is that, when a text subtitle stream is played back, a character bit map having characteristics of a language of the text subtitle stream is not displayable.

3. A computer-readable recording medium storing therein a program for having a computer execute a processing of playing back a text subtitle stream together with a moving picture, the program having the computer, which includes a register set storing therein a plurality of capability flags, execute:
    an inquiry step of inquiring of a user; and
    a selection step of selecting a text subtitle stream corresponding to a predetermined language from a plurality of text subtitle streams, as a text subtitle stream to be played back, wherein
    the plurality of capability flags respectively correspond to a plurality of languages, wherein each flag corresponding to a language indicates whether or not the playback apparatus has a capability to process a characteristic of the corresponding language,
    the plurality of text subtitle streams include a text subtitle stream that has been eliminated from options for selection by the selection step because of having, as attribute, a language whose characteristic cannot be processed by the playback apparatus,
    the inquiry step inquires of a user whether the user wishes to increase a number of languages in which subtitles are displayable even if inconvenience may be caused, and
    in a case where the user performs an affirmative operation in response to the inquiry by the inquiry step, a text subtitle stream that has, as attribute, the language whose characteristic cannot be processed by the playback apparatus is included in the selection options.

4. A playback method for playing back a text subtitle stream together with a moving picture, the playback method comprising the steps to be performed on a computer that includes a register set storing therein a plurality of capability flags:
    an inquiry step of inquiring of a user; and
    a selection step of selecting a text subtitle stream corresponding to a predetermined language from a plurality of text subtitle streams, as a text subtitle stream to be played back, wherein
    the plurality of capability flags respectively correspond to a plurality of languages, wherein each flag corresponding to a language indicates whether or not the playback apparatus has a capability to process a characteristic of the corresponding language,
    the plurality of text subtitle streams include a text subtitle stream that has been eliminated from options for selection by the selection step because of having, as attribute, a language whose characteristic cannot be processed by the playback apparatus,
    the inquiry step inquires of a user whether the user wishes to increase a number of languages in which subtitles are displayable even if inconvenience may be caused, and
    in a case where the user performs an affirmative operation in response to the inquiry by the inquiry step, the text subtitle stream that has, as attribute, the language whose characteristic cannot be processed by the playback apparatus is included in the selection options.

* * * * *